(12) United States Patent
Kirino et al.

(10) Patent No.: US 6,730,421 B1
(45) Date of Patent: May 4, 2004

(54) MAGNETIC RECORDING MEDIUM AND ITS PRODUCTION METHOD, AND MAGNETIC RECORDER

(75) Inventors: Fumiyoshi Kirino, Tokyo (JP); Nobuyuki Inaba, Hasuda (JP); Teruaki Takeuchi, Kitasoma-gun (JP); Kouichirou Wakabayashi, Toride (JP)

(73) Assignee: Hitachi, Maxell, Ltd., Ibaraki (JP)

(*) Notice: Subject to any disclaimer, the term of this patent is extended or adjusted under 35 U.S.C. 154(b) by 0 days.

(21) Appl. No.: 09/959,855

(22) PCT Filed: May 11, 2000

(86) PCT No.: PCT/JP00/03016

§ 371 (c)(1),
(2), (4) Date: Nov. 9, 2001

(87) PCT Pub. No.: WO00/68941

PCT Pub. Date: Nov. 16, 2000

(30) Foreign Application Priority Data

May 11, 1999 (JP) .......................... 11-129758
Jun. 16, 1999 (JP) .......................... 11-169382

(51) Int. Cl.[7] .................. G11B 5/66; G11B 5/70; C25D 5/10; B32B 9/00
(52) U.S. Cl. .................. 428/694 TS; 428/336; 428/611; 428/667; 428/697; 428/699; 428/702; 428/694 TM; 428/900
(58) Field of Search ............ 428/694 TS, 694 TM, 428/336, 900, 611, 667, 699, 702, 697

(56) References Cited

U.S. PATENT DOCUMENTS

| | | | | |
|---|---|---|---|---|
| 4,652,499 A | | 3/1987 | Howard ...................... | 428/641 |
| 5,599,632 A | * | 2/1997 | Cheng et al. ............... | 428/457 |
| 5,846,648 A | | 12/1998 | Chen et al. ................. | 428/332 |
| 6,231,968 B1 | * | 5/2001 | Hiramoto et al. ........... | 428/332 |
| 6,410,133 B1 | * | 6/2002 | Kirino et al. ............... | 428/336 |
| 6,472,047 B1 | * | 10/2002 | Kirino et al. ............... | 428/141 |
| 6,534,206 B1 | * | 3/2003 | Kirino et al. ......... | 428/694 SC |
| 2001/0053458 A1 | * | 12/2001 | Suzuki et al. .............. | 428/611 |
| 2002/0110707 A1 | * | 8/2002 | Kirino et al. .......... | 428/694 TS |
| 2002/0197516 A1 | * | 12/2002 | Kirino et al. .......... | 428/694 TS |

FOREIGN PATENT DOCUMENTS

| | | |
|---|---|---|
| JP | A 5-334670 | 12/1993 |
| JP | A 6-84168 | 3/1994 |
| JP | A 6-267053 | 9/1994 |
| JP | A 9-282632 | 10/1997 |
| JP | B2 2704957 | 10/1997 |
| JP | A 10-96076 | 4/1998 |
| JP | A 10-134334 | 5/1998 |
| JP | A 10-241939 | 9/1998 |
| JP | A 10-302242 | 11/1998 |
| JP | A 11-149628 | 6/1999 |
| JP | A 2000-149201 | 5/2000 |
| JP | A 2000-200410 | 7/2000 |
| WO | WO 99/40575 | 8/1999 |

* cited by examiner

*Primary Examiner*—Holly Rickman
(74) *Attorney, Agent, or Firm*—Oliff & Berridge, PLC

(57) ABSTRACT

A magnetic recording medium (300) includes a substrate (1) and on the substrate (1) a first underlying layer (32), a second underlying layer (33), a magnetic layer (34), and a protective layer (35). Because of the existence of the first underlying layer (32) of Hf, initial growth layer having no specific crystal structure is prevented from growing in the second underlying layer (33). The second underlying layer (33) has a structure in which CoO particles having a cross section of a regular hexagon and separated by $SiO_2$ portion are arranged in honeycomb. Since magnetic particles are epitaxially grown from CoO particles, the size of the magnetic particles and particle size distribution can be controlled, and the magnetic interaction between magnetic particles can be lessened. The underlying layer (33) and the protective layer (35) are formed by ECR sputtering. Such a magnetic recording medium is free from noise and thermal fluctuation, and ultrahigh recording density over 40 Gbit/$inch^2$ is realized.

34 Claims, 18 Drawing Sheets

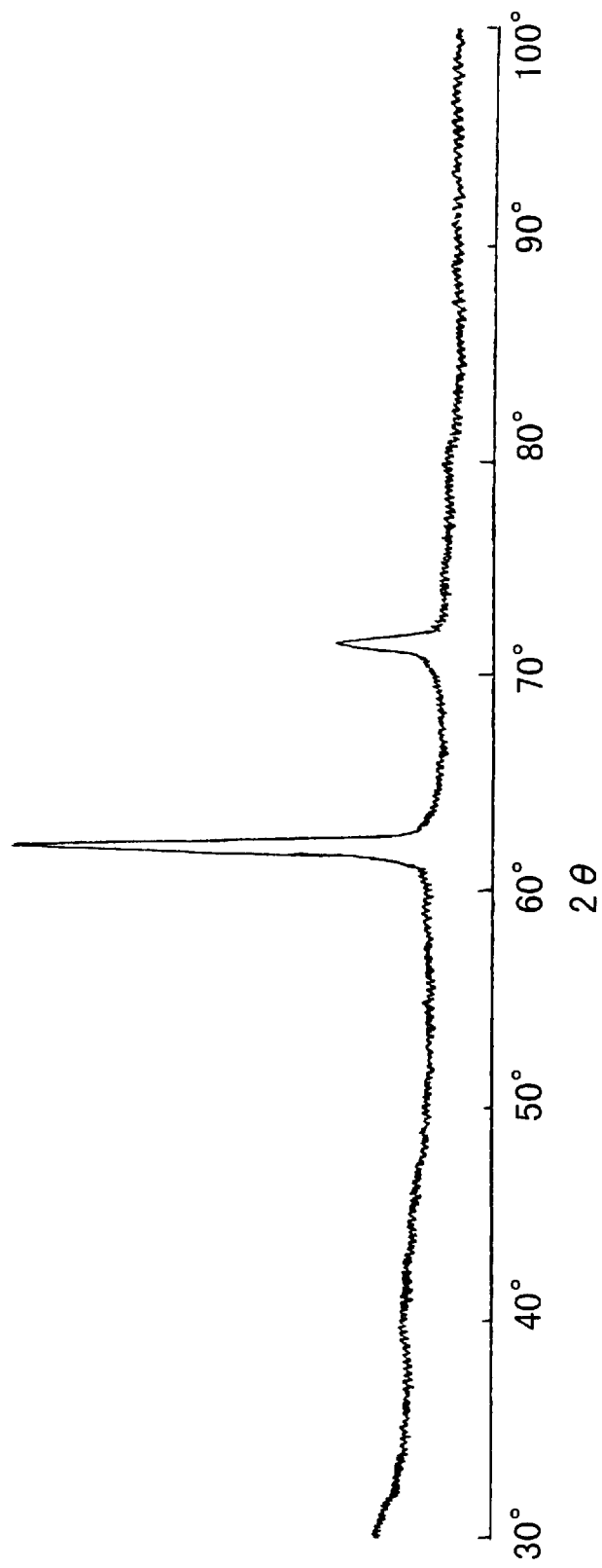

MAGNETIC RECORDING MEDIUM AND ITS PRODUCTION METHOD, AND MAGNETIC RECORDER

TECHNICAL FIELD

The present invention relates to a magnetic recording medium which is suitable for high density recording. In particular, the present invention relates to a magnetic recording medium which makes it possible to record bit information in an extremely minute area of a magnetic layer. The present invention also relates to a method for producing the magnetic recording medium and a magnetic recording apparatus.

BACKGROUND ART

Recent development of the advanced information society is remarkable. The multimedia technology, with which various types of information can be dealt with, is quickly popularized. A magnetic recording apparatus, which is installed, for example, to a computer, is known as one of those based on the multimedia technology. At present, the development of the magnetic recording apparatus is advanced along with a course to realize a small-sized apparatus while improving the recording density.

In order to realize high density recording with the magnetic recording apparatus, it is demanded, for example, that (1) the distance between a magnetic disk and a magnetic head is narrowed, (2) the coercive force of a magnetic recording medium is increased, (3) the speed of the signal processing process is increased, and (4) a medium, which suffers from less thermal fluctuation, is developed.

The magnetic recording medium has a magnetic layer in which magnetic particles or magnetic grains are aggregated on a substrate. Information is recorded thereon by magnetizing a certain group of several magnetic grains in an identical direction by the aid of a magnetic head. Therefore, in order to realize the high density recording, it is necessary to decrease the minimum area which may be magnetized in the identical direction at once in the magnetic layer, i.e., the unit area in which the inversion of magnetization may occur, in addition to the increase in coercive force of the magnetic layer. In order to decrease the unit area of inversion of magnetization, it is necessary that individual magnetic grains are allowed to have a fine and minute size, or it is necessary to decrease the number of magnetic grains for constructing the unit of inversion of magnetization. For example, in order to achieve a recording density above 40 Gbits/inch$^2$ (6.20 Gbits/cm$^2$), it is necessary that the diameter of the magnetic grain is suppressed to be not more than 10 nm. Further, it is also necessary to make countermeasures in order to decrease the dispersion of the grain diameter when the magnetic grain is allowed to have a fine and minute size, and decrease the thermal fluctuation. As a trial to realize the demands as described above, it has been suggested that a seed film is provided between a substrate and a magnetic layer, as disclosed, for example, in U.S. Pat. No. 4,652,499.

However, the method, in which the magnetic layer is provided on the substrate with the seed film intervening therebetween as described above, has had a limit to control the magnetic grain diameter and the distribution thereof in the magnetic layer. For example, even when the material for the seed film, the film formation condition, the structure of the seed film, and other factors were adjusted in order to obtain magnetic grains having a grain diameter of about 10 nm in the magnetic layer, the grain diameter distribution was broad, in which considerable amounts of grains having a size coarsely increased to several tens nm and grains inversely having a size finely decreased to about a half of 10 nm were present in a mixed manner. As for such magnetic grains, magnetic grains having a grain diameter larger than the average cause the increase in noise upon recording/reproduction. On the other hand, magnetic grains having a grain diameter smaller than the average cause the increase in thermal fluctuation upon recording/reproduction. As a result of the presence of the magnetic grains having a variety of sizes in a mixed manner, the boundary line between an area in which the inversion of magnetization occurs and an area in which the inversion of magnetization does not occur provides a coarse zigzag pattern as a whole. This fact was also a factor to increase the noise. Further, the inversion of magnetization hitherto occurred in a unit composed of a number of 5 to 10 individuals of magnetic grains in the magnetic layer of the conventional magnetic recording medium.

As for the spacing distance between the magnetic head and the magnetic layer of the magnetic recording medium for the high density recording, it is investigated that the spacing distance is narrowed to be not more than 15 nm. In general, scratches and rough irregularities exist on the substrate surface. For this reason, rough irregularities originating from the substrate have hitherto appeared on the surface of the magnetic recording medium prepared by stacking a film on the substrate. If the distance between the magnetic recording medium and the magnetic head is narrowed, it is impossible for the magnetic head to stably fly due to the rough irregularities as described above, resulting in the occurrence of the following problems. That is, the recording and reproducing characteristics are deteriorated, and the magnetic head collides with the magnetic recording medium to cause damages of the both. Therefore, it is demanded to realize a technique for forming a flat film without being affected by the surface roughness of the substrate.

On the other hand, as the spacing distance between the magnetic head and the magnetic layer is narrowed, it is more necessary to protect the magnetic layer from the shock exerted by the magnetic head and the environment of use. Therefore, it is required to form a protective film for protecting the magnetic film so that the protective film is more uniform without causing any deficiency. However, in order to realize the spacing distance of not more than 15 nm between the magnetic head and the magnetic layer, it is necessary that the protective film to be formed on the magnetic layer has a film thickness of not more than 5 nm. Even when it is intended to form a carbon protective film with a thickness of not more than 5 nm by using the conventional DC sputtering method or the magnetron sputtering method, it has been impossible to completely cover the surface of the magnetic recording medium with the protective film, because the carbon protective film is formed only in an island form, or any defect such as hollow hole and crack occurs in the protective film. If the surface of the magnetic recording medium is not completely covered with the protective film, then any corrosion occurs in the magnetic layer, and the magnetic layer suffers from any physical damage due to the head crash or the like.

In order to allow the magnetic head to fly over the magnetic disk, it is necessary to provide a texture provided with a concave/convex structure on the surface. However, it has not been easy to control the concave/convex structure to have an appropriate size.

Japanese Patent No. 2704957 discloses a magnetic recording medium having a keeper layer. The keeper layer is an auxiliary film having soft magnetization. The keeper layer is arranged so that it makes tight contact with the surface of a magnetic layer (recording layer) for performing recording. When the magnetic layer is in a recording magnetization state, a portion of the keeper layer, which contacts with a recording magnetization portion of the magnetic layer, is magnetized in a direction opposite to the magnetic layer, because the keeper layer has the soft magnetization. An annular magnetic path is formed by the recording magnetization portion of the magnetic layer and the portion of magnetization in the opposite direction of the keeper layer. Even when the film thickness of the magnetic layer is thinned, the recording magnetization is stably maintained without being demagnetized. Further, owing to such a situation, the diamagnetic field, which acts on the magnetic layer of the recording magnetization portion, is decreased. Therefore, even when the recording density is increased by allowing the recording magnetic domain to have a fine and minute size, the influence of the diamagnetic field is mitigated, because the film thickness of the magnetic layer can be made thin. The demagnetization based thereon is also reduced. Simultaneously, the recording magnetization state is stabilized by the keeper layer. Therefore, the demagnetization, which would be otherwise caused by the thermal fluctuation in accordance with the elapse of time, can be also reduced, giving high stability of storage of recording information for a long period of time.

However, when the keeper layer is formed, a problem arises such that a magnetic resistance effect (MR) magnetic head, which is widely used for the present hard disk apparatus for recording and reproduction, cannot be used as it is, because of the following reason. As clarified from the role of the keeper layer as described above, the keeper layer acts as a type of shield on the magnetic layer. Therefore, the presence of the keeper layer brings about an obstacle for the reproducing operation in which the leak magnetic field is read with the magnetic head and for the recording operation in which the magnetization of the magnetic layer is inverted with the magnetic head. That is, the recording magnetic field is obstructed by the leak magnetic field of the keeper layer during the recording. Therefore, the effective recording magnetic field is lowered. During the reproduction, an arrangement is made, in which the magnetic pole of the keeper layer counteracts the magnetic pole of the magnetic layer. For this reason, the leak magnetic field from the area of inversion of magnetization of the magnetic layer is decreased, and the reproducing sensitivity is lowered. Therefore, even when the reproducing element of the magnetic head is operated in this state, the reproduction output is small. In order to deal with the problem caused upon the recording and reproduction, the following method is known. That is, a DC bias current is allowed to flow through the magnetic head, and a DC magnetic field is applied to an area disposed just under the magnetic head, in order to eliminate the action of the keeper layer only when the recording operation and the reproducing operation are performed. With the DC magnetic field, the keeper layer of the area, on which the DC magnetic field is exerted, is magnetically saturated so that a so-called window may be effectively bored through the shield. On the other hand, as for the reproducing element of the magnetic head, it is desirable to use a magnetic resistance effect (MR) element having a high reproducing sensitivity or a giant magnetic resistance effect (GMR) element. However, such an element has no function to apply the DC magnetic field as described above.

Therefore, it is impossible to perform reproduction on the magnetic recording medium provided with the keeper layer by using an ordinary MR element or an ordinary GMR element as it is.

The perpendicular magnetic recording system attracts attention as a recording system for realizing the high density recording for the magnetic recording medium. The perpendicular magnetic recording system uses a magnetic recording medium (hereinafter referred to as "perpendicular magnetic recording medium") including, as a recording layer, a magnetic layer in which the magnetization-prompt direction is perpendicular to the disk surface. The perpendicular magnetic recording of this type does not involve such a problem as caused in the in-plane magnetic recording that the magnetic field, which is generated from the boundary between magnetic domains having different magnetization directions, inhibits the formation of the minute magnetic domain. Therefore, it is possible to thicken the film thickness of the magnetic layer of the magnetic recording medium. For this reason, in the case of the perpendicular magnetic recording medium, it is possible to form a minute recording magnetic domain on the magnetic layer in order to achieve the high density recording. The perpendicular magnetic recording medium is highly resistant to the thermal fluctuation as compared with the in-plane magnetic recording medium.

As for the perpendicular magnetic recording medium as described above, a perpendicular magnetic recording medium of the monolayer type provided with only one layer of magnetic layer (recording layer) has been investigated, in which the magnetic layer of the in-plane magnetization of the in-plane magnetic recording medium is changed to the magnetic layer of the perpendicular magnetization. Although the monolayer type perpendicular magnetic recording medium has a simple structure, it involves the following problem. That is, the leak magnetic field generated from the medium is small as compared with the in-plane magnetic recording medium, and the reproduction output is small. In order to solve this problem, a two-layered type perpendicular magnetic recording medium has been suggested, in which an in-plane magnetizable layer is formed between a substrate and a magnetic layer. In the case of the two-layered type perpendicular magnetic recording medium, the magnetic flux, which is generated on the side of the substrate of the magnetic layer, passes through the in-plane magnetizable layer, and thus the magnetic path is formed. Accordingly, the leak magnetic field, which is generated on the side opposite to the substrate of the magnetic layer, is increased. Therefore, when the leak magnetic field from the magnetic layer is detected by using the reproducing head, the reproduction output is increased.

However, in the case of the two-layered type perpendicular magnetic recording medium, the magnetic flux to cause any noise, which originates from any confused magnetic domain in the area of inversion of magnetization of the magnetic layer, also passes through the in-plane magnetizable layer. Therefore, in the case of the two-layered type perpendicular magnetic recording medium, not only the reproduced signal but also the noise are increased. As a result, the signal to noise ratio (S/N) is equivalent to that of the monolayer type perpendicular magnetic recording medium. Therefore, as for the two-layered type perpendicular magnetic recording medium, it has been necessary to decrease the noise from the viewpoint of S/N.

The present invention has been achieved in order to solve the problems involved in the conventional technique as described above, a first object of which is to provide a magnetic recording medium having a magnetic layer composed of magnetic particles or magnetic grains which are allowed to have a fine and minute size and in which the dispersion of grain diameter is reduced, and to provide a magnetic recording apparatus installed with the magnetic recording medium.

A second object of the present invention is to provide a magnetic recording medium in which magnetic grains are controlled to have desired crystal orientation, and to provide a magnetic recording apparatus installed with the magnetic recording medium.

A third object of the present invention is to provide a magnetic recording medium in which the unit of inversion of magnetization is small, and to provide a magnetic recording apparatus installed with the magnetic recording medium.

A fourth object of the present invention is to provide a magnetic recording medium in which the noise is low, the thermal fluctuation is low, and the thermal demagnetization is low and which is suitable for high density recording, and to provide a magnetic recording apparatus installed with the magnetic recording medium.

A fifth object of the present invention is to provide a magnetic recording medium which is formed with a texture having a desired concave/convex structure, and to provide a magnetic recording apparatus installed with the magnetic recording medium.

A sixth object of the present invention is to provide a method for producing a magnetic recording medium provided with a protective layer composed of a super thin film to cover, with a uniform film thickness, a surface of a magnetic layer of the magnetic recording medium.

A seventh object of the present invention is to provide a magnetic recording medium and a magnetic recording apparatus suitable for high density recording, in which an MR element or a GMR element having a high reproducing sensitivity can be used for reproduction, although a layer, which plays a role of a keeper layer to mitigate recording demagnetization which would be otherwise caused by the high density recording, is provided.

An eighth object of the present invention is to provide a perpendicular magnetic recording medium and a magnetic recording apparatus in which the noise is reduced, and information can be reproduced with high S/N.

A ninth object of the present invention is to provide a super high density magnetic recording medium having a surface recording density exceeding 40 Gbits/inch$^2$, and to provide a magnetic recording apparatus installed with the magnetic recording medium.

DISCLOSURE OF THE INVENTION

According to a first aspect of the present invention, there is provided a magnetic recording medium comprising:
a substrate;
an underlying layer which is formed on the substrate, and
a magnetic layer which is formed on the underlying layer and on which information is recorded, wherein:
the underlying layer is composed of crystal grains substantially formed of magnesium oxide, and a crystal grain boundary or boundaries containing at least one oxide selected from the group consisting of silicon oxide, aluminum oxide, titanium oxide, tantalum oxide, and zinc oxide.

The present inventors have disclosed, in U.S. patent application Ser. No. 09/478,377 (corresponding to Japanese Patent Application No. 11-1667), a magnetic recording medium comprising a non-magnetic substrate; an inorganic compound film including crystalline first oxide composed of at least one selected from cobalt oxide, chromium oxide, iron oxide, and nickel oxide, and second oxide composed of at least one selected from silicon oxide, aluminum oxide, titanium oxide, tantalum oxide, and zinc oxide, in which the second oxide exists at a grain boundary of crystal grains of the first oxide; and a magnetic film formed on the inorganic compound film. In the magnetic recording medium, the crystal grains of the first oxide, which constitute the inorganic compound film, have a honeycomb structure. Magnetic particles or magnetic grains of the magnetic layer, which are formed on the inorganic compound film, are epitaxially grown from the crystal grains of the first oxide. Therefore, the magnetic grains of the magnetic layer also have a honeycomb structure. Accordingly, the crystal grains of the magnetic film are allowed to have a fine and minute size, and it is possible to uniformize the grain diameter. Thus, the magnetic recording medium is realized, in which the noise is low and the thermal fluctuation is reduced.

However, according to an experiment performed by the present inventors, when the inorganic compound film is formed on the substrate of the magnetic recording medium described above, an initial growth layer, which is an aggregate or cluster of microcrystals having no regular structure, is initially produced. It has been revealed that the inorganic compound film has to be grown so that it has a certain degree of film thickness, for example, a film thickness of not less than 30 nm until the regular honeycomb structure appears on the inorganic compound film, because of the presence of the initial growth layer. In the present invention, it has been revealed that the occurrence of the initial growth layer portion can be suppressed owing to the use of magnesium oxide as the material for the underlying layer corresponding to the inorganic compound film, especially as the material for constructing the crystal grains, and a satisfactory honeycomb structure can be formed from the initial stage of film formation. Accordingly, the thickness of the underlying layer as well as the thickness of the magnetic recording medium can be made thin. It is possible to shorten the film formation step, and it is possible to decrease the production cost.

When the first oxide, which is disclosed in U.S. patent application Ser. No. 09/478,377, is used for the crystal grains of the underlying layer, the standard deviation a of the crystal grain diameter distribution is not more than 10% of the average grain diameter. On the contrary, when magnesium oxide is used for the crystal grains of the underlying layer in the present invention, the standard deviation a of the crystal grain diameter distribution in the underlying layer has been successfully made to be not more than 8% of the average grain diameter. It is approved that the regularity of the honeycomb structure is high as the number of grains (hereinafter referred to as "number of coordinated grains") which surround one crystal grain of the underlying layer is close to 6.0. When magnesium oxide is used for the material for the crystalline matter, the number of coordinated grains, which is closer to 6.0, has been successfully obtained. That is, the following fact has been revealed. When magnesium oxide is used for the material for the crystalline matter, then the dispersion of the grain diameter of the underlying layer can be further decreased, and it is possible to improve the regularity of the honeycomb structure. Further, the magnetic grains of the magnetic layer to be formed on the underlying layer can be formed with the more uniform grain diameter and the more uniform structure. Therefore, in the magnetic recording medium of the present invention, the noise is low, the thermal fluctuation is low, and the thermal demagnetization is low. Further, the magnetic recording medium may be suitable for the high density recording.

The expression "crystal grains substantially formed of magnesium oxide" used herein means the fact that the crystal grains may be constructed while containing not only magnesium oxide but also any impurity including, for example, oxide or element for constructing the oxide contained in the crystal grain boundary in an amount of about several %, generally in an amount of not more than 5%.

As shown in FIG. 14, the underlying layer may have such a structure that the shape of one crystal grain may be a regular hexagon in a plane parallel to the substrate surface, and the crystal grain may be grown upwardly in a pillar-shaped configuration in a cross section perpendicular to the substrate surface. Especially, the pillar-shaped cross section of the crystal grain is not widened as the underlying layer is grown, having a structure in which the width of the crystal grain boundary is uniform. Therefore, the aggregate of the crystal grains each of which forms a regular hexagonal cylinder forms the honeycomb structure in which the hexagonal cylinders are regularly arranged. Mathematically, the aggregate approximately has a fractal feature, and it can be expressed with the group theory as well. In the underlying layer, one crystal grain having the regular hexagonal configuration may be surrounded by 5.9 to 6.1 individuals of the grains in average.

As explained in an embodiment as described later on, it has been revealed that the grains deposited in the underlying layer and the grain boundary or boundaries therebetween are crystalline and amorphous respectively, by means of the lattice image observation based on the X-ray diffraction method. The standard deviation a of the crystal grain diameter distribution is not more than 8% of the average grain diameter. Further, the grain diameter distribution is a normal distribution. Therefore, it is approved that the regularity of the grain arrangement is extremely high. The crystal grains in the underlying layer has strong crystalline orientation. Therefore, when the magnetic layer is formed on the underlying layer having the structure as described above, for example, it is possible to grow the ferromagnetic magnetic grains having crystalline orientation from the crystal grain portion of the honeycomb structure. On the other hand, it is possible to grow the non-magnetic boundary portion from the crystal grain boundary of the honeycomb structure.

It is preferable that the film thickness of the underlying layer is 3 nm to 50 nm. If the film thickness of the underlying layer is less than 3 nm, it is difficult to stably form the film because of circumstances of a film-forming machine. If the film thickness exceeds 50 nm, then the thickness of the entire underlying layer is increased, and it takes a long period of time to form the film. It is desirable that the spacing distance of the crystal grains (width of the crystal grain boundary) is 0.5 nm to 2 nm, because the honeycomb structure is obtained in a stable manner, and it is possible to sufficiently suppress the magnetic interaction between the magnetic grains. The spacing distance between the crystal grains can be regulated by controlling the concentration of the oxide of inorganic compound existing in the crystal boundary and the composition ratio with respect to magnesium oxide.

It is preferable that the underlying layer is formed by means of the ECR sputtering method which utilizes the resonance discharge based on the use of the microwave as described later on. In the sputtering method, the kinetic energy of the target particle can be uniformized depending on the way of application of the bias voltage, and it is possible to control the energy more precisely. Especially, when the underlying layer is formed by using the ECR sputtering method, the film, which has the desired crystalline orientation and the satisfactory honeycomb structure, is obtained without requiring any complicated sputtering condition.

The magnetic layer, which is formed on the underlying layer, has a similar honeycomb structure reflecting or replicating the structure of the underlying layer. The magnetic grains in the magnetic layer are epitaxially grown in a continuous manner from the top of the crystal grains in the underlying layer. Therefore, when the honeycomb structure of the underlying layer is appropriately adjusted, it is possible to grow the magnetic grains having the desired grain diameter and the desired crystalline orientation thereon. That is, the underlying layer serves to control the grain diameter, the grain diameter distribution, and the crystalline orientation of the magnetic layer. The structure, the orientation, the crystal grain diameter, and other factors of the underlying layer can be controlled, for example, by selecting the concentration (composition) of the crystal grain boundary substance and magnesium oxide for forming the crystal grains, selecting the material for the crystal grain boundary, and selecting the film formation condition.

As for the magnetic layer, the magnetic grains of the magnetic layer can be grown from the crystal grains of the honeycomb structure of the underlying layer. On the other hand, the non-magnetic boundary or boundaries can be grown from the boundary or boundaries of the honeycomb structure of the underlying layer. Therefore, it is possible to provide the structure in which the magnetic grains are magnetically separated from each other. Accordingly, the unit of inversion of magnetization upon recording and reproduction can be reduced, for example, to be 2 or 3 individuals of magnetic grains. It is possible to realize the super high density recording. Further, it is possible to avoid the formation of any zigzag pattern of the boundary between the adjoining recording magnetic domains in the magnetic film, and thus it is possible reduce the noise.

Conventionally, in order to reduce the magnetic interaction between the magnetic grains, any non-magnetic element has been subjected to segregation in the vicinity of the crystal grain boundary in the crystal grain. However, in the present invention, it is possible to grow the non-magnetic portion in the magnetic layer corresponding to the crystal grain boundary which surrounds the regular hexagonal crystal grains in the underlying layer. In this case, the distance between the crystal grains in the underlying layer is controlled to be 0.5 nm to 2 nm, and the magnetic layer is epitaxially grown while reflecting this structure. Thus, it is possible to provide the non-magnetic portion having such a spacing distance in the magnetic layer. The epitaxially grown magnetic grain portion is ferromagnetic, and it has crystalline orientation suitable for the high density recording. On the other hand, the grain boundary, which surrounds the magnetic grain, resides in random orientation even when it is amorphous or crystalline. Therefore, the grain boundary exhibits the non-magnetic or the magnetization different from that of the magnetic grain portion, making it possible to allow the magnetic grains to be magnetically independent from each other. Accordingly, the size of the magnetic domain of the magnetic recording medium can be decreased to be fine and minute up to the magnetic grain size.

It is desirable for the magnetic layer to use an alloy principally containing cobalt and further containing at least two elements selected from the group consisting of chromium, platinum, tantalum, niobium, titanium, and silicon. For example, it is possible to use a film of CoCrPt or CoCrPtTa. The magnetic grain in the magnetic layer is composed of a cobalt alloy, and it may be composed of a crystalline material. The boundary between the magnetic grains may contain at least one element selected from the group consisting of chromium, tantalum, niobium, titanium, and silicon, and it may be composed of a polycrystalline material. The magnetic layer may be a multilayered film such as Co/Pt.

It is also preferable for the magnetic layer to use a magnetic film having a granular structure composed of two phases of a crystalline phase and an amorphous phase. In this case, the crystalline phase principally contains cobalt, and it further contains at least one element selected from the group consisting of neodymium, praseodymium, yttrium, lanthanum, samarium, gadolinium, terbium, dysprosium, holmium, platinum, and palladium. As for the amorphous phase, a phase of at least one compound selected from silicon oxide, zinc oxide, tantalum oxide, and aluminum oxide may exist to surround the crystal grains. For example, $Co-SiO_2$ may be used. When the magnetic layer is formed as a film, cobalt grains may be grown as oxide corresponding to the crystal grain boundary on the crystal grains of the underlying layer formed by means of the ECR method.

According to a second aspect of the present invention, there is provided a magnetic recording medium comprising:

a substrate;

a first underlying layer which is formed on the substrate;

a second underlying layer which is formed on the first underlying layer; and a magnetic layer which is formed on the second underlying layer and on which information is recorded, wherein:

the second underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, zinc oxide, and magnesium oxide; and the first underlying layer serves as a layer to prevent the second underlying layer from initial growth.

The magnetic recording medium according to this aspect is provided with only the first underlying layer having a minute thickness of about several nanometers between the substrate and the second underlying layer including the crystal grain boundary and the group of crystal grains substantially formed of the oxide as described above. Thus, it is possible to substantially suppress the occurrence of the initial growth layer on the second underlying layer. Accordingly, it is possible to thin the thickness of the entire underlying layer as well as the thickness of the magnetic recording medium. It is possible to shorten the step of forming the film, and it is possible to decrease the production cost. Further, an advantage is also obtained such that the performance of tight contact between the substrate and the magnetic layer is enhanced owing to the provision of the first underlying layer.

It has been revealed that when the first underlying layer is provided between the substrate and the second underlying layer, the second underlying layer grows while reflecting the crystal structure of the first underlying layer and/or the morphology of the surface of the first underlying layer. For this reason, if the second underlying layer is grown on the substrate without providing the first underlying layer, the standard deviation a of the crystal grain diameter distribution of the second underlying layer is not more than 10% of the average grain diameter. On the contrary, in the case of the present invention, the standard deviation $\sigma$ of the crystal grain diameter distribution of the second underlying layer has been successfully not more than 8% of the average grain diameter. It is approved that the regularity of the honeycomb structure is high as the number of grains (hereinafter referred to as "number of coordinated grains") which surround one crystal grain of the second underlying layer is close to 6.0. When the first underlying layer is provided, the number of coordinated grains, which is closer to 6.0, has been successfully obtained. That is, the following fact has been revealed. The grain size distribution and the number of coordinated grains can be controlled by forming the first underlying layer on the substrate. Further, the magnetic grains of the magnetic layer, which are formed on the second underlying layer, can be also formed to have a more uniform grain size and a more uniform structure.

The phrase "crystal grains substantially formed of at least one oxide selected from the group consisting of cobalt oxide, chromium oxide, iron oxide, nickel oxide, and magnesium oxide" herein means the fact that the crystal grains may be constructed while containing not only the at least one oxide selected from the group consisting of cobalt oxide, chromium oxide, iron oxide, nickel oxide, and magnesium oxide but also any impurity including, for example, oxide or element for constructing the oxide contained in the crystal grain boundary in an amount of about several %.

In the present invention, an amorphous film or a crystalline film may be used as the first underlying layer. When the amorphous film is used, those usable for the amorphous film include:

(1) a metal selected from the group consisting of hafnium, titanium, tantalum, niobium, zirconium, tungsten, molybdenum, and an alloy containing at least one element of them;

(2) a cobalt alloy principally composed of cobalt and containing at least one element selected from the group consisting of titanium, tantalum, niobium, zirconium, and chromium; or (3) at least one inorganic compound selected from the group consisting of silicon nitride, silicon oxide, and aluminum oxide. When the inorganic compound is used, it is allowable to further contain at least one metal selected from the group consisting of hafnium, titanium, tantalum, niobium, zirconium, chromium, and aluminum. When the material as described above is used, the second underlying layer can be epitaxially grown from the top of the first underlying layer more appropriately without substantially growing the initial growth layer as an aggregate of microcrystals.

On the other hand, when the crystalline film is used for the first underlying layer, the crystalline film may be composed of at least one selected from the group consisting of chromium, chromium alloy, vanadium, and vanadium alloy. In this case, the alloy may contain at least one element selected from the group consisting of titanium, tantalum, aluminum, nickel, vanadium, and zirconium. When the element as described above is added, the lattice constant of crystalline chromium or vanadium can be controlled to precisely control the crystalline structure of the second underlying layer to be formed on the first underlying layer.

When the first underlying layer is the crystalline film, it is most preferable to use the hcp (Hexagonal Closest Packing) or bcc (Body-Centered Cubic) structure, because of the following reason. That is, such a structure is a structure which is the same as or similar to the crystal structure of the magnetic layer. Therefore, it is possible to facilitate the epitaxial growth of the magnetic grains of the magnetic layer from the top of the crystal grains of the underlying layer. According to the knowledge of the present inventors, it has been revealed that the second underlying layer is grown while reflecting the crystal structure of the first underlying layer and/or the morphology of the surface of the first underlying layer. Therefore, it is preferable that the crystal structure of the first underlying layer is appropriately selected while considering the crystal structure of the second underlying layer intended to be formed thereon.

In the magnetic recording medium of the present invention, the second underlying layer contains, as the crystal grains, at least one oxide selected from the group consisting of cobalt oxide, chromium oxide, iron oxide, nickel oxide, and magnesium oxide. The grain boundary, which surrounds the crystal grains, is composed of at least one oxide selected from the group consisting of silicon oxide, aluminum oxide, titanium oxide, tantalum oxide, and zinc oxide.

As shown in FIG. 3, the second underlying layer may have the following structure. That is, the shape of one crystal grain is a regular hexagon as viewed in a plane parallel to the substrate surface. The crystal grains are grown upwardly in a pillar-shaped configuration as viewed in a cross section perpendicular to the substrate surface of the second underlying layer. Especially, the pillar-shaped cross section of the crystal grain is not widened in a sector form even when the second underlying layer is grown, giving such a structure that the width of the grain boundary is uniform. Therefore, the aggregate of the crystal grains, in which one crystal grain forms a regular hexagonal cylinder, forms a honeycomb structure in which the hexagonal cylinders are regularly arranged. In the same manner as in the underlying layer in the first aspect of the present invention, the honeycomb structure mathematically has a fractal feature although in an approximate manner, and it can be expressed with the group theory. One crystal grain having the regular hexagonal configuration may be surrounded by 5.8 to 6.2 individuals of the grains in average.

As explained in embodiments as described later on, according to the analysis based on the X-ray diffraction method, the grains deposited in the second underlying layer and the grain boundary thereof are crystalline and amorphous respectively. The standard deviation a of the crystal grain diameter distribution is not more than 8% of the average grain diameter. Further, the grain diameter distribution is a normal distribution. Therefore, the regularity of the grain arrangement is extremely high. Further, the crystal grains in the second underlying layer have strong crystalline orientation. Therefore, when the magnetic layer is formed on the second underlying layer having the structure as described above, for example, the magnetic grains, which are ferromagnetic and subjected to crystalline orientation, can be grown from the crystal grain portions of the honeycomb structure on the other hand, the non-magnetic boundary portion can be grown from the crystal grain boundary of the honeycomb structure.

It is preferable that the first underlying layer has a film thickness of 2 nm to 50 nm. If the film thickness of the first underlying layer is less than 2 nm, it is impossible to expect the effect of the provision of the first underlying layer. If the film thickness of the first underlying layer exceeds 50 nm, then the thickness of the entire underlying layer is increased, and it takes a long period of time to form the film. It is preferable that the second underlying layer has a film thickness of 3 nm to 100 nm. If the film thickness of the second underlying layer is less than 3 nm, the good epitaxial growth of the magnetic layer scarcely takes place from the top of the underlying layer. If the film thickness of the second underlying layer exceeds 100 nm, then the thickness of the entire underlying layer is increased, and it takes a long period of time to form the film. It is preferable that the entire film thickness of the first and second underlying layers is 3 nm to 100 nm. It is desirable that the spacing distance between the crystal grains (width of the crystal grain boundary) is 0.5 nm to 2 nm, because such a spacing distance is sufficient to block the magnetic interaction between the magnetic grains in the magnetic layer formed on the underlying layer, the bulk density of the formed magnetic film is appropriate, and the recording density is improved.

According to a third aspect of the present invention, there is provided a magnetic recording medium comprising:
a substrate;
an underlying layer which is formed on the substrate;
a control layer which is formed on the underlying layer and which is formed of at least one selected from the group consisting of magnesium oxide, chromium alloy, and nickel alloy; and
a magnetic layer which is formed on the control layer and on which information is recorded, wherein:
the underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide. In the underlying layer, the respective crystal grains may have a hexagonal configuration, and they may be arranged in a honeycomb form.

According to en experiment performed by the present inventors, when the magnetic layer is formed on the underlying layer of the magnetic recording medium described above, the lattice constants of these layers are deviated from each other depending on the combination of materials for constructing the underlying layer and the magnetic layer. For this reason, the magnetic layer failed to be epitaxially grown on the underlying layer in a well-suited manner in some cases. Further, when the underlying layer is formed, it is difficult to effect complete phase separation for the crystal grains and the amorphous substance existing in the grain boundary thereof. The crystal grains are mixed with the amorphous substance in an amount of about 3 to 5% in some cases. For example, in the case of a CoO—SiO$_2$ film having the honeycomb structure, it has been revealed by the $\mu$-Auger analysis that several % of SiO$_2$ may be contained in CoO in the crystal grain, while CoO may be contained in SiO$_2$ of the amorphous substance. Therefore, even when an appropriate combination of materials is selected for the underlying layer and the magnetic film, the amorphous substance exists in the crystal grains in a mixed manner as described above. For this reason, the lattice constant of the crystal grain of the actually formed film is deviated from the original lattice constant which is expected to be obtained when no impurity exists. As a result, a situation has been probably caused, in which the lattice match is not obtained sufficiently between the crystal grains of the underlying layer and the magnetic grains of the magnetic layer. It has been revealed that if the deviation of crystal lattice occurs in an amount of not less than ±10% as represented by the difference in lattice constant, then the coercive force of the magnetic grains of the magnetic layer formed on the underlying layer is decreased, and it is impossible to obtain desired magnetic characteristics. It has been also revealed that if the discrepancy of the crystal lattice is further increased, then the honeycomb structure of the underlying layer is not reflected to the magnetic layer, the magnetic grains are not formed in the magnetic layer, and a polycrystalline structure is obtained as a whole.

In the present invention, the control layer (lattice constant control layer) for adjusting the discrepancy of the crystal lattices of the layers is provided between the underlying layer and the magnetic layer. Accordingly, the decrease in coercive force and the change of magnetic characteristic, which would be otherwise caused by the discrepancy of the crystal lattice, have been successfully suppressed in a substantial manner. When the control layer, in which the material is selected so that the discrepancy of the crystal lattice between the underlying layer and the control layer and between the control layer and the magnetic layer is decreased, for example, the discrepancy is within ±5% as represented by the difference in lattice constant of each of them, is provided, the magnetic grains of the magnetic layer can be epitaxially grown while reliably reflecting the honeycomb structure of the underlying layer. Therefore, the grain diameter of the magnetic grains of the magnetic layer can be made fine and minute by reflecting the crystal grain diameter of the underlying layer, and the magnetic grains can be surrounded by the non-magnetic boundary portion of the magnetic layer corresponding to the crystal grain boundary of the underlying layer. Accordingly, it is possible to reduce the magnetic interaction between the magnetic grains. Thus, it is possible to produce the magnetic recording medium which is suitable for the high density recording.

It is preferable to use at least one selected from the group consisting of magnesium oxide, chromium alloy, and nickel alloy for the control layer of the magnetic recording medium of the present invention. Especially, it is preferable that the control layer is formed of chromium-titanium, chromium-tungsten, magnesium oxide, or chromium-ruthenium. In the present invention, it is preferable to use, for the chromium alloy or the nickel alloy, a material containing at least one element selected from the group consisting of chromium, titanium, tantalum, vanadium, ruthenium, tungsten, molybdenum, niobium, nickel, zirconium, and aluminum, other than chromium or nickel as the base element.

It is most preferable to adopt the bcc structure or the B2 structure for the control layer. The structure is closely similar to the crystal structure of the magnetic layer to be used for the magnetic recording medium. Therefore, the lattice match is achieved between the control layer and the magnetic layer. The magnetic layer can be epitaxially grown from the control layer with ease. It is preferable to appropriately select the composition of the control layer while considering the compositions of the underlying layer and the magnetic layer so that the lattice constant of the crystal lattice of the control layer simultaneously has an approximately intermediate value between those of the underlying layer and the magnetic layer. By doing so, even when the crystal lattice of the underlying layer is different from that of the magnetic layer, it is possible to mitigate the difference by the aid of the control layer.

When the control layer is formed, it is preferable that the control layer is epitaxially grown from the underlying layer. As for the control layer, the crystalline portion is epitaxially grown from the crystal grain portion of the underlying layer, and the crystal structure or the polycrystal, which is different from the crystal grain portion, is grown from the amorphous crystal grain boundary of the underlying layer. Further, when the magnetic layer is continuously grown from the control layer, the lattice deviation between the control layer and the magnetic layer can be decreased by appropriately selecting the structure and the composition of the control layer. Therefore, the epitaxial crystal growth is facilitated, and thus an effect is obtained such that the growth of the magnetic layer is facilitated. The structure of the magnetic layer formed as described above reflects the honeycomb structure of the underlying layer. The magnetic grain diameter and the grain diameter distribution of the magnetic layer can be made substantially equal to the crystal grain diameter and the grain diameter distribution of the underlying layer. Further, the control layer also has such an effect that the adhesion force between the substrate and the magnetic layer is improved.

As described above, the underlying layer has the honeycomb structure such that the shape of one crystal grain is a regular hexagon in the plane parallel to the substrate surface of the underlying layer, and the crystal grain is grown upwardly in a pillar-shaped configuration in the plane perpendicular to the substrate surface. The magnetic layer, which is formed on the underlying layer, has a similar honeycomb structure which reflects the structure of the underlying layer. Further, the magnetic grains in the magnetic layer are epitaxially grown in the continuous manner from the top of the crystal grains in the underlying layer by the aid of the crystal grains in the control layer. Therefore, the magnetic grains, which have a desired grain diameter and crystalline orientation, can be grown in the magnetic layer to be formed on the underlying layer with the control layer intervening therebetween, by appropriately adjusting the honeycomb structure of the underlying layer.

That is, the underlying layer serves to reduce the magnetic interaction between the magnetic grains by controlling the magnetic grain diameter, the magnetic grain diameter distribution, and the orientation of the magnetic layer to be formed on the underlying layer with the control layer intervening therebetween, and growing the non-magnetic boundary portion from the crystal grain boundary having the uniform width. On the other hand, the control layer has the following effect. That is, the control layer reliably reflects the honeycomb structure of the underlying layer to the magnetic layer to facilitate the epitaxial growth by ensuring the lattice match between the crystal grains of the underlying layer and the magnetic grains of the magnetic layer. Thus, the control layer avoids the decrease in coercive force of the magnetic layer and the change of magnetic characteristics.

It is preferable that the underlying layer and the control layer are formed in accordance with the ECR sputtering method which utilizes the resonance discharge based on the used of the microwave. It is preferable that the film thickness of the underlying layer is 2 nm to 50 nm. If the film thickness of the underlying layer is less than 2 nm, it is difficult for the magnetic grains of the magnetic layer to cause the epitaxial growth in a well-suited manner. If the film thickness of the underlying layer exceeds 50 nm, then the thickness of the underlying layer is increased, and it takes a long period of time to form the film. It is preferable that the film thickness of the control layer is 2 nm to 10 nm. If the film thickness of the control layer is less than 2 nm, it is impossible to obtain the film which has the good crystal structure. If the film thickness of the control layer exceeds 10 nm, then the entire thickness is increased, and it takes a long period of time to form the film. Accordingly, considering the fact that the two layers are used for the underlying base for forming the magnetic layer for the magnetic recording medium, it is most preferable that the film thickness of the two layers is 5 nm to 100 nm.

It is preferable that the crystal structures of the underlying layer and the control layer and the crystal structures of the control layer and the magnetic layer are similar to one another. That is, it is preferable that any one of crystal forms of the crystal grains of the underlying layer and the control layer and any one of crystal forms of the magnetic layer (for example, the crystal structure, the crystal shape, and the crystal size) are substantially equal to one another, and the differences in lattice constant between the underlying layer and the control layer and between the control layer and the magnetic layer are within ±5% respectively. Accordingly, the magnetic grains of the magnetic layer can be epitaxially grown in a well-suited manner from the top of the crystal grains of the underlying layer while reflecting the honeycomb structure of the underlying layer with the crystal grains of the control layer intervening therebetween. Therefore, in the present invention, even when the difference in lattice constant between the underlying layer and the control layer is not less than ±10%, the uniform and fine magnetic grains can be epitaxially grown in the magnetic layer while mitigating the difference by providing the plurality of layers for adjusting the lattice plane between the underlying layer and the magnetic layer. The number of control layer is not limited to single. A plurality of control layers may be provided to disperse the difference in lattice constant between the underlying layer and the magnetic layer at boundaries between the respective layers.

In the present invention, preferred combinations of materials for constructing the stack of the underlying layer/ control layer/magnetic layer include CoO—ZnO/Cr—Ti alloy/Co—Cr—Pt alloy, CoO—SiO$_2$/MgO/Co—Cr—Pt— Ta alloy, CoO—SiO$_2$/Cr—W alloy/Co—Cr—Pt—Ta alloy, CoO—SiO$_2$/MgO/Co—SiO$_2$ granular type magnetic film, CoO—SiO$_2$/Ni—Al alloy/Co—Cr—Pt—Ta alloy, CoO— SiO$_2$/Cr—Ti alloy/Co—Cr—Pt—Ta alloy, CoO—SiO$_2$/ Ni—Ta alloy/Co—Pt—SiO$_2$ granular type magnetic film, CoO—SiO$_2$/Ni—Ta alloy/Co—Cr—Pt—Ta alloy, CoO— SiO$_2$/Cr—Ru alloy/Co—Cr—Pt—Ta alloy, CoO—SiO$_2$/ Cr—Ru alloy/Co—Pt—SiO$_2$ granular type magnetic film, CoO—SiO$_2$/Co—Cr—Zr alloy/Co—Pt—SiO$_2$ granular type magnetic film, CoO—SiO$_2$/Co—Cr—Zr alloy/Co— Cr—Pt—Ta alloy, CoO—SiO$_2$/Cr—Mo alloy/Co—Cr— Pt—Ta alloy, and CoO—SiO$_2$/Cr—Mo alloy/Co—Pt—SiO$_2$ granular type magnetic film. When such a combination is selected, then the structure and the grain diameter distribution of the magnetic grains of the magnetic layer can be controlled more appropriately to produce the magnetic recording medium which is suitable for the high density recording.

According to a fourth aspect of the present invention, there is provided a magnetic recording medium comprising:
a substrate;
an underlying layer which is formed on the substrate; and
a magnetic layer which is formed on the underlying layer and on which information is recorded, wherein:
the underlying layer is composed of crystal grains and a crystal grain boundary which surrounds the respective crystal grains, the crystal grains being arranged in a honeycomb configuration; and
the crystal grains protrude at a height of 3 to 20 nm from a surface of the underlying layer.

As for the texture of the surface desirable for the high density recording, it is desirable that the distance value, which ranges from the surface of the magnetic recording medium or the convex portion (apex) of the magnetic layer to the convex portion (apex) nearest to the foregoing convex portion, is smaller than the upper limit value of the control limit of the flying amount of the magnetic head. Further, it is desirable that the protruding amount (height) of the convex portion of the magnetic layer or the surface of the magnetic recording medium, i.e., the distance from the apex of the magnetic layer or the surface of the magnetic recording medium to the valley nearest to the apex is smaller than the upper limit value of the control limit of the flying amount of the magnetic head. In the magnetic recording medium of the present invention, as shown in FIG. 8, the underlying layer is provided with the crystal grains (12) which protrude by the height (16) of 3 to 20 nm from the surface of the underlying layer (surface of the crystal grain boundary 14). Therefore, the magnetic recording medium of the present invention satisfies the demand as described above. The underlying layer having such a structure may be formed while appropriately controlling the sputtering condition by using the ECR sputtering method. It is desirable that the crystal grain of the underlying layer is substantially formed of at least one oxide selected from the group consisting of cobalt oxide, chromium oxide, iron oxide, nickel oxide, and magnesium oxide, and the crystal grain boundary is composed of at least one oxide selected from the group consisting of silicon oxide, aluminum oxide, titanium oxide, tantalum oxide, and zinc oxide. It is desirable that the underlying layer has a film thickness of 10 nm to 100 nm. The magnetic layer or a protective layer which may be formed thereon may have projections protruding by a height of 3 to 20 nm from a surface of the magnetic layer or a surface of the protective layer while reflecting a surface structure of the underlying layer. The projections may be used as a texture of the magnetic recording medium. Considering the size of the crystal grains, it is desirable that a distance between the adjoining projections is 10 to 30 nm. When the distance is within the range as described above, the projections also function as the texture in a well-suited manner.

According to a fourth aspect of the present invention, there is provided a magnetic recording medium comprising:
a substrate;
an underlying layer which is formed on the substrate; and
a magnetic layer which is formed on the underlying layer, wherein:
the underlying layer has soft magnetization, and the underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide.

The magnetic recording medium according to this aspect is provided with the underlying layer having the two features as described below between the substrate and the magnetic layer. The first feature of the underlying layer is that the underlying layer has the structure in which the plurality of crystal grains are surrounded by the crystal grain boundary respectively and they are regularly arranged in the honeycomb configuration as described above. In the present invention, when the magnetic layer is stacked on the underlying layer as described above, the regular honeycomb structure of the magnetic grains can be brought about for the magnetic layer by reflecting the honeycomb structure of the underlying layer.

The second feature of the underlying layer is that the underlying layer is provided with the soft magnetization. The underlying layer having the soft magnetization functions as a keeper layer as described above. Therefore, it is possible to suppress the demagnetization which would be otherwise caused by the diamagnetic field of the recording magnetization area of the magnetic layer, and it is possible to stably retain the recorded magnetization state of the magnetic recording medium. Further, it is also possible to thin the film thickness of the magnetic layer. Therefore, when the underlying layer as described above is provided, it is possible to realize the magnetic recording medium which is excellent in long term storage performance.

In order to allow the underlying layer to have the soft magnetization, the composition of the crystal grain in the underlying layer may be appropriately changed. For example, in the case of a CoO—SiO$_2$ film used in an embodiment described later on, the soft magnetization can be generated by progressively deviating the composition of the crystal grain principally composed of CoO from the stoichiometric composition (X≠0 in the case of expression with CoO$_{1-x}$), i.e., by allowing Co to exist in the CoO film. This can be achieved, for example, by using a sputtering gas of a mixed gas (reducing atmosphere) including Ar gas mixed with H$_2$ in an amount of about 1%, when the underlying layer is formed by means of sputtering. The metal Co atom having magnetization is generated in CoO as described above, and thus the soft magnetization is successfully brought about for the underlying layer. As for the soft magnetization of the underlying layer, it is preferable that the underlying layer has a coercive force of 0.05 (Oe) to 10 (Oe) (about 3.95 A/m to about 790 A/m) and a relative permeability of 500 to 10000, in order that the underlying layer functions as the keeper layer.

When the keeper layer is provided for the magnetic recording medium, problems arise concerning the recording sensitivity and the reproducing sensitivity as described above. In the present invention, taking notice of the fact that the underlying layer having the soft magnetization has a relatively low Curie temperature, the area, on which information is to be recorded, is irradiated with a convergent light beam when the magnetic recording medium is subjected to recording (or reproduction) to apply a recording magnetic field to the area in a state in which the temperature of the area is locally raised. In this case, the coercive force is lowered in the area irradiated with the light beam due to the increase in temperature. When the temperature exceeds the Curie temperature, the magnetization of the area disappears. In this state, the magnetic recording medium is effectively equivalent to a magnetic recording medium in which the underlying layer as the keeper layer does not exist. That is, in the present invention, although the underlying layer exists, it is enough to use a small recording magnetic field in order to generate the inversion of magnetization. Also during the reproduction, a reproducing magnetic field is applied while irradiating an information-reproducing area with light. When such a reproducing method (light assist reproducing method) is used, it is possible to detect the magnetization information at a high sensitivity for the leak magnetic field from the magnetic layer without being inhibited by the keeper layer. When the recording or the reproduction is completed, and the temperature of the area in which the information is recorded or reproduced is lowered, then the coercive force is gradually increased, and the underlying layer restores the soft magnetization. At the room temperature, the direction of magnetization of the underlying layer is directed in a direction opposite to the direction of magnetization of the magnetic layer due to the leak magnetic field generated from the boundary of the area of inversion of magnetization of the magnetic layer, i.e., the area having the different direction of magnetization, and the annular magnetic path is formed through the magnetic layer and the underlying layer. Therefore, the recording magnetization state is stabilized.

According to a sixth aspect of the present invention, there is provided a magnetic recording medium comprising:

a substrate;

an underlying layer which is formed on the substrate; and a magnetic layer which is formed on the underlying layer and which has a magnetization-prompt direction in a direction perpendicular to a substrate surface, wherein:

the underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide.

The magnetic recording medium of this aspect is provided with the underlying layer composed of the crystal grains substantially formed of the specified oxide and the crystal grain boundary containing the specified oxide for surrounding the respective crystal grains, the underlying layer being disposed between the substrate and the magnetic layer (recording layer) for recording information thereon. As for the underlying layer, it is possible to freely control the diameter and the distribution of the crystal grains of the material for constructing the magnetic layer. Therefore, it is possible to reduce the noise generated from the magnetic recording medium. In general, the noise, which is generated from the magnetic recording medium, includes a component which is generated even after the direct current demagnetization irrelevant to the recording density, and a component which is increased in accordance with the increase in recording density. It has been revealed for the perpendicular magnetic recording medium that the noise, which is generated even after the direct current demagnetization, is decreased by strengthening the perpendicular magnetic anisotropy of the magnetic layer having the perpendicular magnetization to increase the horny ratio of the magnetization curve in the vertical direction. Accordingly, investigation has been made for the component as the other noise component which is increased in accordance with the increase in recording density, in a state in which the noise, which is generated even after the direct current demagnetization, is reduced by means of the method as described above. As a result, it has been revealed that the latter noise is principally generated in the area of inversion of magnetization (boundary between adjoining recording magnetic domains).

The noise, which is generated in the area of inversion of magnetization, results from the fact that the crystal grains of the material for constructing the magnetic layer are large. That is, when the size of the crystal grain is large, then the area of inversion of magnetization is decreased in the circumferential direction of the disk-shaped recording medium, and the area of inversion of magnetization has a zigzag form. Therefore, in order to reduce the noise generated in the area of inversion of magnetization, it is desirable that the size of the crystal grain is small. However, if the crystal grain diameter is extremely small to be about several nm, the crystal grains undergo the diamagnetic field for a long period of time when the magnetic recording medium is stored for the long period of time. As a result, the magnetization is decreased due to the demagnetization action of thermal fluctuation, and the reproduction output is decreased when information is reproduced. Therefore, it is necessary that the crystal grain diameter has an appropriate size, and it is desirable that the distribution thereof is as small as possible as well. Even when the size of the crystal grain is decreased, if the magnetic interaction between the crystal grains is large, then the same state is magnetically given as the state in which large crystal grains exist. Therefore, in order to reduce the noise, it is desirable that the crystal grains are magnetically isolated.

Accordingly, in the present invention, in order to realize the state as described above, the underlying layer is provided between the substrate and the magnetic layer. The crystal grains are composed of at least one of cobalt oxide, chromium oxide, iron oxide, nickel oxide, and magnesium oxide. The crystal grain boundary is composed of at least one oxide of silicon oxide, aluminum oxide, titanium oxide, tantalum oxide, and zinc oxide. In the underlying layer as described above, the size of the crystal grains composed of deposited cobalt oxide, chromium oxide, iron oxide, or nickel oxide is constant in accordance with the film formation condition when the underlying layer is formed as the film on the substrate. Further, the crystal grains may be arranged in a honeycomb configuration. That is, the respective deposited crystal grains have the regular hexagonal shape in a plane parallel to the substrate surface and they are pillar-shaped in a cross section perpendicular to the substrate surface of the underlying layer. The crystal grains, each of which forms the regular hexagonal cylinder, may be gathered into an aggregate to form a honeycomb structure in which the regular hexagonal cylinders are regularly arranged.

When the magnetic layer is formed on the underlying layer as described above, the honeycomb structure, which is similar to that of the underlying layer, is formed on the formed magnetic layer while reflecting the structure of the underlying layer. The crystal grains in the magnetic layer are epitaxially grown continuously from the top of the crystal grains in the underlying layer. Therefore, the magnetic grains, which have the desired grain diameter and the desired crystalline orientation, can be grown on the underlying layer by appropriately adjusting the honeycomb structure of the underlying layer. As described above, the underlying layer has the action to control the grain diameter, the grain diameter distribution, and the crystalline orientation of the magnetic layer. Therefore, it is possible to realize the fine and minute crystal grain diameter of the magnetic layer, and it is possible to eliminate the dispersion of the grain diameter. It is possible to decrease the thermal fluctuation and the noise of the magnetic recording medium resulting from the above. Further, the area of inversion of magnetization in the magnetic layer is prevented from formation of the zigzag pattern. Therefore, it is possible to reduce the noise. In order to control, for example, the structure, the orientation, and the crystal grain diameter of the underlying layer, for example, selection may be made appropriately and preferably, for example, for the concentration (composition) of the oxide for forming the crystal grains and the crystal grain boundary substance, the material for the crystal grain boundary, and the film formation condition.

In the present invention, it is desirable that the crystal grains of the underlying layer are oriented in (111) orientation, because of the following reason. That is, when the magnetic layer is formed on the underlying layer oriented in the orientation described above, the magnetic layer can be easily oriented in (00.1) orientation. The magnetic layer, which is oriented in (00.1) orientation, exhibits the perpendicular magnetization.

In the magnetic recording medium of the present invention, it is desirable that the magnetic layer is composed of, for example, an alloy principally containing Co and containing at least two elements selected from Cr, Pt, Ta, Nb, Ti, and Si. It is desirable that the alloy as described above exhibits the ferromagnetic property. The alloy as described above has a large leak magnetic field because the saturation magnetization is large, making it possible to increase the obtained reproduced signal.

It is preferable that the magnetic recording medium of the present invention is provided with a control layer in order to reinforce the orientation of the magnetic layer, the control layer being disposed between the underlying layer and the magnetic layer. The control layer may be composed of Ti or an alloy principally containing Ti. When such a control layer is provided, it is possible to give a desired magnetization-prompt direction to the magnetic layer. Therefore, it is possible to obtain better characteristics. In this case, the shape, the size, and the arrangement of the crystal grains of the control layer follow those of the underlying layer. Therefore, the shape, the size, and the arrangement of the crystal grains of the underlying layer are also inherited by the magnetic layer which is formed on the control layer.

It is preferable that the magnetic recording medium of the present invention comprises a soft magnetic layer which is provided between the substrate and the underlying layer. It is preferable that the soft magnetic layer is composed of an amorphous material. Those preferably usable for such a material include, for example, CoNbZr, FeCoZrB, and FeCoSiB. It is desirable that the material for constructing the soft magnetic layer has the following magnetic characteristics. That is, the magnetic characteristics make it possible to allow the magnetic flux to pass sufficiently and avoid any change of the recording state of the recording layer, which would be otherwise caused such that the external magnetic field is amplified by the magnetic path formed by the magnetic head and the magnetic recording medium. For example, it is desirable that the coercive force is 5 (Oe) (about 400 A/m), and the magnetic permeability is not less than 100 and not more than 10000.

According to an eighth aspect of the present invention, there is provided a magnetic recording apparatus comprising the magnetic recording medium in accordance with any one of the first to seventh aspects of the present invention.

According to a ninth aspect of the present invention, there is provided a method for producing a magnetic recording medium comprising, on a substrate, a magnetic layer for recording information thereon and a protective layer, the method comprising:

generating plasma by means of resonance absorption;

allowing the generated plasma to collide with a target so that target particles are sputtered; and applying a bias voltage between the substrate and the target to introduce and deposit the sputtered target particles on the substrate so that at least one layer of the magnetic layer and the protective layer is formed.

In the present invention, the particles such as electrons are accelerated by means of the resonance absorption of the energy of the electromagnetic wave such as a microwave, and they collide with the gas to cause ionization of the gas. Thus, the plasma having high energy is generated. The particles, which constitute the plasma, have the high energy, and the energy of each of the particles is uniform as compared with ordinary plasma generated by electric discharge or the like. The plasma, in which the energy distribution is narrow, is obtained. The plasma collides with the target by the aid of the bias voltage to drive out the target particles. During this process, the kinetic energy of the plasma to collide with the target, and consequently the kinetic energy of the target particles driven out by the plasma can be precisely controlled by changing the bias voltage. The target particles, in which the energy is controlled as described above, are directed toward the substrate as the flow of the target particles, and they are successfully deposited on the substrate uniformly with an equivalent film thickness. When this method is used to produce the magnetic recording medium, it is possible to make control and obtain a desired value for any one the density of the thin film to be formed, the flatness of the surface, the crystalline orientation, the orientation of crystal growth, the crystal structure, and the crystal grain diameter by appropriately selecting the material and the film formation condition. Further, when this method is used to form thin films of two or more layers, it is possible to suppress the mutual substrate diffusion between the thin films. For example, when the protective layer is formed on the magnetic layer by means of this method, it is possible to avoid any damage of magnetic characteristics of the magnetic layer, which would be otherwise caused by the diffusion of the component of the magnetic grain to the protective layer. Additionally, when this technique is used, it is possible to reduce the crystalline deficiency in the thin film. Accordingly, it is possible to form a dense film, and it is possible to obtain crystals which is strongly oriented in a constant orientation.

When the electrons are excited by means of the resonance absorption, it is also possible to use an electromagnetic wave in a region other than the region of the microwave. However, it is preferable to use the microwave. Further, it is preferable to use an alternating current power source having a radio frequency (RF) or a direct current power source (DC) as a bias power source which is used to control the kinetic energy of the plasma and the target particles to have a constant value. For example, when a conductive material such as carbon is subjected to ECR sputtering, it is possible to use the DC power source on the other hand, when a nonconductive material such as silicon oxide is subjected to ECR sputtering, it is possible to use the RF power source. The selection of the use of either the DC power source or the RF power source as the bias power source is determined depending on the characteristics and the structure of the thin film intended to be obtained.

In this specification, the term "resonance absorption" refers to a phenomenon in which the particle, which performs the periodic motion, absorbs the energy of the electromagnetic wave, and the amplitude in the periodic motion of the particle, i.e., the energy possessed by the particle is remarkably increased, when the angular frequency of the particle which receives the action of the external force and which performs the periodic motion at the specified angular frequency is approximately coincident with the frequency of the electromagnetic wave incoming from the outside.

When the protective layer is formed as described above, then the target may be carbon, and a mixed gas, which principally contains argon and which contains at least one of nitrogen and hydrogen, may be used as a plasma gas. When the protective film is formed by using the method of the present invention, it is possible to obtain the protective film having a uniform film thickness of 1 to 5 nm. Further, it is possible to obtain the protective film having a density of 60% of the theoretical density.

According to a tenth aspect of the present invention, there is provided a method for producing a magnetic recording medium comprising, on a substrate, an underlying layer and a magnetic layer for recording information thereon, the method comprising:

generating plasma by means of resonance absorption;
allowing the generated plasma to collide with a target so that target particles are sputtered; and
applying a bias voltage between the substrate and the target to introduce and deposit the sputtered target particles on the substrate so that the underlying layer is formed.

In the production method according to the tenth aspect of the present invention, the underlying layer is formed by using the so-called ECR sputtering method prior to the formation of the magnetic layer. When the magnetic layer is formed on the underlying layer, it is possible to more precisely control at least one of the parameters of the crystal structure of the magnetic layer, the crystalline orientation, the crystal grain diameter, the grain diameter distribution, and the density and the surface flatness of the formed film. Accordingly, it is possible to produce the magnetic recording medium which makes it possible to perform the super high density recording.

The underlying layer is composed of an amorphous portion and a crystalline portion comprising crystal grains having a uniform grain diameter, by forming the film by using the ECR sputtering method described above, making it possible to provide a structure in which the crystal grains are separated from each other by the amorphous portion (crystal grain boundary) having a uniform width. Further, when the ECR sputtering method described above is used, the crystal grains of the underlying layer can be oriented in a constant crystalline orientation. As for the structure of the underlying layer, when the ECR sputtering method described above is used, it is possible to control, for example, the crystal grain diameter, the width of the grain boundary, and the crystalline orientation by changing the material and the film formation condition. It is possible to form a desired structure. For example, in an embodiment described later on, an underlying layer has been successfully formed, in which hexagonal crystal grains are regularly arranged in a honeycomb configuration with a crystal grain boundary intervening therebetween. The number of crystal grains deposited around one crystal grain is 5.9 to 6.1. The underlying layer, which has an extremely regular honeycomb structure, has been successfully formed. The underlying layer as described above can be formed such that the crystal grains are formed with cobalt oxide, chromium oxide, magnesium oxide, iron oxide, nickel oxide, or a combination of these oxides, and the crystal grain boundary is formed with silicon oxide, aluminum oxide, titanium oxide, tantalum oxide, zinc oxide, or a combination of these oxides. It is preferable that such an underlying layer has a film thickness of 2 to 50 nm.

When the underlying layer is formed, the target particles may be sputtered in a reactive atmosphere containing oxygen (reactive ECR sputtering method). The velocity of film formation can be improved to be 2-fold to 3-fold as compared with a case in which the atmosphere is not the reactive atmosphere, for example, by using a mixed gas containing oxygen in argon as a sputtering gas.

A thin film, which has the bcc structure or the B2 structure, may be used other than the underlying layer constructed with the compound described above. Especially, it is possible for the thin film to use an inorganic compound such as magnesium oxide, chromium, nickel, chromium alloy, or nickel alloy. It is preferable that such an alloy contains solid solution of chromium, titanium, tantalum, vanadium, ruthenium, tungsten, molybdenum, vanadium, niobium, nickel, zirconium, aluminum, or a combination of these element, other than chromium or nickel as the base element. Further, it is preferable that the underlying layer is oriented in a certain orientation. It is preferable that such a thin film has a film thickness of 2 to 10 nm.

When the magnetic layer is formed, it is preferable that the magnetic layer is epitaxially grown on the underlying layer with the structure controlled as described above. As a result, the obtained magnetic layer reflects the structure of the underlying layer, and it has such a structure that the magnetic grains grown on the crystal grains of the underlying layer are uniformly separated by the non-magnetic portion grown on the crystal grain boundary of the underlying layer.

Accordingly, it is possible to reduce the magnetic interaction between the magnetic grains, and it is possible to decrease the unit of inversion of magnetization. Further, the grain diameter of the magnetic grain is equal to the crystal grain diameter of the underlying layer, making it possible to miniaturize the magnetic grain diameter and reduce the dispersion of the grain diameter. Therefore, it is possible to obtain the magnetic recording medium in which the thermal fluctuation and the thermal demagnetization are small. In an embodiment described later on, the standard deviation ($\sigma$) in the magnetic grain diameter distribution is not more than 8% of the average grain diameter, and thus the dispersion of the grain diameter has been successfully decreased. Further, the crystalline orientation can be made in the constant orientation by epitaxially growing the magnetic grains on the crystal grains of the underlying layer. In an embodiment described later on, the crystalline orientation of (11.0), which is preferable for the high density recording, has been successfully obtained for Co in the magnetic layer. Further, when the magnetic layer is formed as the film by means of the sputtering method based on the use of the resonance absorption described above, then it is possible to more precisely control the structure and the orientation of the magnetic layer, and the epitaxial growth of the magnetic layer from the underlying layer is facilitated. Therefore, the obtained film is preferred for the high density recording as compared with a conventional film formed by the DC sputtering method or the magnetron sputtering method.

The material for the magnetic layer is an alloy principally containing cobalt. It is preferable to contain cobalt as well as chromium, platinum, tantalum, niobium, titanium, silicon, boron, phosphorus, palladium, vanadium, terbium, gadolinium, samarium, neodymium, dysprosium, holmium, europium, or a combination of these elements. When chromium, tantalum, niobium, titanium, silicon, boron, phosphorus, or a combination of them is contained in the magnetic layer, such an element is deposited (segregated) at the grain boundary or in the vicinity of the crystal grain boundary of the crystal grains of cobalt. It is also possible to decrease the magnetic interaction between the magnetic grains by means of the segregation.

Other than the above, it is also possible for the magnetic layer to use a magnetic film having the granular structure in which crystal grains of metal exist while being surrounded by an amorphous phase. It is preferable that the crystal grains are composed of cobalt or alloy principally containing cobalt, containing neodymium, praseodymium, yttrium, lanthanum, samarium, gadolinium, terbium, dysprosium, holmium, platinum, palladium, or a combination of these elements. It is preferable that the amorphous portion, which exists to surround the metal crystal grains, is composed of silicon oxide, aluminum oxide, titanium oxide, zinc oxide, silicon nitride, or a combination of these compounds. In the case of the magnetic film having the granular structure, it is possible to reduce the magnetic interaction between the magnetic grains owing to the presence of the amorphous portion, in the same manner as in the segregation described above. Alternatively, the magnetic layer may be an artificial lattice multilayered film obtained by alternately stacking Co and Pt. Such a film may be formed by co-sputtering targets of Co and Pt.

A plurality of underlying layers may be provided, if necessary. For example, when the difference in lattice constant is large between the underlying layer and the magnetic layer, it is possible to facilitate the epitaxial growth of the magnetic layer in a well-suited manner by inserting therebetween a layer (control layer) having an intermediate lattice constant between those of the two layers. In this case, in addition to the underlying layer described above, the magnetic layer may be formed with a magnesium oxide layer or an alloy layer principally containing chromium or nickel intervening therebetween.

Further, in order to isolate the magnetic layer from the atmospheric air and protect the magnetic layer from any shock received from the magnetic head, it is possible to form a protective layer on the magnetic layer (on the side to make contact with the magnetic head) by using the ECR sputtering method described above. An upper limit exists for the film thickness of the protective layer because of the high density recording as described above. It is desirable that the film thickness of the protective layer is not more than 5 nm. When the ECR sputtering method is used, it is possible to control the kinetic energy of the target particles. Therefore, even when the film thickness is thin, it is possible to form the protective layer which is dense and which coats the magnetic layer with the uniform thickness. In order to stably form the protective layer by means of this method, it is enough to provide a film thickness of not less than 1 nm which is extremely thin as compared with the conventional film thickness of 10 nm. When the ECR sputtering method is used for a carbon film of the protective layer, the density of the carbon film is not less than 60% of the theoretical density (density obtained in a state in which carbon atoms are accumulated without any gap). It is possible to form a denser film as compared with the conventional film of 40 to 50%. Further, the hardness of the film is not less than two-fold as compared with a film formed by means of the conventional sputtering method (for example, the RF magnetron method).

It is preferable that the protective layer is composed of a carbon thin film. The protective layer may be formed in an electric discharge gas atmosphere principally containing argon. It is preferable that the protective layer is formed in a mixed gas atmosphere containing argon as well as at least one gas selected from nitrogen and hydrogen. When the film is formed by using the mixed gas, nitrogen and hydrogen are contained in the obtained thin film. Accordingly, it is possible to facilitate the dense feature of the carbon thin film as the protective layer.

As indicated by a result of measurement performed with an interatomic force electron microscope (AFM) in an embodiment as described later on, when the underlying layer is formed by means of the ECR sputtering method, it is possible to realize the flat feature of the film surface without being affected by scratches and rough irregularities on the substrate surface. On the other hand, a minute and regular concave/convex pattern, which results from the slight difference in growth speed between those grown on the crystal grain boundary and those grown on the crystal grains of the underlying layer, appears on the surface of the magnetic layer by epitaxially growing the magnetic layer on the underlying layer. Further, when the protective layer is formed on the magnetic layer by means of the ECR sputtering method, the protective layer covers the surface of the magnetic layer with the uniform film thickness. Therefore, the surface of the protective layer has a shape which reflects the regular concave/convex pattern of the magnetic layer. The minute concave/convex pattern is useful as a texture for allowing the magnetic head to stably fly over the magnetic recording medium.

According to the present invention, it is possible to produce the magnetic recording medium capable of performing the high density recording in which the surface recording density exceeds 40 Gbits/inch$^2$.

BRIEF DESCRIPTION OF THE DRAWINGS

FIG. 18 shows an X-ray diffraction profile of a magnetic film of a magnetic disk concerning Reference Example provided with no control film.

BEST MODE FOR CARRYING OUT THE INVENTION

Specified embodiments of the magnetic recording medium of the present invention and the method for producing the same will be described in detail below with reference to the drawings.

Description of ECR Sputtering Apparatus

Figure 5:
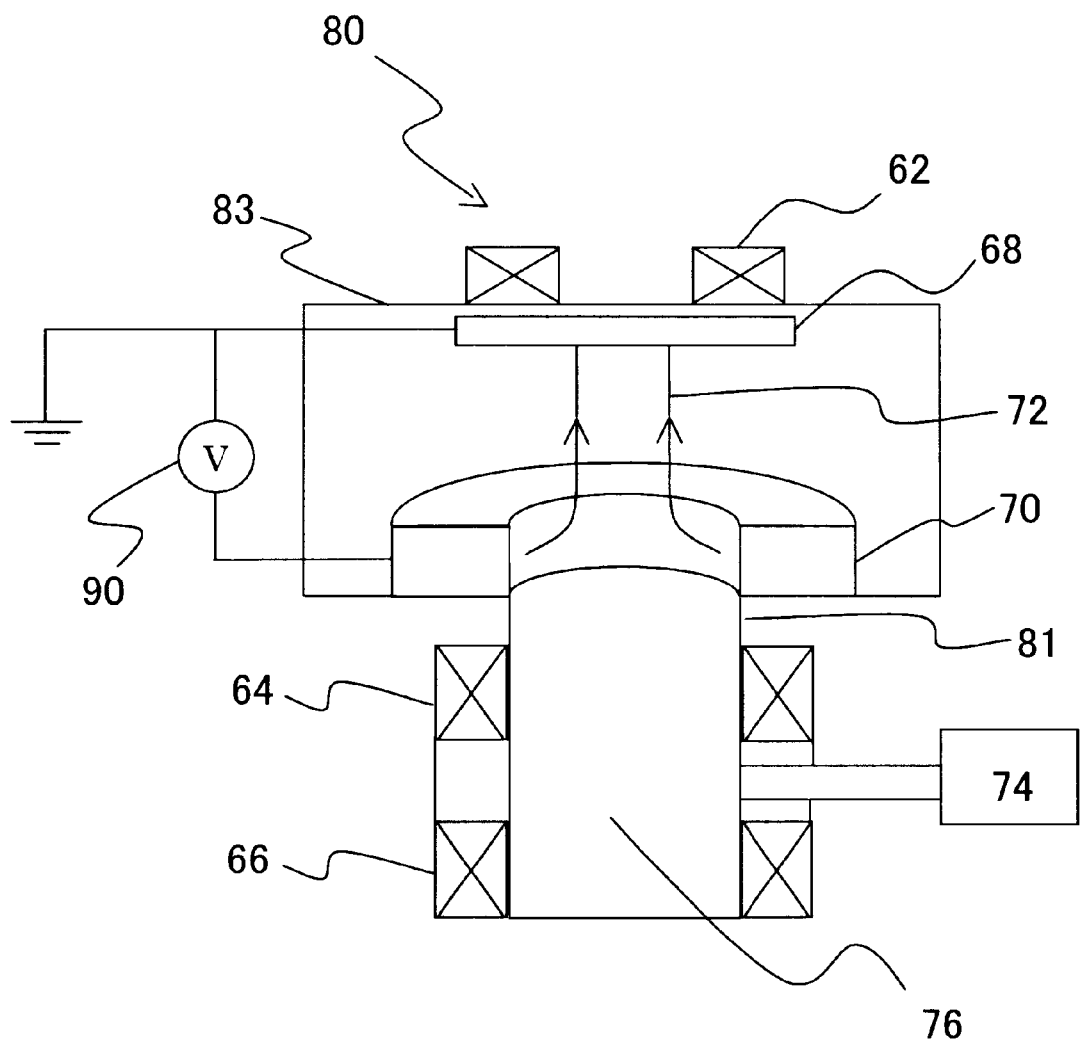
FIG. 5 conceptually illustrates a structure of an ECR sputtering apparatus used in the embodiment of the present invention.

At first, explanation will be made for an ECR (Electron Cyclotron Resonance) sputtering apparatus used to produce the magnetic recording medium of the present invention. FIG. 5 conceptually shows the ECR sputtering apparatus 80. The ECR sputtering apparatus 80 principally includes a first chamber 81 in which plasma is generated, an annular target 70 which is connected to an upper portion of the first chamber 81, and a second chamber 83 which is connected at a position over the target 70. The first chamber 81 is a cylindrical tube made of quartz. A pair of coils 64, 66 are provided in a circumscribing manner respectively at upper and lower positions in the axial direction. A microwave generator 74 is connected via an introducing tube to the first chamber 81. The introducing tube is connected to a portion between the coils 64, 66 of the first chamber 81. The second chamber 83 is a vacuum chamber made of metal. A substrate 68, on which particles driven out from the target 70 are deposited, is installed at the top of the second chamber 83. Further, a coil 62, which is used to converge (suppress divergence of) the plasma induced by an applied bias voltage, is provided on the second chamber 83. The target 70 and the substrate 68 installed in the second chamber 83 are connected to a power source 90 so that the bias voltage is successfully applied.

The interior of the first chamber 81, the inside of the target 70, and the interior of the second chamber are communicated with each other, and they are closed from the outside. When the apparatus is operated, then an unillustrated vacuum pump is used to reduce the pressure of the space shared by the interior of the first chamber 81, the inside of the target 70, and the interior of the second chamber 83, and a gas (for example, Ar) is introduced into the first chamber 81 via an unillustrated gas supply port. Subsequently, a constant magnetic field is applied to the inside of the apparatus by using the coils 64, 66. Free electrons, which exist at the inside of the apparatus, make the cyclotron motion in the clockwise direction about the magnetic field axis in accordance with the magnetic field. The angular frequency of the cyclotron motion of the electron is, for example, about $10^9$ Hz, when the electron density is about $10^{10}$ cm$^{-3}$, giving the angular frequency in the microwave region. When the generated microwave is introduced from the microwave generator 74 into the magnetic field, the microwave is resonant with the cyclotron motion of the electron to cause the resonance absorption in which the energy of the microwave is absorbed by the electron. As a result of the resonance absorption, the electron acquires the high energy, and it is accelerated. The electron collides with the gas to cause the ionization of the gas. Thus, the ECR plasma 76 having the high energy is generated in the first chamber 81. Since the energy at a constant level is given to the electron by means of the resonance absorption, the energy state of the electron is also at a constant high energy level. The plasma is generated by allowing such electrons to collide with the gas. Therefore, the particles, which constitute the plasma, have high energy. Further, the energy is uniform for the respective particles as compared with the ordinary plasma which is generated by electric discharge or the like. Thus, it is possible to obtain the plasma having a narrow energy distribution.

The bias voltage is applied between the substrate 68 and the annular target 70 disposed over the position at which the plasma is generated. Therefore, the generated plasma is introduced toward the target 70. The plasma collides with the target 70 to drive out the target particles. When the bias voltage is changed during this process, it is possible to precisely control the kinetic energy of the plasma to collide with the target 70, and consequently the kinetic energy of the target particles driven out by the plasma. The target particles, which has the energy that is controlled as described above, are directed as the flow 72 of the target particles toward the substrate 68. The target particles are deposited on the substrate 68 while giving a uniform and equivalent film thickness.

When the ECR sputtering method as described above is used to produce the magnetic recording medium, it is possible to make control and obtain a desired value for any one of the density of the thin film to be formed, the surface flatness, the crystalline orientation, the orientation of crystal growth, the crystal structure, and the crystal grain diameter, by appropriately selecting the material and the film formation condition. When the ECR sputtering method is used, it is possible to suppress the mutual substrate diffusion between thin films when the thin films of two or more layers are formed. For example, when a protective layer is formed on a magnetic layer by means of the ECR sputtering method as described later on, it is possible to avoid any damage of magnetic characteristics of the magnetic layer, which would be otherwise caused by the diffusion of the components of magnetic grains to the protective layer. Additionally, when the ECR sputtering method is used, it is possible to reduce any crystal deficiency in the formed thin film. Therefore, it is possible to form the dense film, and it is possible to obtain the crystals which are strongly orientated in a constant direction.

An electromagnetic wave, which is in a region other than that of the microwave, can be also used to excite the electron by means of the resonance absorption. However, it is preferable to use the microwave. Further, it is preferable to use an alternating current power source having a radio frequency (RF) or a direct current power source (DC) as the bias power source for controlling the kinetic energy of each of the plasma and the target particles to have a constant value. For example, when a conductive material such as carbon is subjected to the ECR sputtering, it is possible to use the DC power source. On the other hand, when a non-conductive material such as silicon oxide is subjected to the ECR sputtering, it is possible to use the RF power source.

First Embodiment

Figure 1:
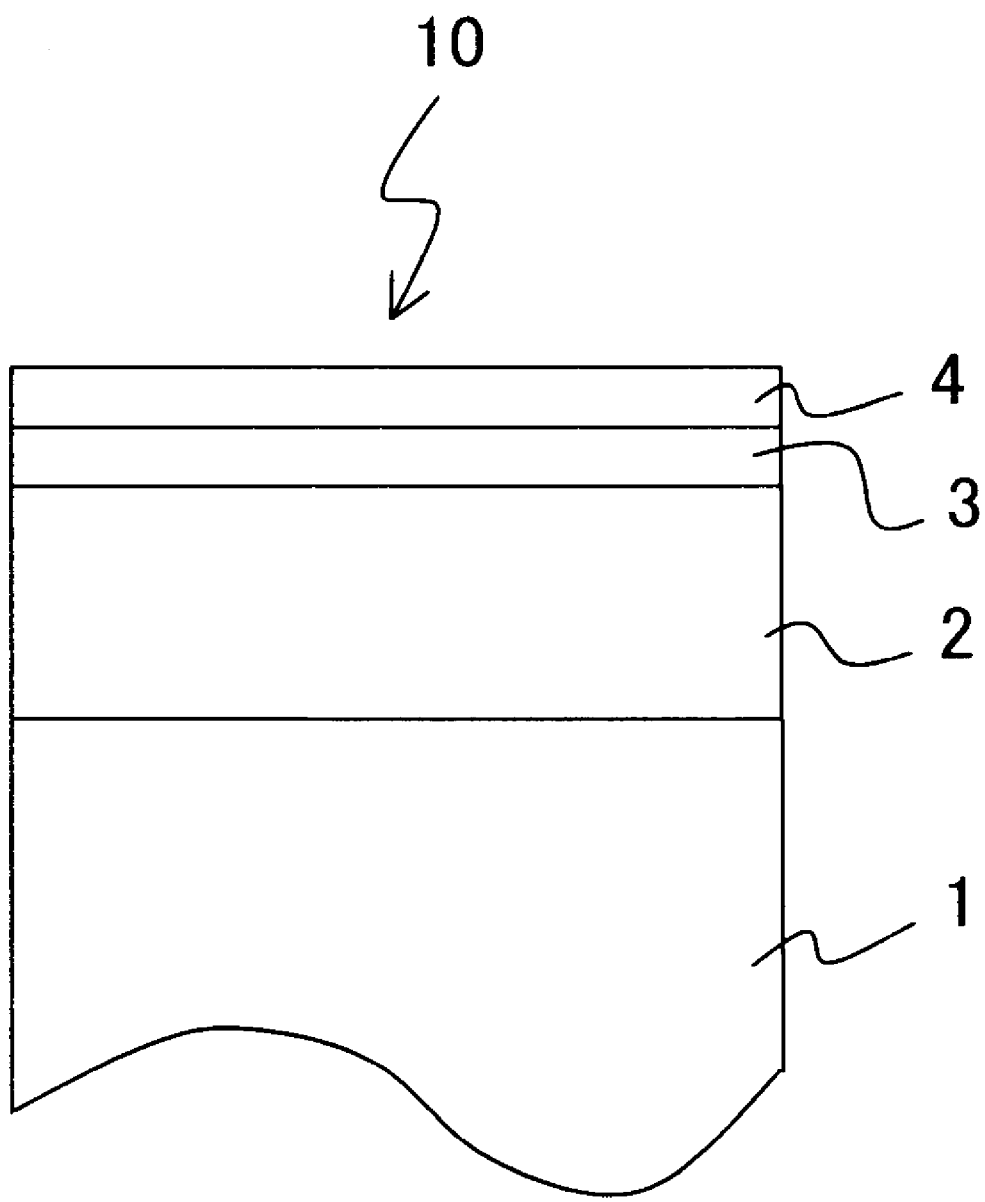
FIG. 1 shows a sectional view conceptually illustrating a structure of a magnetic disk produced in the first embodiment of the present invention.

In this embodiment, a magnetic disk 10 comprising an inorganic compound thin film 2, a magnetic film 3, and a protective film 4 on a disk substrate 1 as shown in FIG. 1 was produced as follows.

Formation of Inorganic Compound Thin Film

A glass substrate having a diameter of 2.5 inches (6.5 cm) was prepared as the substrate 1. A CoO—SiO$_2$ film was formed as the inorganic compound thin film 2 on the substrate 1 by means of the ECR sputtering apparatus described above. A CoO—SiO$_2$ mixture (mixing ratio of CoO: SiO$_2$=3: 1) was used for a sputtering target (target 80 in FIG. 5), and Ar was used for a sputtering gas. The gas pressure of Ar was 0.3 mTorr. The introduced electric power of the microwave was 0.7 kW. In order to introduce the plasma excited by the microwave in a direction toward the target, an RF bias voltage of 500 W was applied to the target.

Structural Analysis for Inorganic Compound Thin Film

Figure 2:
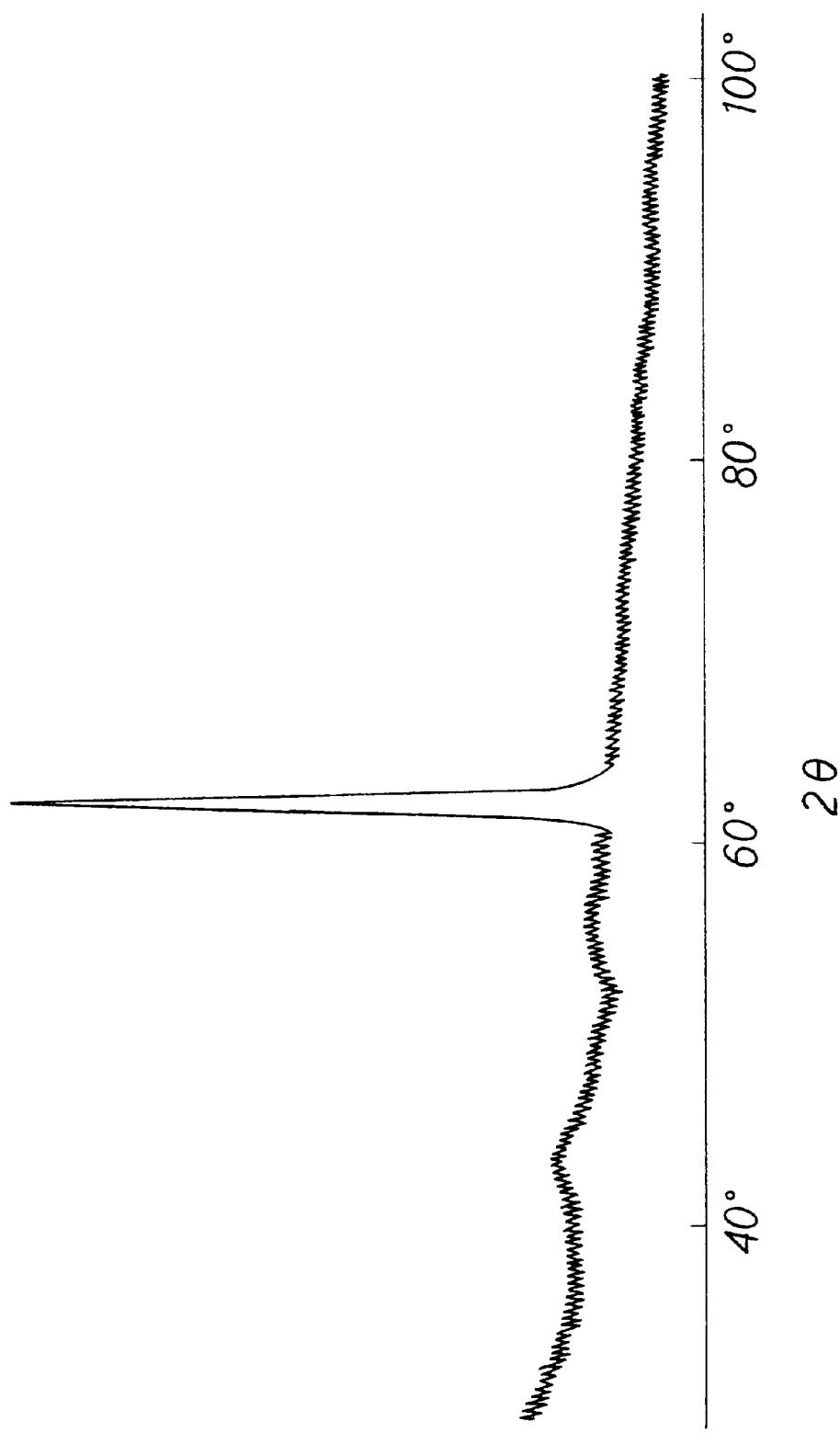
FIG. 2 shows an X-ray diffraction profile illustrating a crystal structure of an underlying layer of the magnetic disk produced in the first embodiment.

The crystal structure of the inorganic compound thin film 2 formed by the ECR sputtering method was investigated by means of the X-ray diffraction method. An obtained result is shown in a chart shown in FIG. 2. As shown in FIG. 2, a peak appeared in the vicinity of 2θ=62.5°. This peak was identified to be (220) of CoO.

Figure 3:
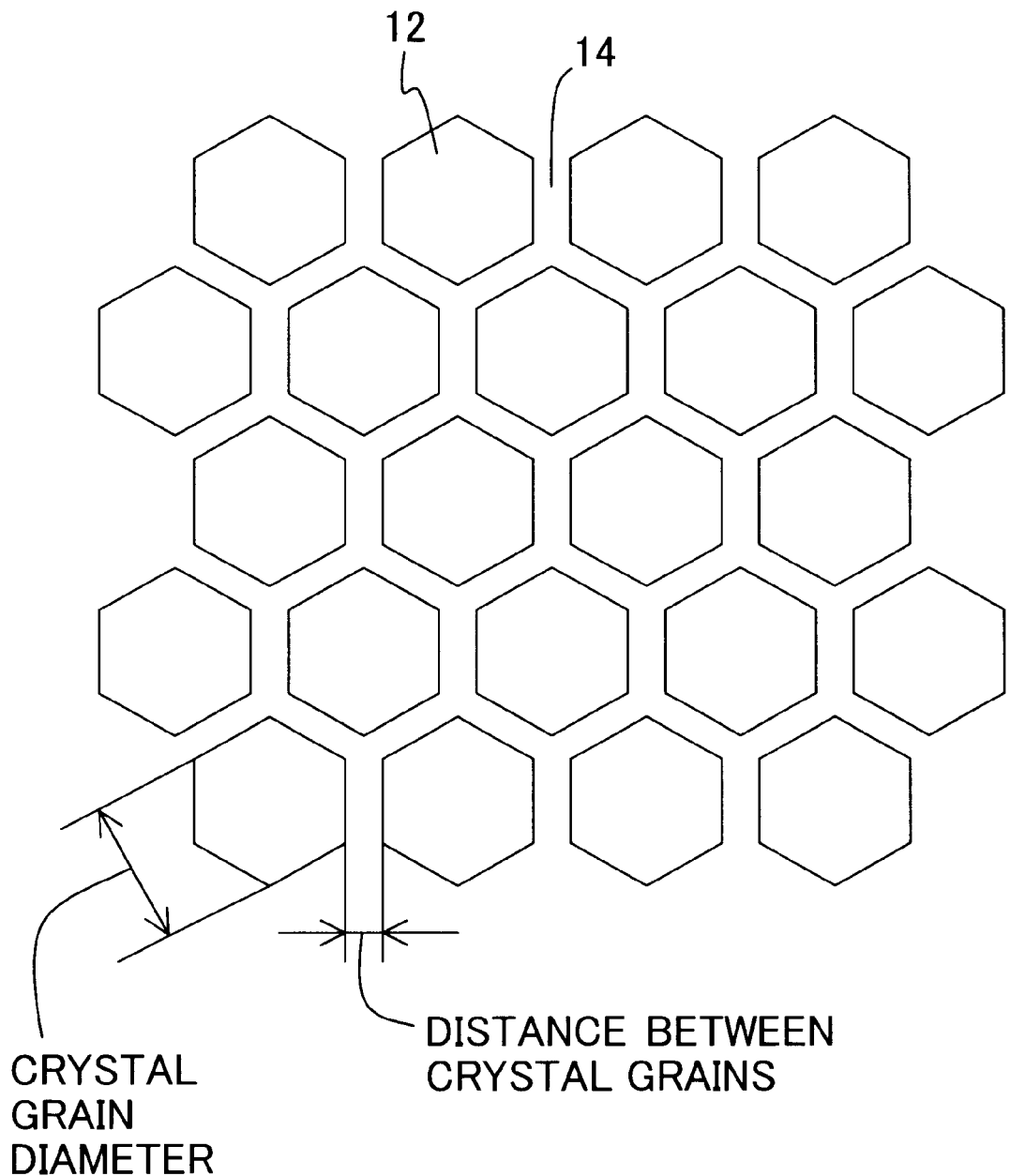
FIG. 3 shows a plan view conceptually illustrating the structure of the underlying layer of the magnetic disk produced in the first embodiment of the present invention.

Further, the planar structure of the inorganic compound thin film 2 was observed with a transmission electron microscope (TEM). FIG. 3 shows a schematic illustration of the observed structure of the thin film. As shown in FIG. 3, the thin film 2 is an aggregate of regular hexagonal grains 12. The grains were regularly arranged two-dimensionally with a grain boundary 14 intervening therebetween. That is, as viewed in a plan view, the thin film 2 exhibited the honeycomb structure in which the grains 12 were arranged in a honeycomb configuration. When the sectional structure of the thin film was observed, it was revealed that the regular hexagonal grains 12 had grown in a pillar-shaped configuration in the direction perpendicular to the substrate surface. Further, it was revealed that the size of the grain 12 (crystal grain diameter) and the width of the grain boundary 14 (distance between the crystal grains) in the honeycomb structure were successfully regulated by controlling the film formation condition and the composition. In the case of the observed thin film 2, the crystal grain diameter was about 10 nm, and the distance between the crystal grains was 1.5 nm.

The lattice image of the thin film 2 was observed. As a result, it was revealed that the grains 12 were crystalline, and the grain boundary 14 was amorphous. When the lattice constant of the grains 12 was determined, it was approximately equal to a value of cobalt. Further, the crystal grains 12 and the grain boundary 14 were analyzed by means of the energy dispersion type X-ray analysis ($\mu$-EDX) for the extremely minute area of the thin film 2. As a result, it was revealed that the crystal grains 12 were composed of CoO, and the substance existing in the grain boundary 14 was SiO$_2$.

Next, the previous TEM observation result for the thin film surface of the underlying base film was used to analyze the crystal grain diameter distribution and the number of crystal grains existing around one crystal grain (hereinafter referred to as "number of coordinated grains"). At first, as for the crystal grain diameter, the investigation was made for the grains existing in a randomly selected square having one side of 200 nm. As a result, the average crystal grain diameter was 10 nm. The grain diameter distribution was a normal distribution. The standard deviation was determined to be 0.5 nm. As for the number of coordinated grains, the investigation was made for randomly selected 500 individuals of crystal grains. As a result, the number of coordinated grains was 6.01 in average. This fact indicates that the grain diameter of the crystal grain is scarcely dispersed, and the regular hexagons of crystal grains are arranged extremely regularly in the honeycomb configuration in the plane parallel to the substrate surface.

The number of coordinated grains is varied depending on the spacing distance between the crystal grains. In this viewpoint, it has been revealed that $SiO_2$ plays an important role to allow the structure to have the regularity, and the concentration of $SiO_2$ determines the spacing distance between the formed crystal grains. A desired value can be selected easily and arbitrarily for the spacing distance between the crystal grains by changing the composition of the target (for example, the ratio between Co and Si or the ratio between CoO and $SiO_2$). For example, when the $SiO_2$ concentration in the $CoO$—$SiO_2$ film is increased, the distance between the crystal grains is lengthened. However, if $SiO_2$ exists in a large amount, the deposition and the growth of CoO are suppressed. Therefore, it is desirable that the distance does not exceed 2 nm at the maximum. The distance between the crystal grains can be changed by optimizing the film formation process, for example, by raising the substrate temperature. On the other hand, when the $SiO_2$ concentration is lowered, the distance between the crystal grains is narrowed (crystal grains approach to one another). Simultaneously, any disorder has been observed for the grain shape. In this situation, the number of coordinated grains was about seven in which the number of grains was large in some cases. On the contrary, the number of coordinated grains was four to five in which the number of existing grains was small in other cases. In general, the dispersion was large. Further, it was observed that the two-dimensional arrangement was disordered, and the honeycomb structure was collapsed. An appropriate range of the spacing distance between the crystal grains was 0.5 to 2 nm. In this embodiment, the $SiO_2$ concentration was controlled so as to be included within this range.

For the purpose of comparison, a $CoO$—$SiO_2$ film was formed in accordance with the RF magnetron sputtering method in place of the ECR sputtering method. The structure of the $CoO$—$SiO_2$ film formed by means of the magnetron sputtering method was analyzed by using an observation image based on TEM in the same manner as for the film formed by means of the ECR sputtering method. As a result, the average grain diameter was 10 nm, and the grain diameter distribution was a normal distribution. However, the standard deviation ($\sigma$) was 1.2 nm, and the dispersion of the grain diameter was large as compared with the value of 0.7 nm of the film formed by means of the ECR sputtering method. The number of coordinated grains was investigated for 500 individuals of crystal grains. As a result, the number was 6.30 in average. It was revealed that the regularity was lowered as compared with the value of 6.01 individuals obtained for the $CoO$—$SiO_2$ film formed by means of the ECR sputtering method. According to the comparative experiment, it has been revealed that the regularity of the thin film 2 can be greatly improved when the inorganic compound thin film 2 is formed by using the ECR sputtering method.

Analysis of Fractal Feature

Figure 4:
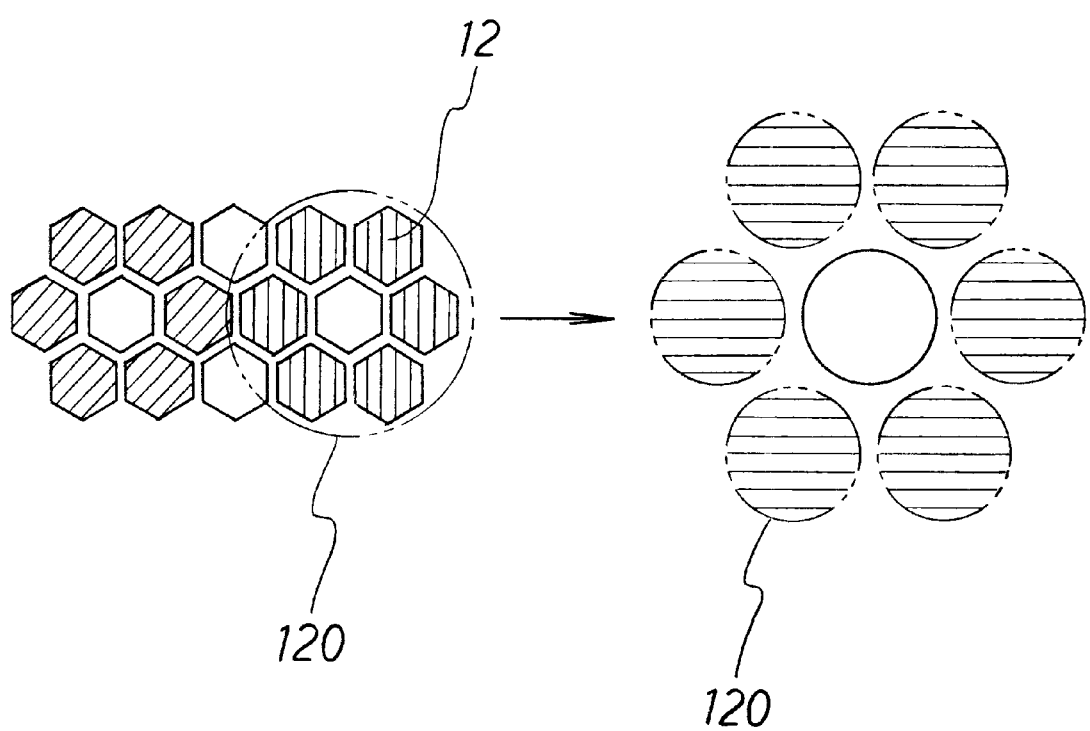
FIG. 4 conceptually illustrates the fractal feature of the underlying layer of the magnetic disk produced in the first embodiment of the present invention.

Taking notice of the arrangement of the inorganic compound thin film 2, the following feature is appreciated. That is, the inorganic compound thin film 2 is composed of an aggregate of regular hexagonal crystal grains 12. Geometrically, a self-similar figure is constructed as shown in FIG. 4. As shown in the left half of FIG. 4, one individual of regular hexagonal crystal grain is surrounded by six individuals of the same regular hexagonal crystal grains. Seven individuals of crystal grains form one unit. Further, as shown in the right half drawing, the unit, which is composed of seven crystal grains, is surrounded by six individuals of the same units to form a group composed of seven individuals of units. This form will be overviewed from a fractal viewpoint. When the phase dimension $dim_T$ and the Hausdroff dimension (dimensional function of real number) $dim_H$ are used for the fractal feature, the relationship of numerical values is represented by $dim_T < dim_H$. In this case, $dim_T$ is 2 because it resides in the two-dimensional plane. As for $dim_H$, there is given $dim_H \leq n$ (in this case, n=2). It is understood that $dim_T < dim_H$ is given. In this manner, the aggregate of the crystal grains 12 has the fractal feature in the inorganic compound thin film 2. The width of the grain boundary 14 (amorphous) existing to surround the crystal grains 12, i.e., the distance (spacing distance) between the crystal grains is 1.5 nm which is constant. Therefore, the structure of the inorganic compound thin film 2 and the fractal feature of the organization are not lost. If the distance between the crystal grains is less than 0.5 nm, or if the distance exceeds 2 nm, then the structure of the inorganic compound thin film 2 and the fractal feature of the organization may be lost. Therefore, it is preferable that the width of the crystal grain boundary 12 is controlled to have a constant value within a range of 0.5 to 2 nm as described above. It is believed that the fractal feature has been obtained because the thin film 2 has been formed by means of the ECR sputtering method as described above.

Formation of Magnetic Film

Subsequently, a $Co_{69}Cr_{19}Pt_{12}$ film as the magnetic film 3 was formed to have a film thickness of 15 nm on the inorganic compound thin film 2 by using the DC sputtering method. During the DC sputtering, the substrate 1 was heated to 300° C. A Co—Cr—Pt alloy was used for the sputtering target, and pure Ar was used for the sputtering gas. The gas pressure during the sputtering was 0.3 mTorr. The introduced DC electric power was 1 kW/150 mm$\phi$.

Structure and Magnetic Characteristics of Magnetic Film

Subsequently, the structure of the obtained magnetic film 3 was investigated by means of TEM observation. As a result, the magnetic film 3 had a honeycomb structure reflecting the structure and the shape of the inorganic compound thin film 2. The investigation was made for 250 individuals of crystal grains by means of the observation for the plane based on an electron microscope. As a result, the average grain diameter of grains was 10 nm. When the grain diameter distribution was determined, it was determined as represented by a standard deviation $\sigma$ of not more than 1 nm. The grain size distribution had a value close to the limit of the resolution of TEM. As described above, it was revealed that the grains of the magnetic film were finely minute, the size distribution was small, and thus these features were the same as those of the inorganic compound thin film 2. The grain configuration of the magnetic film 3 also had the honeycomb structure in which the grains were regularly arranged two-dimensionally in the same manner as in the inorganic compound thin film. The form of the magnetic film also had the fractal feature. This fact indicates that the magnetic crystal grains each having a hexagonal shape with a uniform size are regularly arranged two-dimensionally (in the honeycomb structure) continuously from the inorganic compound thin film 2. The cross section was observed by means of TEM. As a result, the connection of lattice was found between the inorganic compound thin film 2 and the magnetic film 3. It was revealed that the magnetic film 3 was epitaxially grown from the inorganic compound thin film 2. It was also revealed that the growth mechanism of the magnetic film differed between the crystalline phase and the grain boundary phase, giving different metallic organizations. Especially, a good pillar-shaped organization was grown from the crystal grains of the inorganic compound, but no clear organization was observed from the grain boundary phase. It is known that such an organization exhibits non-magnetic behavior. According to the X-ray diffraction, a peak was observed in the vicinity of 2θ=62.5°. Considering this result in view of the result of the TEM observation in combination, it was revealed that (102) of Co was strongly oriented for this peak.

Subsequently, magnetic characteristics of the magnetic film 3 were measured. The obtained magnetic characteristics were as follows. That is, the coercive force was 3.5 kOe, Isv was $2.5\times10^{-16}$ emu, S as the index for the squareness or the angular property of hysteresis in M-H loop was 0.8, and S* was 0.86. Accordingly, magnetic film 3 had the good the magnetic characteristics. The reason why the index to indicate the angular property is large (approximate to the angular or square form) is that the interaction between the magnetic crystal grains is reduced because of the different growth mechanism of the magnetic film while reflecting the crystal grain boundary layer of the inorganic compound thin film. The obtained magnetic film was observed with a scanning magnetic force microscope (MFM). As a result, it was revealed that the magnetic characteristics were different between the grain boundary portion and the crystal grain portion of the magnetic film. In the crystal grain boundary portion, the coercive force and the magnetic anisotropy were suddenly decreased.

Formation of Protective Film

Subsequently, a C film was formed as the protective film 4 to have a film thickness of 5 nm on the magnetic film 3 by means of the DC sputtering. The sputtering condition was as follows. That is, the introduced DC electric power density was 1 kW/150 mmφ, and the electric discharge gas pressure was 5 mTorr.

Production and Evaluation of Magnetic Disk Apparatus

Figure 11:
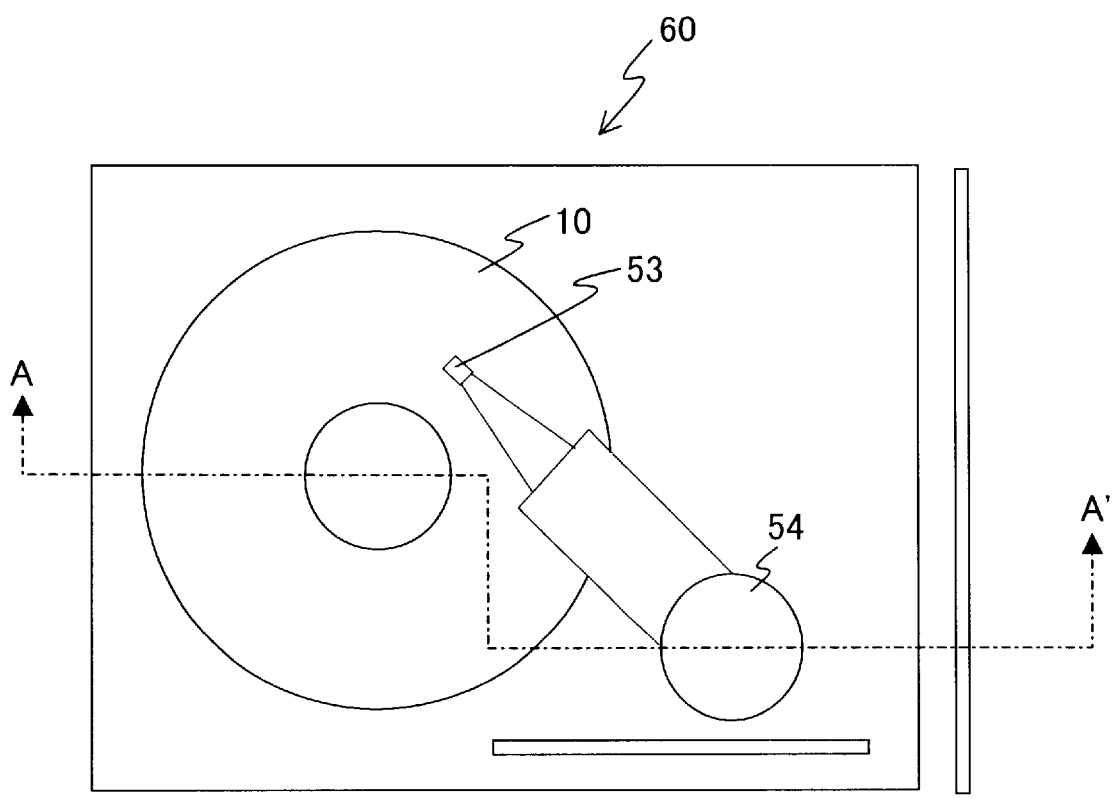
FIG. 11 shows a top view illustrating a magnetic recording apparatus produced in the embodiment of the present invention.
Figure 12:
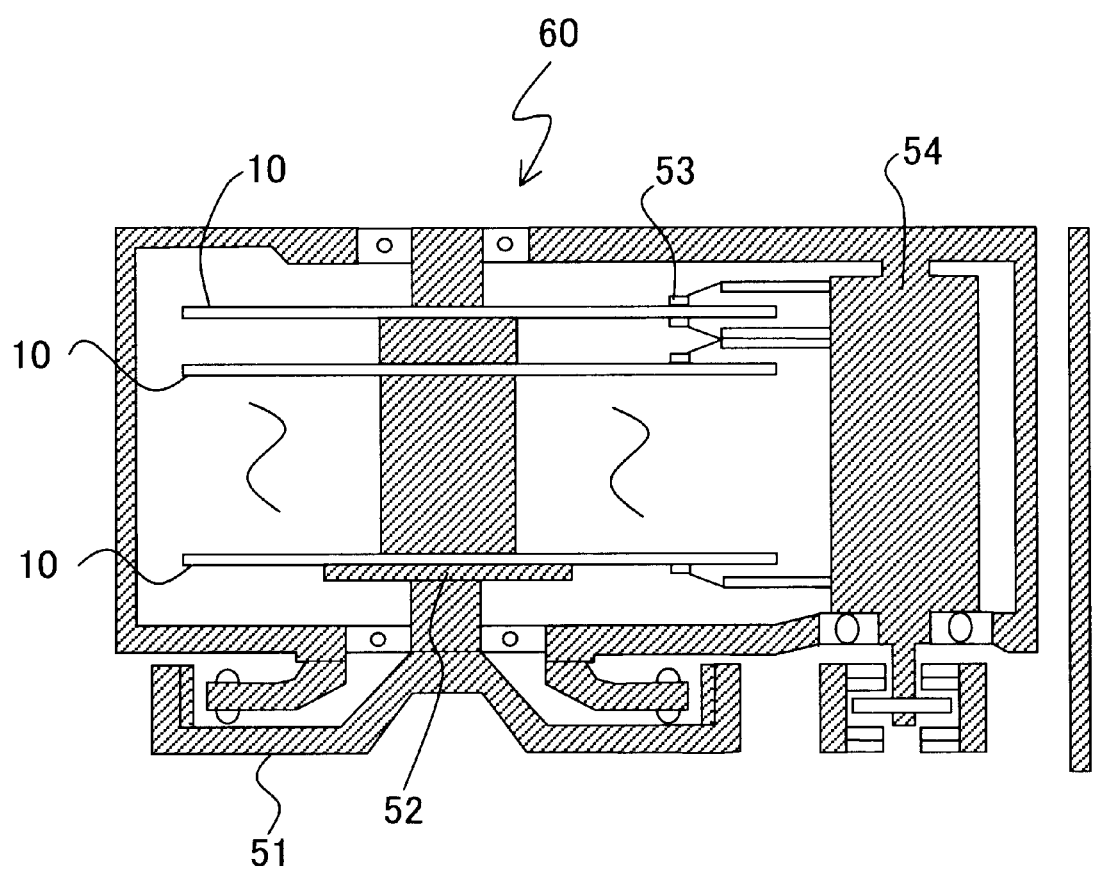
FIG. 12 shows a sectional view illustrating the magnetic recording apparatus taken along a broken line A–A' shown in FIG. 11.

Subsequently, a lubricant was applied to the surface of the obtained magnetic disk to complete the magnetic disk. A plurality of magnetic disks were produced in accordance with the same process, and they were incorporated into a magnetic recording apparatus. The schematic arrangement of the magnetic recording apparatus is shown in FIGS. 11 and 12. FIG. 11 shows a top view of the magnetic recording apparatus 60. FIG. 12 shows a sectional view illustrating the magnetic recording apparatus 60 taken along a broken line A–A' shown in FIG. 11. A thin film magnetic head, which was based on the use of a soft magnetic film having a high saturated magnetic flux density of 2.1 T, was used as a recording magnetic head. The gap length of the magnetic head was 0.12 μm. A magnetic head having the giant magneto-resistive effect (dual spin valve type magnetic head) was used for reproduction. The recording magnetic head and the reproducing magnetic head were integrated into one unit, and they are shown as a magnetic head 53 in FIGS. 11 and 12. The integrated type magnetic head 53 is controlled by a driving system 54 for the magnetic head. The plurality of magnetic disks 10 are coaxially rotated by means of a spindle 52 of a rotary driving system 51. The distance between the magnetic head surface and the magnetic disk 10 was kept to be 20 nm. A signal corresponding to 40 Gbits/inch$^2$ was recorded on the disk to evaluate S/N of the disk. As a result, a reproduction output of 32 dB was obtained.

In this case, a magnetic force microscope (MFM) was used to measure the unit of inversion of magnetization during recording of information. In any of the magnetic disks of the embodiment, two to three individuals of magnetic grains were subjected to inversion of magnetization at once with respect to a recording magnetic field applied when 1 bit of data was recorded. This value is sufficiently small as compared with a conventional unit of inversion of magnetization of five to ten individuals. Accordingly, the portion (zigzag pattern), which corresponded to the boundary between adjoining units of inversion of magnetization, was remarkably small as compared with the conventional magnetic disk. This result indicates the fact that the boundary line of the area of inversion of magnetization was smoothened, because the magnetic grains were fine and minute, and the unit of inversion of magnetization was small as well. Neither thermal fluctuation nor demagnetization due to heat was caused. The error rate of the magnetic disk was measured. As a result, the value was not more than $1\times10^{-5}$ when the signal processing was not performed.

In this embodiment, CoCrPt was used for the magnetic film. Alternatively, CoCrPtTa may be used. Further alternatively, an intermediate layer composed of CrTi or the like may be provided between the inorganic compound thin film and the magnetic film to regulate the difference in lattice constant between the inorganic compound thin film and the magnetic film.

Second Embodiment

Figure 6:
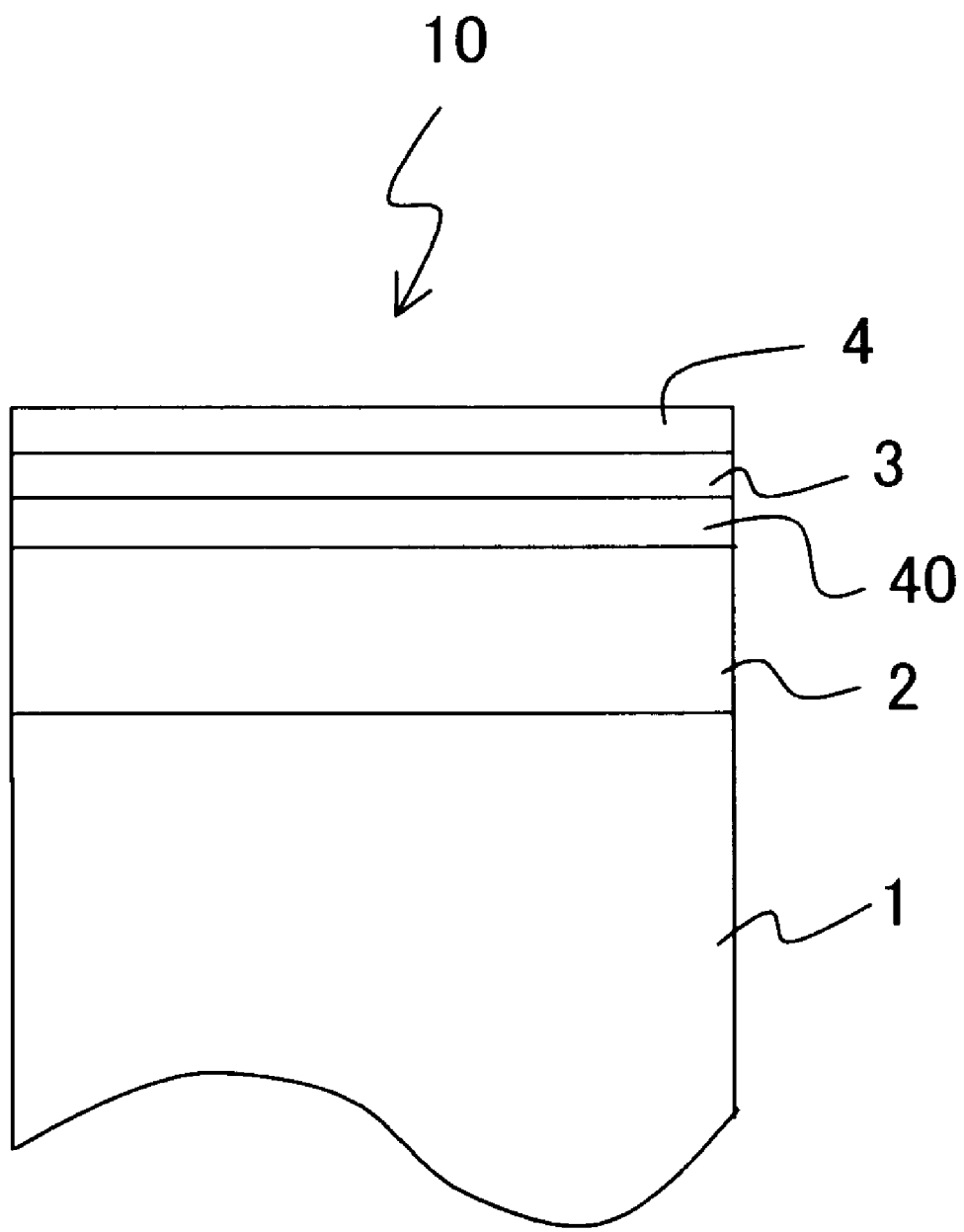
FIG. 6 shows a sectional view conceptually illustrating a structure of a magnetic disk produced in the second embodiment of the present invention.

This embodiment is illustrative of a case of production of a magnetic disk including a lattice constant control film 40 provided between a magnetic film 3 and an inorganic compound thin film 2 formed on a substrate 1 as shown in FIG. 6.

The inorganic compound thin film 2 was formed on the glass substrate 1 by using the ECR sputtering method in the same manner as in the first embodiment. However, a mixture of CoO and ZnO in a ratio of 3:1 was used as the sputtering target. The film thickness of the inorganic compound thin film 2 was 30 nm considering, for example, the generation of the internal stress of the entire magnetic disk and the peeling off of the thin film 2 from the substrate 2.

The surface of the inorganic compound thin film 2 was observed by means of TEM. As a result, the structure was equivalent to the honeycomb structure obtained in the first embodiment. Regular hexagonal crystal grains 12 of CoO, which were uniform in size, were arranged in a honeycomb configuration with a grain boundary 14 of ZnO as shown in FIG. 3. The crystal grain diameter of the regular hexagonal crystal grain was about 10 nm. Subsequently, the number of crystal grains existing around one crystal grain was determined. The investigation was made for 250 individuals of crystal grains. As a result, the number was 6.01 which was appropriately coincide with the value obtained for the inorganic compound thin film of the embodiment.

Subsequently, a thin film of $Cr_{85}Ti_{15}$ alloy was formed as the lattice constant control film 40 by means of the DC sputtering to have a film thickness of 50 nm on the inorganic compound thin film 2. A Cr—Ti alloy was used for the target, and pure Ar was used for the sputtering gas. The sputtering gas pressure was 3 mTorr. The introduced DC electric power was 1 kw/150 mmφ.

Further, a film of $Co_{69}Cr_{19}Pt_{12}$ was formed as the magnetic film 3 by means of the DC sputtering to have a film thickness of 12 nm on the $Cr_{85}Ti_{15}$ alloy thin film. A Co—Cr—Pt alloy was used for the target, and pure Ar was used for the sputtering gas. The pressure during the sputtering was 3 mTorr. The introduced DC electric power was 1 kW/150 mmφ.

Finally, a film of C was formed as the protective film 4 by means of the DC sputtering to have a film thickness of 5 nm. As for the sputtering condition, the introduced DC electric power density was 1 kW/150 mmφ, and the sputtering gas pressure was 5 mTorr.

In this magnetic disk, the difference between the lattice constant of the magnetic film 3 and the lattice constant of the inorganic compound thin film 2 was not less than 20%. However, owing to the control film 40 allowed to intervene therebetween, the difference in lattice constant between the inorganic compound thin film 2 and the control film 40 and the difference in lattice constant between the magnetic film 3 and the control film 40 were successfully less than 10% respectively.

The lattice constant of the control film 40 can be changed at an arbitrary ratio starting from the lattice constant of Cr by controlling the Ti concentration of the Cr—Ti alloy material for forming the lattice constant control film 40. Therefore, the epitaxial growth can be achieved from the inorganic compound thin film 2 to the magnetic film 3 with the control film 40 intervening therebetween by selecting the composition of the control film so that the lattice constant of the control film 40 is between the lattice constants of the inorganic compound thin film 2 and the magnetic film 3, especially the difference in lattice constant between the inorganic compound thin film 2 and the control film 40 and the difference in lattice constant between the magnetic film 3 and the control film 40 are less than 10% respectively.

Figure 7:
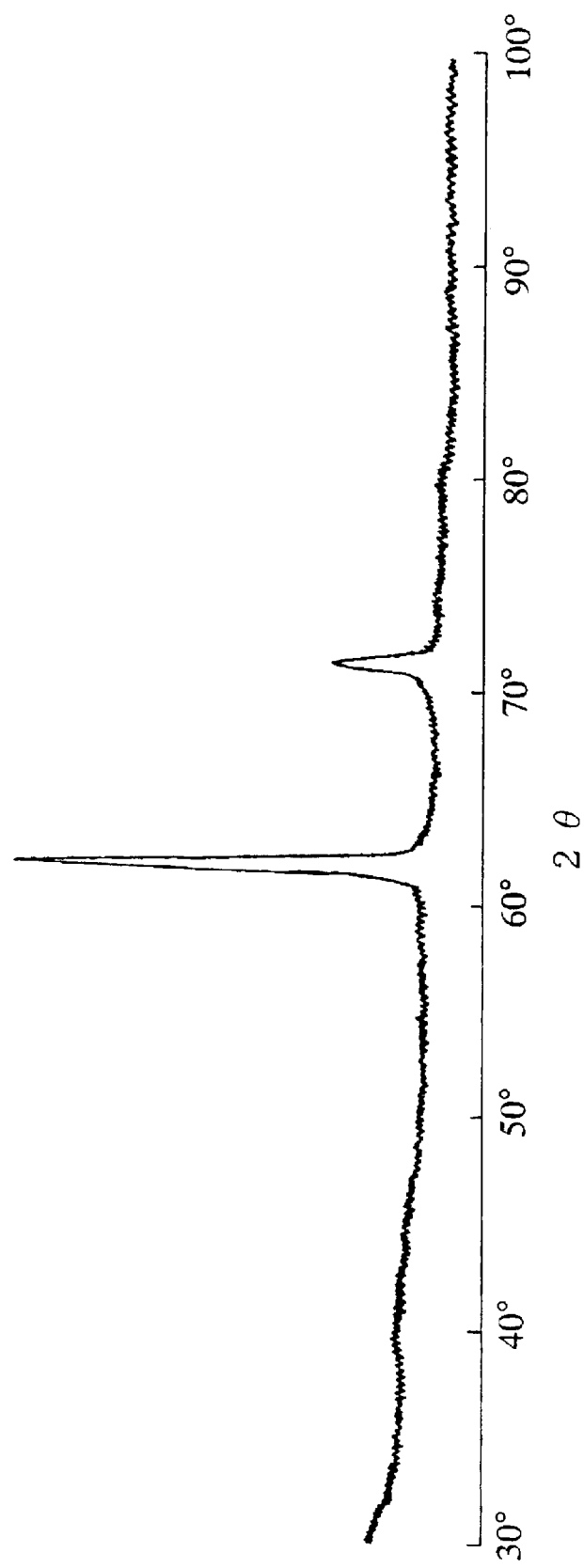
FIG. 7 shows an X-ray diffraction profile illustrating a crystal structure of a magnetic layer of the magnetic disk produced in the second embodiment.

Subsequently, the structure of the magnetic film 3 was investigated in accordance with the X-ray diffraction method. An obtained result is shown in FIG. 7. As shown in FIG. 7, it is understood that (11.0) of Co is strongly oriented. According to the observation for the surface of the magnetic disk, the average grain diameter of the magnetic film 3 was 10 nm, which was approximately the same value as that of the crystal grain diameter of the inorganic compound thin film 3. When the grain diameter distribution of the grains was determined, it was expressed by σ of not more than 0.8 nm. As described above, it is appreciated that the crystal grains of the magnetic film are extremely fine, and the grain diameter distribution is small. According to the observation for the cross section, it was revealed that the inorganic compound thin film and the magnetic film were epitaxially grown. It was also revealed that the inorganic compound thin film and the magnetic film were organized to have an appropriate pillar-shaped structure, and the size of the crystal grain was not varied from the surface of the substrate to the surface of the magnetic film.

Subsequently, the magnetic characteristics of the magnetic film 3 were measured. The following magnetic characteristics were obtained. That is, the coercive force was 3.0 kOe, Isv was $2.5 \times 10^{-16}$ emu, S as the index for the angular property of hysteresis in M-H loop was 0.81, and S* was 0.85. Therefore, the magnetic film 3 had the good magnetic characteristics.

The lattice constant control film 40 formed in this embodiment was introduced between the magnetic film 3 and the inorganic compound thin film 2 in order to adjust the discrepancy in lattice constant between the magnetic film 3 and the inorganic compound thin film 2. However, it has been revealed that the lattice constant control film 40 also has a function to prevent the magnetic film from oxidation which would be otherwise caused by the influence of the underlying layer composed of oxide.

The magnetic recording apparatus shown in FIGS. 11 and 12 was constructed in the same manner as in the first embodiment by using the magnetic disk obtained as described above. A signal corresponding to 40 Gbits/inch$^2$ was recorded on the disk to evaluate S/N of the disk. As a result, a reproduction output of 32 dB was obtained. The unit of inversion of magnetization during the recording of information, which was measured with a magnetic force microscope (MFM), included 2 to 3 individuals of magnetic grains. When the error rate of the magnetic disk was measured, it was not more than $1 \times 10^{-5}$ as a value obtained when no signal processing was performed.

In this embodiment, a sintered mixture of CoO and $Fe_2O_3$ may be used in place of the CoO target for forming the inorganic compound thin film. It has been revealed that the lattice constant of CoO can be adjusted by regulating the mixing ratio of $Fe_2O_3$. Alternatively, for example, a sintered mixture of $SiO_2$ and ZnO in a ratio of 1:3 may be used in place of the $SiO_2$ target. It has been revealed that the distance of the crystal grain boundary can be adjusted by regulating the mixing ratio of $SiO_2$/ZnO.

Further, an NiO—$Al_2O_3$ thin film was also successfully formed by using a mixture of NiO and $Al_2O_3$, for example, in a ratio of 1:3 in order to form the inorganic compound thin film. This thin film also had a honeycomb structure in the same manner as the thin film obtained in this embodiment.

Third Embodiment

In this embodiment, a magnetic disk having the same stacking structure as that described in the first embodiment was produced. The concave/convex structure of the magnetic disk will be explained in detail. An inorganic compound thin film 2 was formed on a substrate 1 in the same manner as in the first embodiment except that a mixture of CoO and $SiO_2$ in a ratio of 2:1 was used as a target for the ECR sputtering for the inorganic compound thin film 2.

The surface structure of the inorganic compound thin film 2 obtained as described above was equivalent to the structure obtained in the first embodiment. The magnetic disk had a honeycomb structure as shown in FIG. 3. According to the observation with TEM, the size of the regular hexagonal crystal grain was 10 nm, and the distance between crystal grains was 2 nm. The other structural features were the same as those of the inorganic compound thin film 2 obtained in the first embodiment.

Figure 8:
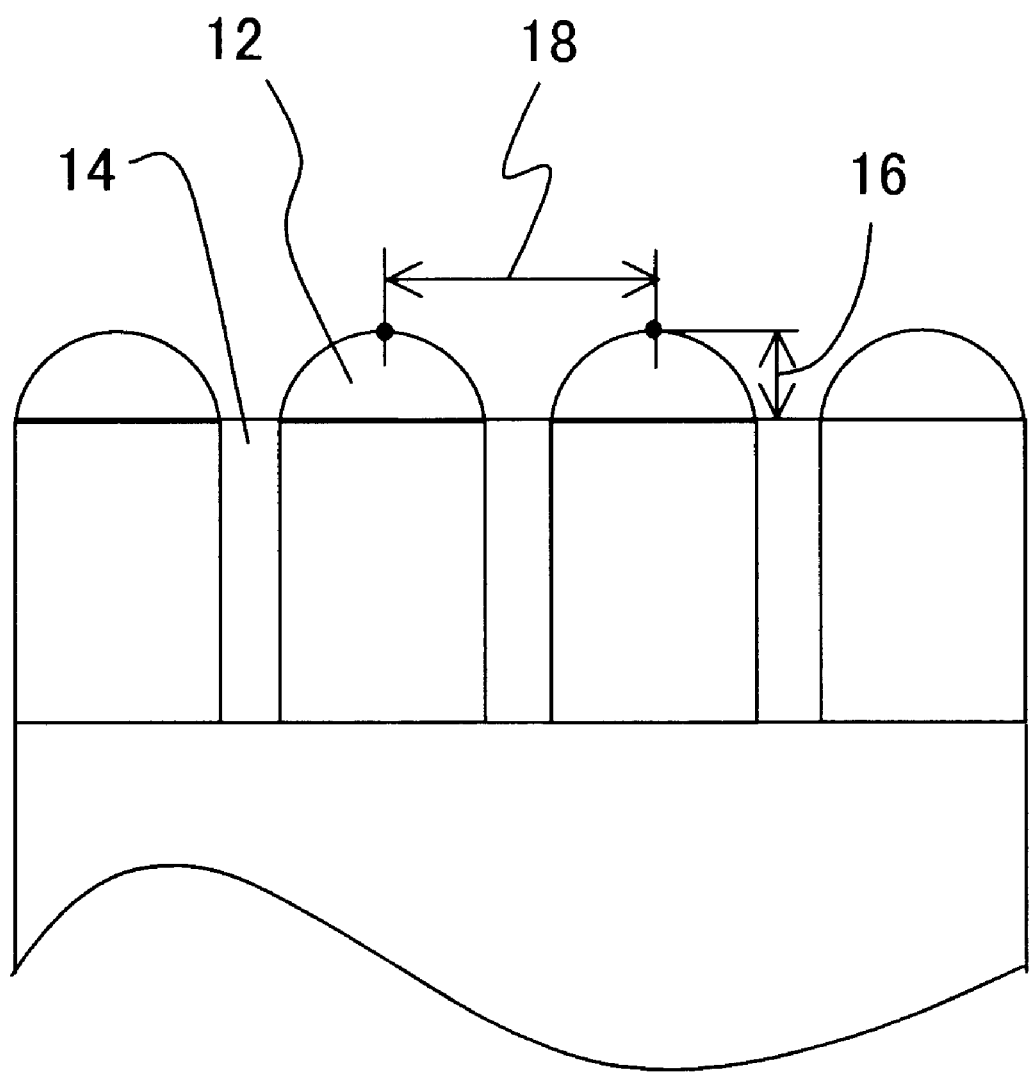
FIG. 8 conceptually illustrates a surface structure of an underlying layer of a magnetic disk produced in the third embodiment.

It was revealed that concave/convex portions corresponding to the honeycomb structure existed on the surface of the CoO—$SiO_2$ film. According to the analysis for the crystalline feature based on the X-ray diffraction, it was revealed that the convex portion was a crystalline phase corresponding to the crystal grains 12, and the concave portion was amorphous corresponding to the crystal grain boundary 14. The concave/convex configuration in cross section of the CoO—$SiO_2$ film was measured with the interatomic force microscope (AFM). As shown in FIG. 8, taking notice of one peak (convex portion: crystal grain) as the height 16 of the convex portion, the difference in height was measured between the apex of the peak and the valley (concave portion: crystal grain boundary) nearest to the peak. As a result, the difference was 10 nm in average. This value was determined as an average value by performing the measurement for randomly selected 500 places. This value was not more than the measurement limit of AFM, and the standard deviation of measured values obtained for the 500 places was not more than 0.5 nm. According to this fact, it was revealed that one convex portion itself was relatively small, the entire CoO—$SiO_2$ film was flat, and the dispersion of the concave/convex configuration was remarkably small as well.

On the other hand, the distance in the direction parallel to the substrate surface, which ranged from the apex (center of convex portion) of a certain peak (convex portion) to the apex (center of convex portion) of the nearest peak, was measured as the distance 18 between the convex portions shown in FIG. 8. As a result, the distance 18 was 12 nm. Further, the distance between the peak (center of convex portion) and the valley (center of concave portion) was about 5.5 nm. It was revealed that the crystal grains having the convex portions are useful for the texture-equipped substrate for the magnetic disk, because such crystal grains were regularly arranged in the honeycomb configuration on the CoO—SiO$_2$ film, and the shape of the concave/convex portions and the distribution thereof were satisfactory. The concave/convex shape can be controlled by controlling the film formation temperature, the velocity of the sputtering, and the sputtering gas pressure during the sputtering. Further, the concave/convex structure may serve as a pinning site for the magnetic wall, and the concave/convex structure makes it possible to fix the edge position of the magnetic domain. The concave/convex structure effectively serves for the high density recording owing to the functions as described above.

The concave/convex structure on the CoO—SiO$_2$ film 2 was compared with the concave/convex structure existing on the surface of the substrate 1 itself. The measurement was performed with AFM for concave/convex configuration of the used glass substrate 1 in the same manner as the measurement for the concave/convex configuration of the underlying layer. In this case, the investigation was made for randomly selected squares each having one side of 300 μm at several places, and the measurement was performed for randomly selected about 500 places for each of the distance between convex portions and the height of convex portion. As a result, the distance between convex portions in the direction parallel to the substrate surface was 50 nm in average, and the height of convex portion in the direction perpendicular to the substrate surface was 60 nm. When the comparison was made for the size of the concave/convex structure obtained when the CoO—SiO$_2$ film 2 was formed on the substrate, it was revealed that the concave/convex structure of the underlying base film was different from the concave/convex structure of the substrate surface, and the concave/convex structure of the underlying base film was small. Accordingly, a CoO—SiO$_2$ film 2 was formed on another substrate having a large-sized concave/convex structure (distance between convex portions: 30 nm, height of convex portion: 100 nm). In this case, the concave/convex structure on the CoO—SiO$_2$ film gave the same results as those of the case in which the previous substrate was used. The distance between convex portions was 12 nm, and the height of convex portion was not more than 10 nm (not more than the lower measurement limit of AFM). However, it was observed that a concave/convex structure, which was 6 μm in the horizontal direction and which was not more than 10 nm in the vertical direction, was repeatedly formed as a macroscopic concave/convex structure of the CoO—SiO$_2$ film 2. Therefore, the following fact has been revealed. That is, when the CoO—SiO$_2$ film 2 having the honeycomb structure is formed by using the ECR sputtering method, the minute concave/convex portions, which are useful as the texture of the disk, are provided in a microscopic viewpoint, and the substantially flat surface is obtained irrelevant to the concave/convex structure of the substrate surface in a macroscopic viewpoint.

Subsequently, a magnetic film having a composition of Co$_{69}$Cr$_{12}$Pt$_{19}$ was formed as the magnetic film 3 on the inorganic compound thin film 2 by means of the DC sputtering method. Pure Ar was used for the electric discharge gas, and a Co$_{69}$Cr$_{12}$Pt$_{19}$ alloy target was used for the target. The pressure during the sputtering was 3 mTorr. The introduced DC electric power was 1 kW/150 mmφ. During the film formation process, the substrate was heated to 300° C. The film thickness of the magnetic film was 20 nm. The structure of the surface of the obtained magnetic film was observed with TEM. As a result, the structure of the inorganic compound 2 was reflected to the structure of the formed magnetic film. That is, Co was deposited as crystal grains corresponding to the crystal grains 12 of the inorganic compound thin film 2, and the obtained shape was regular hexagonal. The size distribution was also equivalent to that of the inorganic compound thin film 2. When the cross-sectional structure was investigated, a pillar-shaped structure (magnetic grain portion) was observed, in which the magnetic film 3 was grown with crystalline continuity with respect to the inorganic compound thin film 2. Accordingly, the crystal grain size of the magnetic film 3 can be controlled by epitaxially growing the magnetic film 3 from the crystal grains 12 of the inorganic compound as described above. The portion of the magnetic film (magnetic grain boundary portion) existing on the crystal grain boundary 14 had a structure different from that of the magnetic grain portion of the magnetic film 3, in which no pillar-shaped structure was observed unlike the magnetic grain portion. The magnetic grain boundary portion had magnetic characteristics different from those of the magnetic grain portion, and it magnetically exhibited semi-hard magnetization owing to the magnetic grain boundary portion, it is possible to reduce the magnetic coupling between the magnetic grains. Therefore, the existence of the magnetic grain boundary portion is advantageous for the high density recording as well as for the reduction of the grain size distribution.

Finally, a C film was formed as the protective film 4 to have a film thickness of 5 nm by means of the DC sputtering method. The introduced electric power density was 1 kW/150 mmφ, and the sputtering gas pressure was 5 mTorr.

Figure 9:
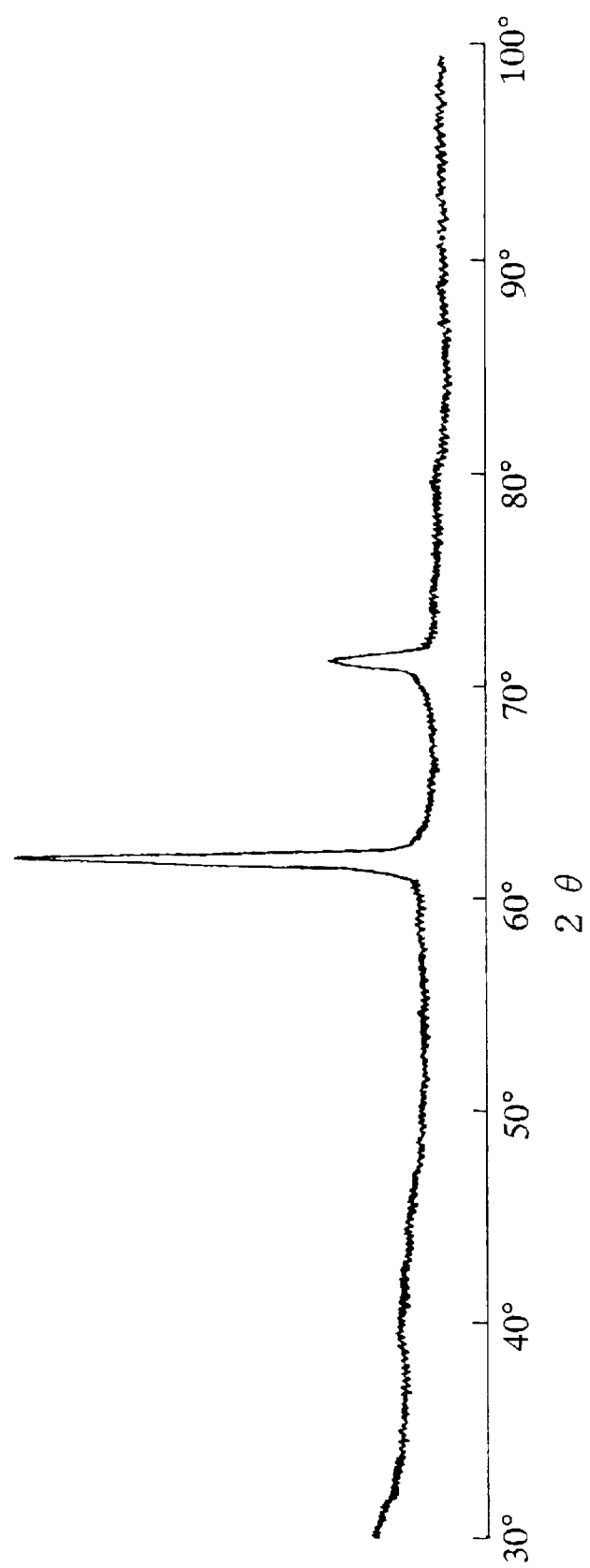
FIG. 9 shows an X-ray diffraction profile illustrating a crystal structure of a magnetic layer of the magnetic disk produced in the third embodiment.

The structure of the magnetic recording medium produced as described above was investigated by means of the X-ray diffraction method. An obtained result is shown in FIG. 9. The diffraction peak observed in the vicinity of 2θ=62.5° corresponds to (220) of CoO of the crystal grain in the inorganic compound film. The peak observed in the vicinity of 2θ=73° corresponds to (11.0) of Co of the magnetic film. The orientation of Co as described above is caused by the epitaxial growth from the crystal grains 12 in the inorganic compound film 2, and it is the result of reflection of the orientation thereof. When the inorganic compound thin film 2 was absent, then the (11.0) plane of Co was not observed, but (00.2) of Co was observed. According to this fact, it is appreciated that the inorganic compound film 2 greatly contributes to the control of orientation of the magnetic film 3.

Subsequently, the magnetic film plane was observed with the electron microscope. According to the observation, the average grain diameter of the magnetic film was 10 nm. When the grain diameter distribution was determined, it was represented by a standard deviation σ of not more than 1.5 nm, in which the grain diameter distribution was remarkably small. The distribution had the same value as that in the inorganic compound film 2. The values obtained for the inorganic compound film are reflected to the size of the crystal grain and the distribution thereof in the magnetic film. The structure of the magnetic film was a honeycomb structure with two-dimensional regular arrangement reflecting the crystal form of the magnetic grains and the crystal form of the inorganic compound. The cross-sectional structure was observed. As a result, convex portions, in which the height of convex portion was about 10 nm and the distance between convex portions was about 12 nm, were formed over the entire surfaces of the magnetic film and the protective film reflecting the structure of the inorganic compound thin film.

Subsequently, the magnetic characteristics of the magnetic film 3 were measured. The obtained magnetic characteristics were as follows. That is, the coercive force was 3.5 kOe, Isv was $2.5 \times 10^{-16}$ emu, S as the index for the angular property of hysteresis in M-H loop was 0.85, and S• was 0.91. Thus, the magnetic characteristics were satisfactory. It is appreciated that this fact means the small size of the crystal grain of the magnetic film and the small dispersion thereof, reflecting such a result that the magnetic interaction between the crystal grains is reduced. Further, it is appreciated that the medium is excellent in thermal fluctuation resistance, because minute crystal grains scarcely exist.

The magnetic recording apparatus shown in FIGS. 11 and 12 was constructed in the same manner as in the first embodiment by using the magnetic disk obtained as described above. A signal corresponding to 40 Gbits/inch$^2$ was recorded on the disk to evaluate S/N of the disk. As a result, a reproduction output of 32 dB was obtained. When the spacing distance between the head surface and the disk surface was 15 nm, the head successfully flied in a stable manner. The unit of inversion of magnetization during the recording of information, which was measured with a magnetic force microscope (MFM), included 2 to 3 individuals of magnetic grains. The zigzag pattern, which was present in the magnetization transition region, was also extremely decreased as compared with the conventional magnetic disk. When the error rate of the magnetic disk was measured, it was not more than $1 \times 10^{-5}$ as a value obtained when no signal processing was performed.

In this embodiment, the following fact was revealed. That is, the honeycomb structure was obtained, and the crystalline orientation and the structure of the magnetic film was successfully controlled even when $Fe_2O_3$—$Al_2O_3$ was formed for the inorganic compound thin film 2 in place of $CoO$—$SiO_2$.

Fourth Embodiment

This embodiment is illustrative of a case of production of a magnetic disk based on the use of a Co—$SiO_2$-based granular type magnetic film as the magnetic film.

A $CoO$—$SiO_2$ film was formed on the glass substrate with the same materials and the same condition as those used in the third embodiment. Subsequently, a Co—$SiO_2$-based magnetic film having the granular structure was produced as the magnetic film 3 by using the ECR sputtering apparatus shown in FIG. 5. A Co—$SiO_2$-based mixture (mixing ratio: Co:$SiO_2$=1:1) target was used for the target, and Ar was used for the sputtering gas. The sputtering gas pressure was 0.3 mTorr, and the introduced microwave electric power was 0.7 kW. An RF bias voltage of 500 W was applied in order to introduce the microwave. During the film formation, the substrate was heated to 300° C. The film thickness of the formed granular magnetic film was 10 nm.

The surface and the cross section of the film were observed with a high resolution transmission electron microscope. As a result, in the same manner as in the third embodiment, Co of the magnetic film 3 was epitaxially grown from the crystal phase of the inorganic compound thin film 2, and $SiO_2$ was grown from the grain boundary which surrounded the crystal grains. The cross section of the granular magnetic film had a pillar-shaped structure. Co was surrounded by $SiO_2$, the grains were separated from each other, and the magnetic interaction was greatly reduced. This provides a structure of the magnetic film effective for the high density magnetic recording. The macroscopic concave/convex structure of the surface of the magnetic recording medium was such that the size in the horizontal direction was 6 μm and the size in the vertical direction was not more than 10 nm (not more than the lower limit of the measurement with AFM). The concave/convex structure reflects the concave/convex structure of the inorganic compound film.

In this embodiment, the ECR sputtering method was used to produce the magnetic film. However, for example, the magnetron sputtering method may be used with a mixture (or composite) target of Co—$SiO_2$. However, in this case, the shape of crystal grain is slightly deteriorated in some cases as compared with the case in which the ECR sputtering method is used.

A protective film 4 was produced on the magnetic film in accordance with the ECR sputtering method by using the apparatus shown in FIG. 5. Ar was used for the sputtering gas, and a ring-shaped carbon target was used for the target. The gas pressure during the sputtering was 0.3 mTorr, and the introduced microwave electric power was 0.7 kW. An RF bias voltage of 500 V was applied to the target in order that the plasma exited by the microwave was introduced in the direction toward the target. The thickness of the protective film was 2 nm. The surface of the magnetic disk after the formation of the protective film was observed with TEM. As a result, the appearance was equivalent to that of the magnetic film surface. Further, the magnetic film surface was completely covered with the protective film.

The magnetic characteristics of the magnetic recording medium produced as described above were measured. The following magnetic characteristics were obtained. That is, the coercive force was 4.0 kOe, Isv was $2.5 \times 10^{-16}$ emu, S as the index for the angular property of hysteresis in M-H loop was 0.85, and S• was 0.90. Therefore, the magnetic recording medium had the good magnetic characteristics. It is appreciated that this fact means the small size of the crystal grain of the magnetic film and the small dispersion thereof, reflecting such a result that the magnetic interaction between the crystal grains is reduced. Further, it is appreciated that the medium is excellent in thermal fluctuation resistance, because minute crystal grains scarcely exist.

As Reference Example, a sample was prepared, in which a protective film 4 was formed by using the magnetron type RF sputtering method in place of the ECR sputtering method. As for the magnetic characteristics of the magnetic film of this sample, the coercive force was lowered to be 2.5 to 1.8 kOe. The magnitude of the coercive force was distributed on one sheet of the magnetic disk. According to Reference Example, it is understood that when the ECR sputtering method is used, then the coverage of the film and the density of the film are improved, and it is possible to suppress the damage on the magnetic film as well.

The magnetic recording apparatus shown in FIGS. 11 and 12 was constructed in the same manner as in the first embodiment by using the magnetic disk obtained as described above. A signal corresponding to 40 Gbits/inch$^2$ was recorded on the disk to evaluate S/N of the disk. As a result, a reproduction output of 32 dB was obtained. The unit of inversion of magnetization during the recording of information, which was measured with a magnetic force microscope (MFM), included 2 to 3 individuals of magnetic grains. The zigzag pattern, which was present in the magnetization transition region, was also extremely decreased as compared with the conventional magnetic disk. Further, neither thermal fluctuation nor demagnetization due to heat was caused. This results from the fact that the distribution of the size of the crystal grains of the magnetic film is small. When the error rate of the magnetic disk was measured, it was not more than $1\times10^{-12}$ as a value obtained when no signal processing was performed. When the distance between the head and the surface of the magnetic disk was 15 nm, the head stably flied. On the other hand, when the magnetic disk, which had the inorganic compound film produced by the magnetron sputtering method in place of the ECR sputtering method, was driven under the same condition, then no stable reproduction signal was obtained, and the head crash occurred. The reason of the failure to obtain the stable reproduction signal is as follows. That is, the concave/convex structure of the surface of the magnetic disk exceeds the range in which the distance between the magnetic head and the disk surface can be controlled to be constant, and the distance between the head and the surface of the magnetic disk is not constant.

Fifth Embodiment

Figure 10:
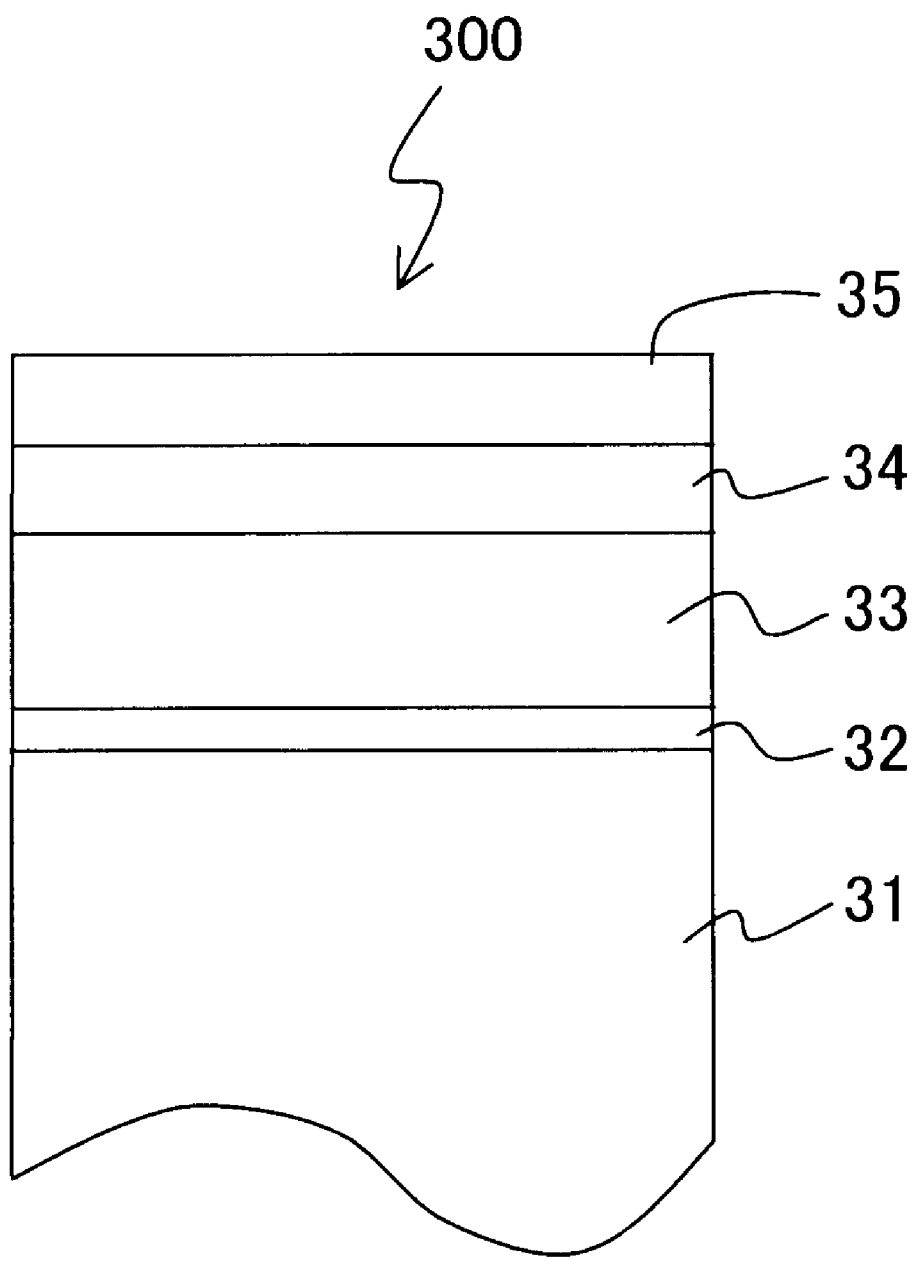
FIG. 10 shows a sectional view conceptually illustrating a structure of a magnetic disk produced in the fifth embodiment.

In this embodiment, explanation will be made for a method for producing a magnetic disk 300 comprising, on a substrate 31, a first underlying layer 32, a second underlying layer 33, a magnetic layer 34, and a protective layer 35 in this order as shown in FIG. 10, and the evaluation of the obtained respective layer and the obtained magnetic disk.
Formation of First Underlying Layer and Second Underlying Layer An Hf film was formed as the first underlying layer 32 on the glass substrate 31 having a diameter of 2.5 inches (6.25 cm) by using the ECR sputtering apparatus shown in FIG. 5. Ar was used for the sputtering gas, and the gas pressure during the sputtering was 0.3 mTorr (about 39.9 mPa). The introduced microwave electric power was 1 kW. In order to introduce the plasma excited by the microwave in the direction toward the target, a DC bias voltage of 500 V was applied to the target. The Hf film having a film thickness of 3 nm was formed by means of the ECR sputtering.

Subsequently, a $CoO-SiO_2$ film was formed as the second underlying layer (inorganic compound thin film) 33 by means of the ECR sputtering method by using the ECR sputtering apparatus shown in FIG. 5. A Co—Si alloy was used for the target. $Ar-O_2$ mixed gas was used for the sputtering gas to perform the reactive sputtering. The gas pressure during the sputtering was 0.3 mTorr, and the introduced microwave electric power was 0.7 kW. In order to introduce the plasma excited by the microwave in the direction toward the target, an RF bias voltage of 500 V was applied to the target. The formed $CoO-SiO_2$ film had a film thickness of 20 nm.
Observation and Measurement for First Underlying Layer and Second Underlying Layer (1) Observation for First Underlying Layer With SEM and X-ray Diffraction Method After the Hf film 2 was formed, the film was observed with a scanning electron microscope (SEM). As a result, it was revealed that the film was extremely flat, and no defect such as pin hole existed. The crystalline property of the Hf film was analyzed by means of the X-ray diffraction method. As a result, the Hf film was amorphous.

(2) Measurement of Composition of Second Underlying Layer and Observation With TEM and $\mu$-EDX The composition of the $CoO-SiO_2$ film formed on the Hf film was investigated. It was revealed that CoO and $SiO_2$ were in a ratio of 2:1 by means of the quantitative analysis for Co and Si based on the use of fluorescent X-ray.

The planar structure of the $CoO-SiO_2$ film 33 was observed in the bright field with a high resolution transmission electron microscope (TEM). The observed image was similar to the structure shown in FIG. 3. The $CoO-SiO_2$ thin film 33 was an aggregate of regular hexagonal crystal grains 12, and the crystal grains 12 were regularly arranged two-dimensionally with the crystal grain boundary 14 intervening therebetween. Subsequently, the cross section of the thin film was observed. As a result, it was observed that the regular hexagonal crystal grains 12 had a pillar-shaped structure grown in the direction perpendicular to the substrate surface. That is, it was revealed that the entire $CoO-SiO_2$ film 33 had a honeycomb structure. It was also revealed that the pillar-shaped structure was epitaxially grown with a uniform grain diameter in the growth direction.

The crystal grain 12 and the crystal grain boundary 14 of the $CoO-SiO_2$ film were analyzed by means of the energy dispersion type X-ray analysis for an extremely minute area ($\mu$-EDX analysis). As a result, the crystal grain 12 was composed of CoO, and the crystal grain boundary 14 was composed of $SiO_2$. The distance between the crystal grains, i.e., the width of the crystal grain boundary 14 was 0.5 to 1.0 nm.

The lattice image of the $CoO-SiO_2$ film was observed. As a result, it was confirmed that the interior of the regular hexagonal cylinder of the crystal grain was crystalline, and the crystal grain boundary was amorphous. The lattice constant was determined. As a result, the lattice constant had a value approximately equal to the value of cobalt.

It is noted that $SiO_2$ plays an important role to allow the structure to have the regularity, and $SiO_2$ determines the spacing distance between the crystal grains to be formed. It is possible for the spacing distance to select a desired value easily and arbitrarily by changing the composition of the target (for example, the ratio between Co and Si or the ratio between CoO and $SiO_2$), i.e., the $SiO_2$ concentration. However, if the $SiO_2$ concentration is lowered, then the spacing distance between the grains is narrowed (crystal grains make approach to one another), and any disorder is simultaneously observed in the shape of grain. On the contrary, if $SiO_2$ exists in a large amount, the deposition and the growth of CoO are suppressed. Therefore, it is desirable that the spacing distance is not more than 2 nm. An appropriate range of the spacing distance between crystal grains is 0.5 to 2 nm. The $SiO_2$ concentration was controlled so that the appropriate range was realized.

The result of observation with TEM was used to analyze the crystal grain diameter of the $CoO-SiO_2$ film (spacing distance between the opposite sides of the regular hexagon), the distribution thereof, and the number of grains located to surround one crystal grain (hereinafter referred to as "number of coordinated grains"). At first, for the crystal grain diameter, the grains existing in a randomly selected square area having one side of 200 nm were investigated. As a result, the average grain diameter was 10 nm. The grain diameter distribution was a normal distribution. The standard deviation ($\sigma$) was determined to be 0.5 nm. When the number of coordinated grains was investigated for 300 individuals of crystal grains, it was 6.01 in average. This fact indicates that the dispersion of the grain diameter of the crystal grain is small, and the regular hexagons of the crystal grains are arranged extremely regularly in the honeycomb configuration in the plane parallel to the substrate surface.

The structure in the vicinity of the interface between the $CoO-SiO_2$ layer and the Hf layer was investigated in detail by means of the lattice image observation. As a result, the crystal grains having the honeycomb configuration as described above were grown from the top of the Hf layer, and the initial growth layer, which was an aggregate of microcrystals with no honeycomb structure as found in Comparative Example as described later on, was not observed.

(3) Observation for Second Underlying Layer With X-ray Diffraction Method

The crystal structure of the CoO—SiO$_2$ thin film was observed by means of the X-ray diffraction method. According to an obtained profile, only a diffraction peak of (220) of CoO appeared in the vicinity of 2θ=62.5° in the same manner as in the chart shown in FIG. 2. This fact indicates that CoO is subjected to crystalline orientation in only one direction in the thin film. This crystal structure can be changed by controlling the film formation condition and the composition as described later on.

Formation of Magnetic Layer

Subsequently, a Co—SiO$_2$ magnetic film having a granular structure was formed as a magnetic layer on the CoO—SiO$_2$ film as the second underlying layer by means of the ECR sputtering method. A Co—SiO$_2$ mixture (mixing ratio was Co:SiO$_2$=1:1) was used for the target, and Ar was used for the sputtering gas. The gas pressure of the sputtering gas was 3 mTorr, and the introduced microwave electric power was 0.7 kW. The RF bias voltage was 500 W, which was applied to the target in order that the plasma excited by the microwave was introduced in the direction toward the target. The glass substrate was heated to 300° C. during the ECR sputtering. The granular type Co—SiO$_2$ magnetic film was formed to have a film thickness of 10 nm by means of the ECR sputtering method performed under the condition as described above. The CoO—SiO$_2$ film as the second underlying layer and the granular type Co—SiO$_2$ film as the magnetic layer were observed with TEM. As a result of the observation for the surface, it was revealed that the granular type Co—SiO$_2$ film of the magnetic layer also had a honeycomb structure reflecting the honeycomb structure of the CoO—SiO$_2$ film as the underlying base. The cross sections of the two layers were observed. As a result, it was revealed that the magnetic grains of Co of the granular type Co—SiO$_2$ film were epitaxially grown from the top of the crystal grains of the CoO—SiO$_2$ film. The magnetic grains were grown in a pillar-shaped configuration from the crystal grains of the second underlying layer in the direction perpendicular to the substrate surface while maintaining a constant grain diameter of regular hexagon. SiO$_2$ of the magnetic layer was grown on the top of the crystal grain boundary for surrounding the crystal grains of the second underlying layer. It is understood that the magnetic interaction between the magnetic grains is greatly reduced owing to the separation of the individual magnetic grains by the boundary of SiO$_2$ having a uniform width, because Co of magnetic grain is surrounded by SiO$_2$ in the magnetic layer. The structure of the granular type Co—SiO$_2$ film is preferred to realize a magnetic recording medium having a high density, because the structure of the granular type Co—SiO$_2$ film makes it possible to decrease the unit of inversion of magnetization.

As a result of the observation with an interatomic force electron microscope (AFM), it was found that the concave/convex structure was present on the surface of the granular type Co—SiO$_2$ film. The concave/convex structure was 6 μm in the direction parallel to the substrate surface, and it was not more than 10 nm in the vertical direction (not more than the measurement lower limit of AFM). This value is small as compared with scratches and irregularities on the substrate surface, indicating the fact that the surface of the magnetic layer is smooth, and it is possible to avoid any influence of the roughness of the substrate surface on the surface of the magnetic layer. As a result of comparison with the result obtained by observing the CoO—SiO$_2$ film as the second underlying layer with AFM, it was found that the concave/convex structure of the magnetic layer reflected the morphology of the second underlying layer.

The magnetic characteristics of the granular type Co—SiO$_2$ film as the magnetic layer were measured. The obtained magnetic characteristics were as follows. That is, the coercive force was 4.0 kOe, Isv was 2.5×10$^{-6}$ emu, S as the index for the angular property of hysteresis in M-H loop was 0.85, and S* was 0.90. Thus, the magnetic characteristics were good. This results from the fact that the magnetic grain diameter of the granular type Co—SiO$_2$ film is small, the dispersion thereof is also small, and the magnetic interaction between the magnetic grains is reduced. The large coercive force was obtained, because Co was pillar-shaped and it was oriented.

Formation of Protective Film

A carbon film as a protective layer was formed on the granular type Co—SiO$_2$ film formed as described above, by using the ECR sputtering method. Ar was used for the sputtering gas, and a ring-shaped carbon target was used for the target. The gas pressure during the sputtering was 3 mTorr, and the introduced microwave electric power was 1 kW. A DC bias voltage of 500 V was applied to the target in order that the plasma excited by the microwave was introduced in the direction toward the target. The carbon protective film was formed to have a film thickness of 2 nm.

After the carbon film was formed on the granular type Co—SiO$_2$ film as described above, the surface was observed with TEM. As a result, it was revealed that a small concave/convex structure, which reflected the honeycomb structure in the same manner as the surface of the granular type Co—SiO$_2$ film as the magnetic layer, was present, and the surface of the magnetic film was completely covered with the protective film.

COMPARATIVE EXAMPLE

In this example, magnetic disks were produced in the same manner as in the embodiment described above for a case in which a first underlying layer was provided with a thickness of 3 nm and for a case in which no first underlying layer was provided, in order to confirm the effect of the first underlying layer. However, in any case, the magnetic layer was composed of a Co$_{69}$Cr$_{19}$Pt$_{12}$ film. The surface and the cross section of the underlying layer formed as described above were observed with TEM. In any of the magnetic disks, a planar structure was observed, in which regular hexagonal crystal grains having a grain diameter of 9 nm were regularly arranged to form a honeycomb structure. However, when the cross section perpendicular to the substrate surface was observed, the following feature was observed for the magnetic disk provided with no first underlying layer. That is, the initial growth layer having no specified structure was grown over a range of not less than about 20 nm, and the regular honeycomb structure observed in this embodiment was observed thereon. On the other hand, in the case of the magnetic disk provided with the first underlying layer, the initial growth layer was not present in the second underlying layer.

When the first underlying layer was not provided, the surface of the Co$_{69}$Cr$_{19}$Pt$_{12}$ film as the magnetic layer was observed with the electron microscope to determine the magnetic grain diameter distribution of magnetic grains. As a result, σ was about 2 nm. On the other hand, when the first underlying layer was provided, the magnetic grain diameter distribution of magnetic grains was determined. As a result, σ was about 0.7 nm. That is, when the underlying layer was provided as the two layers, then the magnetic grain diameter in the magnetic layer was successfully controlled more precisely, the grain diameter of the magnetic grains was more uniform, and the dispersion was successfully decreased.

As understood from Comparative Example, when the first underlying layer is not provided, it is necessary to grow the underlying layer up to a film thickness of 30 nm until the honeycomb structure appears. On the other hand, when the first underlying layer was provided, the second underlying layer having the honeycomb structure was successfully grown directly from the first underlying layer owing to the presence of the first underlying layer having the thickness of only 3 nm. That is, in the magnetic recording medium according to the present invention, it is possible to avoid the appearance of the initial growth layer which is not subjected to the crystalline orientation. Therefore, it is possible to reduce the thickness of the underlying layer, and consequently the thickness of the entire recording medium.

According to the fact described above, the first underlying layer has such an effect that the formation of the initial growth layer of the second underlying layer having no specified crystal structure is suppressed by stacking the second underlying layer on the first underlying layer. Therefore, the film thickness of the portion corresponding to the initial growth layer can be decreased. Accordingly, it is possible to shorten the time required to form the film, and it is possible to reduce the production cost as well. Further, when the first underlying layer is provided, then the adhesive force between the substrate and the magnetic layer is improved, and the magnetic layer can be scarcely peeled off. Therefore, it is possible to provide the magnetic recording medium which scarcely undergoes any physical damage. When the crystalline material is used for the first underlying layer, it is possible to more precisely control the crystal structure of the second underlying layer to be formed thereon.

The magnetic recording apparatus shown in FIGS. 11 and 12 was constructed by using the magnetic disk obtained in the fifth embodiment in the same manner as in the first embodiment. A signal corresponding to 50 Gbits/inch$^2$ was recorded on the disk to evaluate S/N of the disk. As a result, a reproduction output of 30 dB was obtained. The unit of inversion of magnetization during the recording of information, which was measured with a magnetic force microscope (MFM), included 1 to 2 individuals of magnetic grains. It was revealed that this value was sufficiently small as compared with the unit of inversion of magnetization of 5 to 10 individuals of the conventional magnetic disk. Accordingly, the portion (zigzag pattern), which corresponded to the boundary between adjoining units of inversion of magnetization, was remarkably small as compared with the conventional magnetic disk. This result indicates the fact that the boundary line of the area of inversion of magnetization is smoothened, because the magnetic grains are fine and minute, and the unit of inversion of magnetization is small as well. Neither thermal fluctuation nor demagnetization due to heat was caused. This is because of the fact that the grain diameter distribution of the granular type Co—SiO$_2$ film as the magnetic layer was decreased as compared with the conventional magnetic layer. The error or defect rate of the disk was measured. As a result, the value was not more than $1\times10^{-12}$ when the signal processing was not performed. The distance between the magnetic head and the magnetic disk surface was 12 nm. The magnetic recording apparatus succeeded in allowing the magnetic head to flow in a stable manner. However, when the magnetic disk having neither first underlying layer nor second underlying layer was driven under the same condition, then no stable reproduction signal was obtained in some cases, and the head crash was caused in other cases. The reason of the failure to obtain the stable signal is as follows. The surface irregularity of the disk having neither first underlying layer nor second underlying layer is large, exceeding a range in which the magnetic recording apparatus successfully makes control so that the distance between the magnetic head and the magnetic disk surface is constant.

In this embodiment, hafnium was used for the first underlying layer. However, other than the above, it is allowable to use any one of an alloy thin film principally containing cobalt and further containing at least one element selected from titanium, tantalum, niobium, zirconium, and chromium, and an inorganic compound thin film composed of at least one selected from silicon nitride, silicon oxide, and aluminum oxide. Also in this case, it was confirmed that the honeycomb structure of the second underlying layer was successfully grown from the first underlying layer. Especially, those usable as the alloy principally containing cobalt include, for example, Co—Ta—Zr, Co—Nb—Zr, Co—Ti—Zr, Co—Cr—Zr, Co—Nb, Co—Ta, Co—Ti, Co—Nb, Co—Zr, and Co—Cr. In this case, in order to allow the cobalt alloy to be non-magnetic, it is possible to contain an additive element in an amount of about 30%.

In this embodiment, when the CoO—SiO$_2$ film as the second underlying layer was formed, the reactive sputtering was executed, in which the Co—Si alloy was used for the target, and the Ar—O$_2$ mixed gas was used for the sputtering gas. Other than the above, a sintered mixture of CoO and SiO$_2$ in a ratio of 2:1 may be used for the target, and Ar may be used for the sputtering gas. However, the reactive sputtering used in the embodiment has the high film formation velocity, and hence it is advantageous in view of productivity. Further, a second underlying layer having a honeycomb structure is also obtained in accordance with the reactive sputtering by using targets of single sintered materials of Co and Si respectively and forming a film by means of the two-target simultaneous sputtering. In any of the sputtering methods, it is important to precisely control the energy of sputtering particles. It has been revealed that more precise control is performed with ease by using the ECR sputtering method.

REFERENCE EXAMPLE

As Reference Example, a CoO—SiO$_2$ layer as a second underlying layer was formed by means of the ordinary magnetron sputtering method. The structure of the CoO—SiO$_2$ film obtained by the magnetron sputtering method was analyzed. As a result, the average grain diameter was 10 nm, and the grain diameter distribution was a normal distribution. However, σ was 1.2 nm, and the dispersion of the grain diameter was large. When 300 individuals of crystal grains were investigated, the number of coordinated grains was 6.30 in average. The regularity was slightly lowered. According to this fact, it is understood that the regularity of the structure of the inorganic compound film is more improved when the ECR sputtering method is used.

The ECR sputtering method is also effective for the Hf film as the first underlying layer. When the Hf film was formed by using the DC sputtering method or the RF sputtering method, then the surface irregularity of the CoO—SiO$_2$ film formed thereon was increased, and the deficiency of the crystal growth of the CoO—SiO$_2$ film was suddenly increased. When 300 individuals of crystal grains were investigated, the number of coordinated grains was 6.08 in average, and the regularity was slightly lowered. If it is assumed that a magnetic layer is formed thereon, it is easy to postulate the decrease in regularity of the crystal structure of the magnetic layer. Therefore, it is more desirable to use the ECR sputtering method when the first underlying layer and the second underlying layer are formed.

In this embodiment, the ECR sputtering method was used to form the carbon film as the protective layer. As Reference Example, a protective film was formed by using the magnetron type RF sputtering method to produce a magnetic disk. The magnetic characteristics of the magnetic disks were compared. The coercive force was lowered to be 2.5 to 1.8 kOe in the case of the magnetic disk having the carbon film formed by means of the magnetron type RF sputtering method, as compared with the case in which the carbon film was formed by means of the ECR sputtering method. Simultaneously, the coercive force was greatly uneven over one sheet of the magnetic disk. As described above, it has been revealed that when the ECR sputtering method is used for the formation of the protective layer, then the magnetic layer can be uniformly covered with the carbon film, the formed carbon film is dense, and it is also possible to suppress the damage on the magnetic layer during the formation of the film.

Sixth Embodiment

Figure 13:
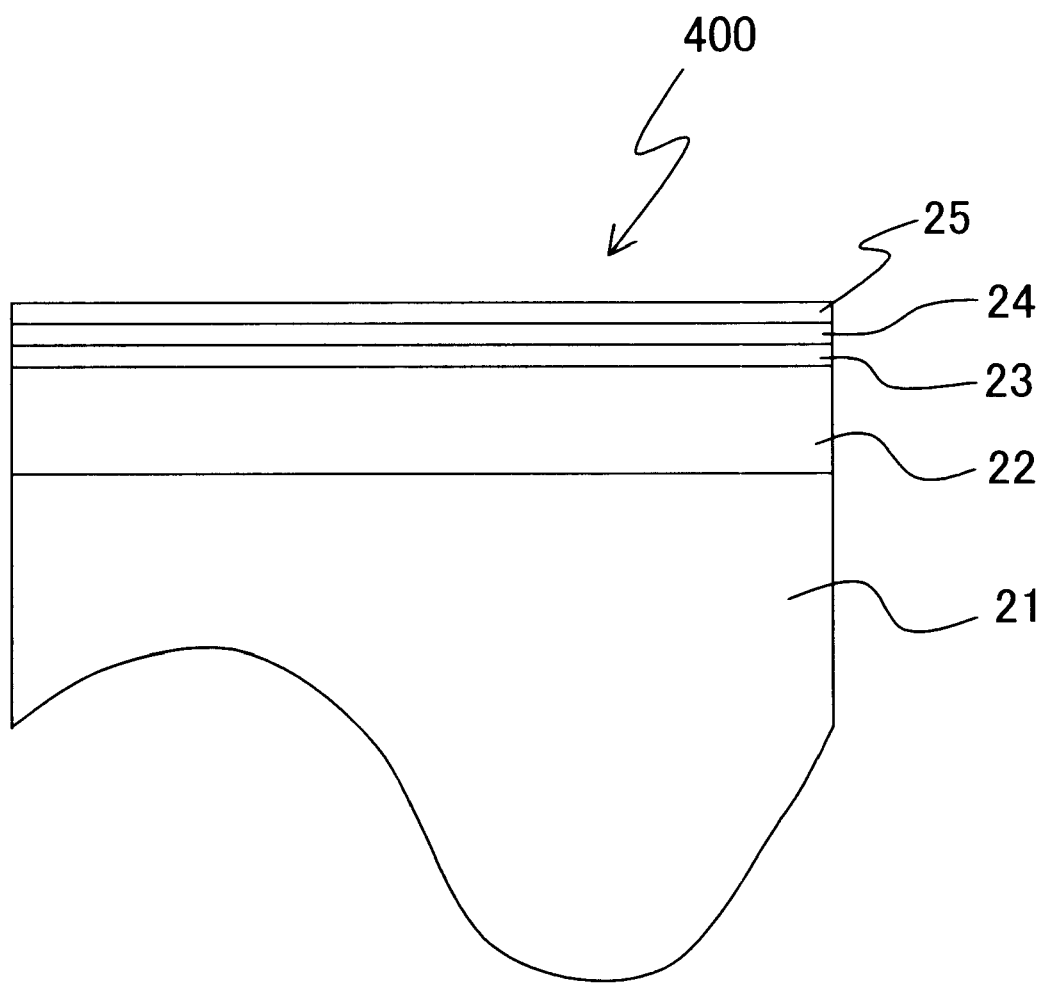
FIG. 13 shows a sectional view conceptually illustrating a structure of a magnetic disk produced in the sixth embodiment.

In this embodiment, explanation will be made for a method for producing a magnetic disk comprising an underlying base film 22, a control film 23, a magnetic film 24, and a protective film 25 stacked on a substrate 21 in this order as shown in FIG. 13, and evaluation of the obtained respective films and the obtained magnetic disk. Especially, in this embodiment, an MgO—SiO$_2$ film was used for the underlying base film 22, and a Co-based alloy was used for the magnetic film 24.

Formation of Underlying Layer

The MgO—SiO$_2$ film was formed as the underlying base film 22 on the glass substrate 21 having a diameter of 2.5 inches (6.5 cm) by means of the ECR sputtering method by using the apparatus shown in FIG. 5. A material, which was obtained by mixing MgO and SiO$_2$ in a ratio of 3:1 followed by being sintered to have a ring-shaped configuration, was used for the target. Ar was used for the sputtering gas. The gas pressure during the sputtering was 0.3 mTorr (about 39.9 mPa), and the introduced microwave electric power was 1 kW. An RF bias voltage of 500 W was applied to the target in order that the plasma excited by the microwave was introduced in the direction toward the target. The MgO—SiO$_2$ film was formed to have a film thickness of 20 nm by means of the ECR sputtering.

Figure 14:
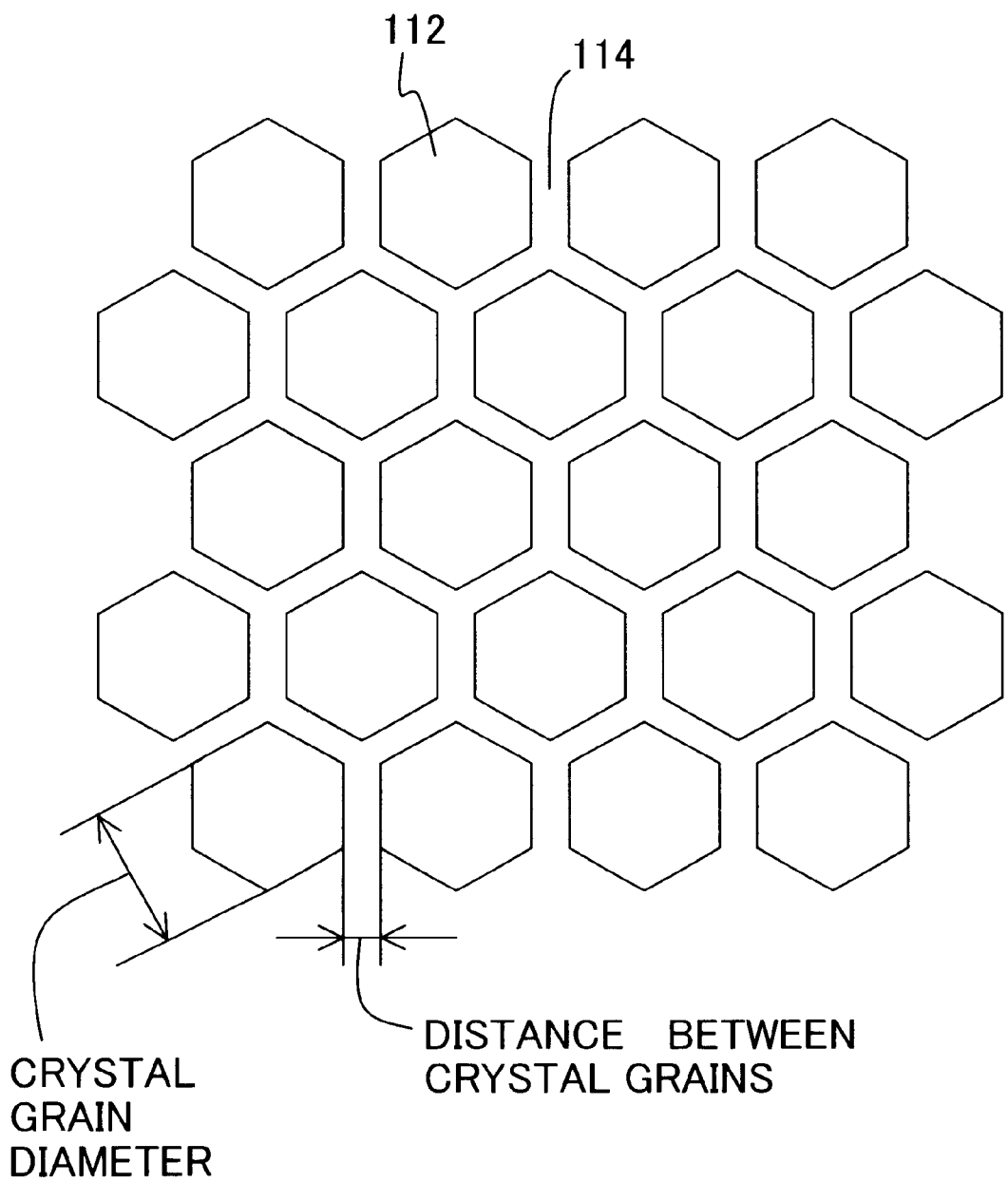
FIG. 14 shows a plan view conceptually illustrating a structure of an underlying layer of the magnetic disk produced in the sixth embodiment.

Observation for Underlying Base Film With TEM, Analysis by X-ray Diffraction Method, and Measurement of Composition After the MgO—SiO$_2$ film 22 was formed as the underlying base film as described above, the surface of the film was observed with a high resolution transmission electron microscope (TEM). An observed image is shown in FIG. 14. The MgO—SiO$_2$ thin film 22 was an aggregate of crystal grains 112 each having a regular hexagonal shape in which the distance between opposite sides was 10 nm. The crystal grains 112 were regularly arranged two-dimensionally (in a honeycomb configuration) with a crystal grain boundary 114 intervening therebetween. Subsequently, the cross section of the thin film 22 was observed. As a result, the crystal grains 112 were grown in a pillar-shaped configuration in the direction perpendicular to the substrate 21. The portion in which the crystalline feature was disordered, i.e., the initial growth layer was not observed at the interface between the substrate and the thin film 22. It was revealed that the pillar-shaped structure was epitaxially grown with a uniform grain diameter in the direction of growth. The distance between the crystal grains (width of the crystal grain boundary 114) was 0.8 nm. A desired value can be selected for the spacing distance by changing the composition of the target (for example, the ratio between MgO and SiO$_2$).

According to a result of the measurement of the composition by means of the Auger electron spectroscopy analysis for an extremely minute area ($\mu$-AES analysis), it was revealed that the crystal grains were composed of oxide of magnesium, and the crystal grain boundary principally contained silicon oxide.

According to the observation for the lattice image of the MgO—SiO$_2$ film 22 as described later on, it was revealed that the oxide of magnesium was crystalline, and the crystal grain boundary was amorphous. When the lattice constant of the crystal grain was determined, it was approximately equal to the value of Co for constructing the magnetic grains as described later on.

Subsequently, the TEM observation result for the surface of the MgO—SiO$_2$ film 22 was used to analyze the crystal grain diameter (spacing distance between the opposite sides of the regular hexagon), the crystal grain diameter distribution, and the number of grains (number of coordinated grains) located to surround one crystal grain. Crystal grains of 500 individuals were extracted as samples for the analysis. At first, the crystal grain diameter was determined. As a result, the crystal grain diameter was 10 nm in average. The grain diameter distribution was a normal distribution. When the standard deviation ($\sigma$) was determined, it was 0.5 nm (5% of the average grain diameter). The number of coordinated grains was 6.02 in average. This fact indicates that the crystal grain diameter is scarcely dispersed, and the crystal grains of the regular hexagonal cylinders are arranged extremely regularly in a honeycomb configuration in the plane parallel to the substrate surface.

Figure 15:
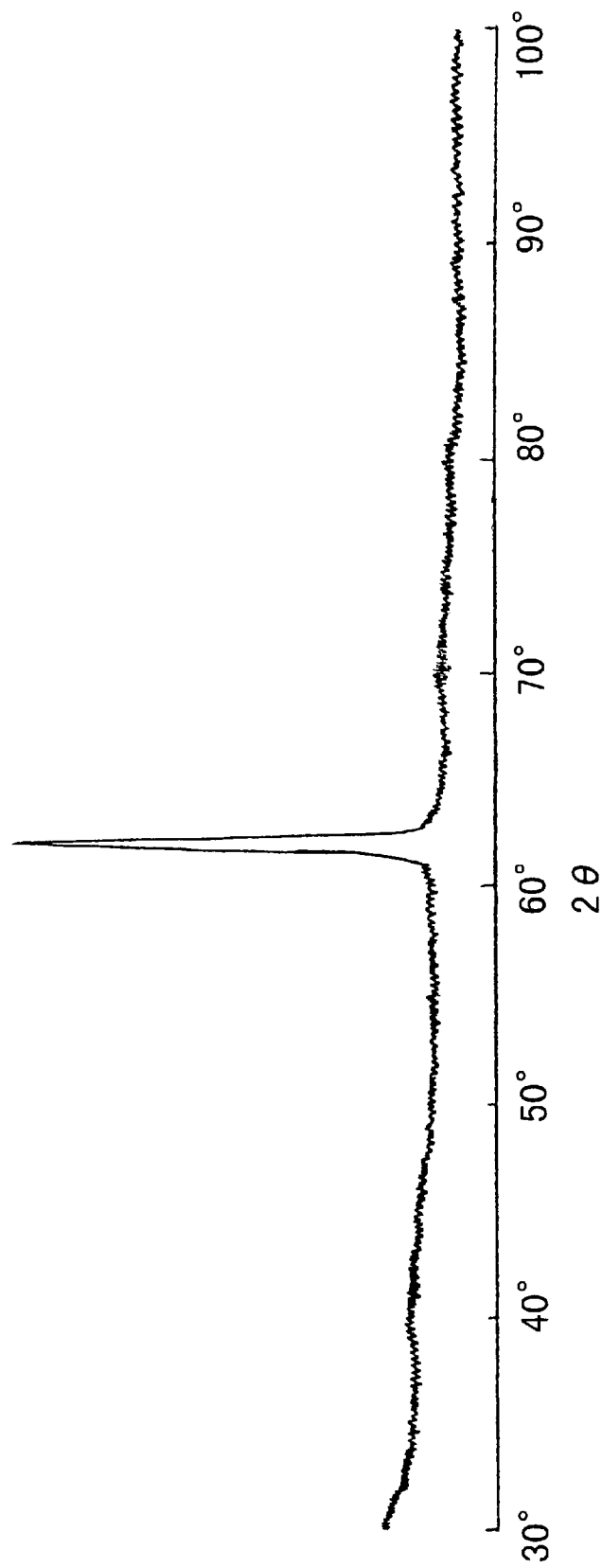
FIG. 15 shows an X-ray diffraction profile illustrating a crystal structure of the underlying layer of the magnetic disk produced in the sixth embodiment.

The crystal structure of the MgO—SiO$_2$ film 22 was analyzed by means of the X-ray diffraction. An obtained diffraction profile is shown in FIG. 15. According to this result, a diffraction peak of MgO was observed in the vicinity of $2\theta=62.5°$, and no other peak was observed. This fact indicates that MgO is subjected to crystalline orientation in only one direction in the thin film. No deviation from the stoichiometric composition was found in the MgO—SiO$_2$ thin film 22 formed in this case, owing to the use of the ECR sputtering method. Therefore, it is indicated that the metal film such as the magnetic film, which is formed on the MgO—SiO$_2$ film, is not oxidized, because no free oxygen exists in the MgO—SiO$_2$ film. Therefore, when this film is used for a magnetic recording medium, it is possible to produce the medium which ensures high reliability for a long period of time.

Formation of Control Film

A Cr$_{90}$Ru$_{10}$ film was formed as the control film 23 on the MgO—SiO$_2$ film 22 by means of the ECR sputtering method. A CrRu alloy was used for the target, and Ar was used for the sputtering gas. The gas pressure during the sputtering was 3 mTorr, and the introduced microwave electric power was 1 kw. An RF bias voltage of 500 V was applied to the target in order that the plasma excited by the microwave (2.93 GHz) was introduced in the direction toward the target. The $Cr_{90}Ru_{10}$ film 23 was formed to have a film thickness of 5 nm by means of the ECR sputtering method.

Formation of Magnetic Film

A $Co_{68}Cr_{17}Pt_{12}Ta_3$ film was formed as the magnetic film 24 on the control film 23 formed as described above, by means of the DC sputtering method. A Co—Cr—Pt—Ta alloy having the same composition as the composition of the objective film was used for the target, and Ar was used for the sputtering gas. The gas pressure during the sputtering was 3 mTorr. The introduced DC electric power was 1 kW/150 mm$\phi$. The substrate was heated to 300° C. during the formation of the $Co_{68}Cr_{17}Pt_{12}Ta_3$ film 3. The $Co_{68}Cr_{17}Pt_{12}Ta_3$ film 3 was formed to have a film thickness of 10 nm by means of the DC sputtering method under the condition as described above.

Observation for Magnetic Film With TEM, Analysis by X-ray Diffraction Method, and Measurement of Composition The surface of the $Co_{68}Cr_{17}Pt_{12}Ta_3$ film (magnetic film 24) formed as described above was observed with TEM. According to the observation, the $Co_{68}Cr_{17}Pt_{12}Ta_3$ film also had a honeycomb structure reflecting the honeycomb structure of the MgO—$SiO_2$ film (underlying base film 22). The average grain diameter determined by the observation for the surface was 10 nm, and σ in the grain diameter distribution was not more than 0.6 nm. As described above, it was revealed that the grains of the magnetic film 24 were fine and minute, the grain diameter distribution was small, and the film having the same form as that of the underlying base film 22 was obtained. Subsequently, the number of coordinated grains coordinated with one crystal grain was determined. As a result of investigation for 500 individuals of crystal grains, the number of coordinated grains was 6.01 in average which was coincident with the number of coordinated grains of crystal grains in the MgO—$SiO_2$ film 22 of the underlying base film described above. This fact indicates that the magnetic grains are continuously grown upwardly in a regular hexagonal cylinder configuration from the underlying base film, giving a structure (honeycomb structure) in which regular hexagons are regularly arranged in the plane parallel to the substrate surface as shown in FIG. 14.

Further, according to the results of the lattice image observation and the X-ray diffraction described later on, it was revealed that the magnetic grains in the $Co_{68}Cr_{17}Pt_{12}Ta_3$ film were crystalline, while the boundary between the magnetic grains (crystal grains) had a polycrystalline form. The cross section of the $Co_{68}Cr_{17}Pt_{12}Ta_3$ film was observed with TEM. As a result, it was revealed that the crystalline magnetic grains were grown from the top of the regular hexagonal crystal grains of the MgO—$SiO_2$ film as the underlying base film, and the boundary of the polycrystalline form corresponded to the crystal grain boundary of the MgO—$SiO_2$ film. That is, the following fact has been revealed. The continuity of the crystal lattice was found between the MgO—$SiO_2$ film as the underlying base film and the $CO_{68}Cr_{17}Pt_{12}Ta_3$ film as the magnetic film. The magnetic grains in the $Co_{68}Cr_{17}Pt_{12}Ta_3$ film were epitaxially grown from the crystal grains in the MgO—$SiO_2$ film.

It is known that the boundary (polycrystalline form) in the $Co_{68}Cr_{17}Pt_{12}Ta_3$ film as described above behaves as a non-magnetic member unlike the magnetic grain portion. The boundary exists in a width of 0.5 to 1.0 nm between the magnetic grains. Accordingly, the magnetic interaction between the adjoining magnetic grains is weakened. Therefore, it is easy for the individual magnetic grains (crystal grains) to behave independently upon the inversion of magnetization during the recording and the erasing. It is possible to decrease the number of magnetic grains for constructing the unit of inversion of magnetization, i.e., the area of the magnetic film.

Formation of Protective Film

Finally, a carbon film was formed as the protective film 25 by means of the ECR sputtering method. A ring-shaped carbon target was used for the target, and Ar was used for the sputtering gas. The gas pressure during the sputtering was 0.3 mTorr, and the introduced microwave electric power was 0.7 kW (frequency: 2.93 GHz). The substrate temperature during the film formation was 300° C. An RF bias voltage of 500 W was applied to the target in order that the plasma excited by the microwave was introduced in the direction toward the target. The carbon film 25 was formed to have a film thickness of 3 nm by means of the ECR sputtering method as described above. Thus, the magnetic disk 400 having the structure shown in FIG. 13 was obtained.

COMPARATIVE EXAMPLE

A magnetic disk was produced in the same manner as in the embodiment described above except that the control film was not provided unlike the embodiment.

Figure 16:
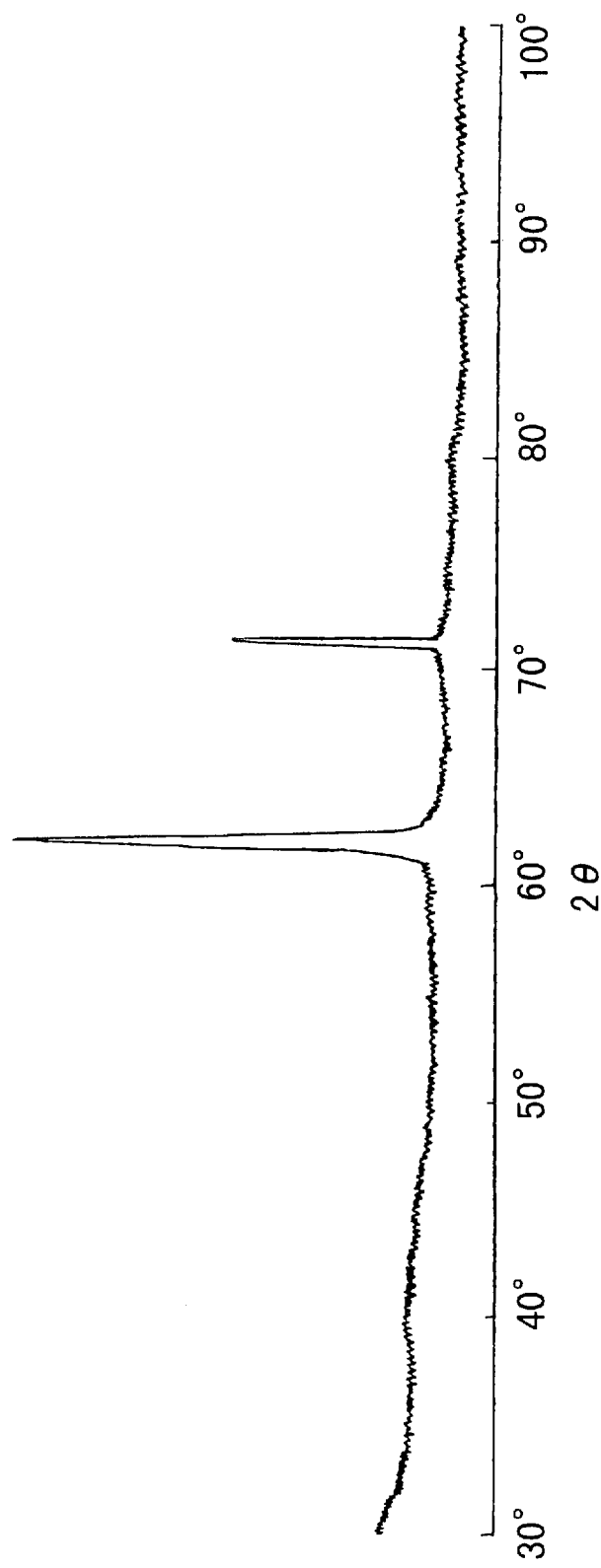
FIG. 16 shows an X-ray diffraction profile illustrating a crystal structure of a magnetic layer of the magnetic disk produced in the sixth embodiment.

Analysis of Magnetic Films of Embodiment and Comparative Example by X-ray Diffraction Method and Evaluation of Magnetic Characteristics The crystal structure was analyzed by means of the X-ray diffraction method at the stage at which the magnetic film, i.e., the $Co_{68}Cr_{17}Pt_{12}Ta_3$ film 24 was formed on the $Cr_{90}Ru_{10}$ film 23 as the control film of the magnetic disk of this embodiment. An obtained X-ray diffraction profile is shown in FIG. 16. As shown in FIG. 16, a peak indicating Co in the magnetic film was observed in the vicinity of $2\theta=72.5°$ in addition to a peak in the vicinity of $2\theta=62.5°$ indicating MgO in the MgO—$SiO_2$ film as the underlying base film. In view of the results of the structural analysis for the underlying base film and the TEM observation in combination, the peak located in the vicinity of $2\theta=72.5°$ resides in (11.0) of Co in the $Co_{68}Cr_{17}Pt_{12}Ta_3$ film as the magnetic film, indicating that Co is strongly oriented in this direction. That is, it has been revealed that the desired crystalline orientation suitable for the high density recording is intensely obtained in the magnetic film.

FIG. 18 shows an X-ray diffraction profile of the magnetic film of the magnetic disk of Comparative Example provided with no control film. When the X-ray diffraction profile of the magnetic film of the magnetic disk of Comparative Example was compared with the X-ray diffraction profile of the embodiment of the present invention, then the intensity of the peak of Co was increased, the half value width was narrowed, and the peak shape was further sharpened in the embodiment of the present invention. This indicates the fact that the deviation of the crystal lattice can be adjusted between the underlying base film and the magnetic film, and the desired crystalline orientation of Co is obtained more intensely in the magnetic film, owing to the provision of the $Cr_{90}Ru_{10}$ film as the control film on the underlying base film.

Subsequently, the magnetic characteristics of the magnetic film were measured. The obtained magnetic characteristics were as follows. That is, the coercive force was 4.0 kOe, Isv was $2.5 \times 10^{-16}$ emu, S as the index for the angular property of hysteresis in M-H loop was 0.89, and S* was 0.95. Thus, the magnetic characteristics were satisfactory. The reason why the coercive force is increased and the index to indicate the angular property is large (approximate to the angular form) as described above is that the magnetic film is grown while reflecting the honeycomb structure and the interaction between the magnetic grains is reduced, owing to the provision of the underlying base film having the honeycomb structure and the provision of the control film, i.e., the $Cr_{90}Ru_{10}$ film.

Evaluation of Magnetic Disk

Further, the magnetic disk 400 was completed by applying a lubricant onto the carbon film 25 as the protective film formed as described above. A plurality of magnetic disks were produced in accordance with the same process. The magnetic disks were coaxially attached to the spindle of the magnetic recording apparatus. The magnetic recording apparatus was constructed in the same manner as in the first embodiment, having the structure shown in FIGS. 11 and 12. The distance between the magnetic head surface and the magnetic disk was maintained to be 11 nm. A signal corresponding to 40 Gbits/inch$^2$ was recorded on the disk to evaluate S/N of the disk. As a result, a reproduction output of 36 dB was obtained. The unit of inversion of magnetization during the recording of information was measured with a magnetic force microscope. As a result, 2 to 3 individuals of magnetic grains were subjected to inversion of magnetization at once with respect to the recording magnetic field applied when 1 bit data was recorded. The portion (zigzag pattern), which corresponded to the boundary between adjoining units of inversion of magnetization, was remarkably small as compared with the conventional magnetic disk. This indicates the fact that the boundary line of the area of inversion of magnetization is smoothened, because the magnetic grains are fine and minute, and the unit of inversion of magnetization is small as well. Neither thermal fluctuation nor demagnetization due to heat was caused. This is an effect owing to the small distribution of the magnetic grain diameter of the $Co_{68}Cr_{17}Pt_{12}Ta_3$ film 24 as the magnetic film. Further, the error rate of the disk was measured. As a result, the obtained value was not more than $1 \times 10^{-5}$ when the signal processing was not performed.

In this embodiment, the Cr—Ru alloy was used for the control layer. However, other than the above, at least one element selected from molybdenum, vanadium, nickel, niobium, aluminum, titanium, tantalum, and zirconium may be added depending on the lattice constant of the magnetic layer to be formed on the control layer. The lattice constant of the control layer can be changed by adding such an element.

The DC sputtering method was used to form the magnetic layer. However, the ECR sputtering method may be used. When the ECR sputtering method is used, the magnetic layer can be formed at a low substrate temperature or at the room temperature. Further, the respective sputtering particles have equal energy. Accordingly, it is possible to highly accurately control the magnetic grain diameter and the grain diameter distribution in the magnetic layer, which is more preferred.

In this embodiment, the RF voltage was applied when the carbon film as the protective layer was formed. However, a carbon film can be formed in the same manner as in the case of application of the RF voltage, even when a DC voltage is applied, because carbon is a conductive material.

Seventh Embodiment

Figure 17:
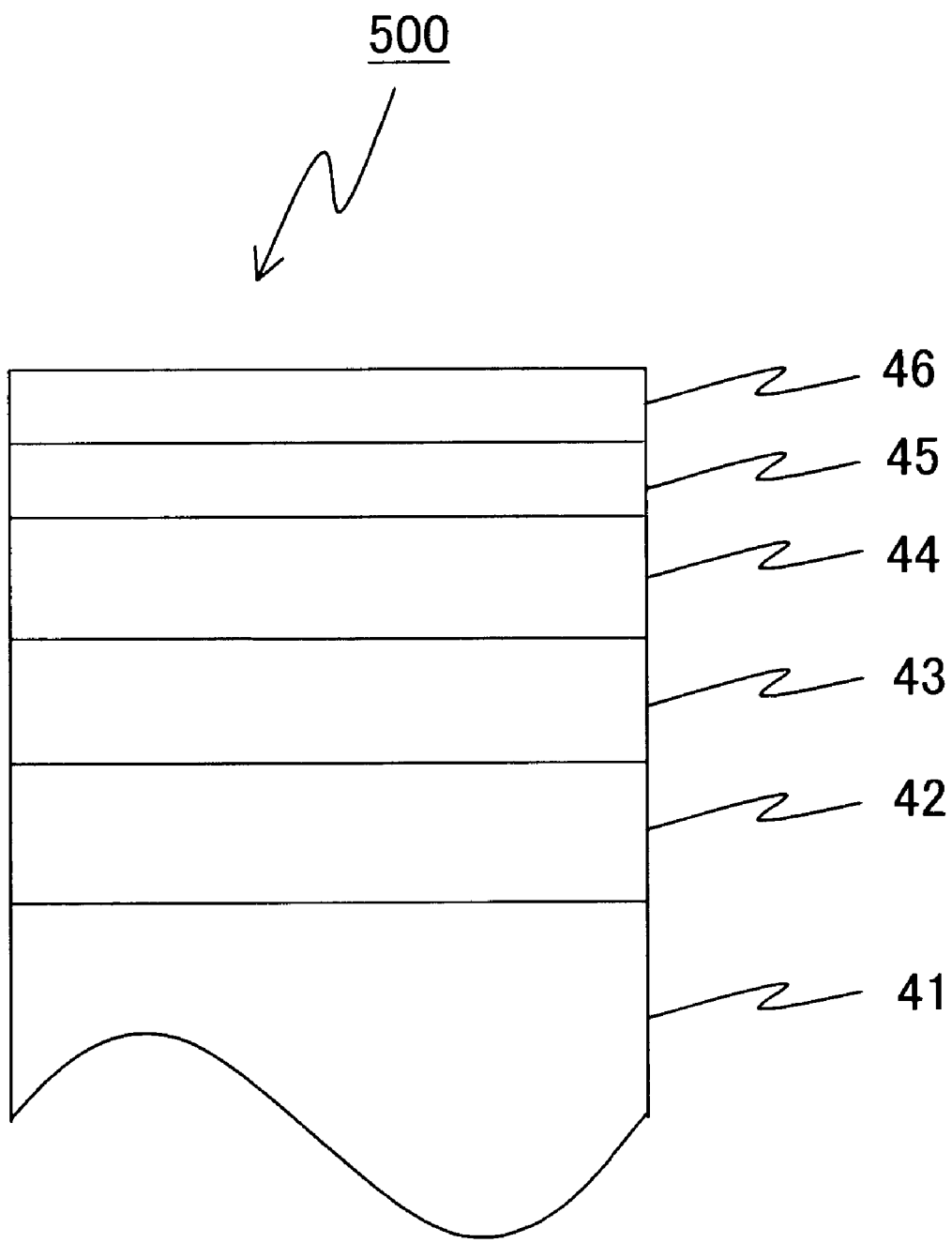
FIG. 17 shows a sectional view conceptually illustrating a structure of a magnetic disk produced in the seventh embodiment.

In this embodiment, as shown in FIG. 17, a magnetic disk 500 is produced, the magnetic disk 500 comprising an in-plane magnetizable layer 42, an underlying layer 43, a magnetic layer 44, a protective layer 45, and a lubricant layer 46 which are arranged on a substrate 41 in this order.

Formation of In-plane Magnetizable Layer

A CoNbZr layer having an amorphous structure was formed as a film having a film thickness of 100 nm as the in-plane magnetizable layer 42 on the glass substrate 41 having a diameter of 2.5 inches (6.5 cm). When the in-plane magnetizable layer 42 is formed, the DC sputtering method was used. The substrate 41 was not heated during the sputtering. A CoNbZr alloy was used for the target, and Ar gas was used for the electric discharge gas.

Formation of Underlying Layer

Subsequently, a $CoO$—$SiO_2$ layer was formed as the underlying layer 43 on the in-plane magnetizable layer 42 by means of the reactive ECR sputtering method by using the ECR apparatus shown in FIG. 5. A Co—Si alloy was used for the target, and an Ar—$O_2$ mixed gas was used for the electric discharge gas. The gas pressure during the sputtering was 0.3 mTorr (about 39.9 mPa), and the introduced microwave electric power was 1 kW. An RF bias voltage of 500 W was applied between the target and the substrate in order that the plasma excited by the microwave (2.98 GHz) was introduced in the direction toward the target and the driven-out sputtering particles were simultaneously introduced in the direction toward the substrate. Thus, the $CoO$—$SiO_2$ film as the underlying layer 43 was formed to have a film thickness of 20 nm.

Analysis of Composition of Underlying Layer, Observation with TEM, $\mu$-EDX Analysis, and Lattice Image Observation The composition of the $CoO$—$SiO_2$ layer as the underlying layer 43 was analyzed. As a result of the analysis, it was revealed that CoO and $SiO_2$ were contained in a ratio (molar ratio) of 2:1.

Subsequently, the surface of the underlying layer 43 was observed in the bright field with TEM. The observed image gave the same structure as that shown in FIG. 3. The underlying layer 43 had a honeycomb structure in which regular hexagonal crystal grains 12 (magnetic grains) with a distance between opposite sides of 10 nm were regularly arranged in a honeycomb (comb-shaped) configuration with a crystal grain boundary 14 having a uniform width intervening therebetween.

After that, the underlying layer 43 was analyzed by means of the energy dispersion type X-ray analysis ($\mu$-EDX analysis) for the extremely minute area. As a result, it was revealed that the crystal grains were composed of oxide of cobalt, and the substance existing in the crystal grain boundary was $SiO_2$. The distance between the crystal grains (width of the crystal grain boundary) was 0.5 to 1.0 nm.

According to the results of the lattice image observation and the observation with TEM for the structure of the underlying layer 43, it was revealed that the crystal grains of CoO having the uniform size were regularly arranged in the honeycomb configuration with $SiO_2$ intervening therebetween, in the same manner as in the second underlying layer described in the fifth embodiment. The crystal grain diameter distribution of the crystal grains and the number of coordinated grains were evaluated in accordance with the same method as that used in the fifth embodiment. As a result, the grain diameter distribution was a normal distribution, and the standard deviation ($\sigma$) was 0.5 nm. The number of coordinated grains was 6.01 in average.

For the purpose of comparison, a $CoO$—$SiO_2$ film for constructing an underlying layer was formed in accordance with an ordinary magnetron sputtering method other than the ECR sputtering method. The structure of the $CoO$—$SiO_2$ film obtained by the magnetron sputtering method was analyzed with TEM. As a result, the average grain diameter was 10 nm. Although the grain diameter distribution was a normal distribution, the standard deviation a was determined to be 1.2 nm, in which the dispersion of the grain diameter was large. The number of coordinated grains was investigated for 500 individuals of crystal grains. As a result, the number of coordinated grains was 6.30 in average. Therefore, the regularity of the honeycomb structure was lowered. According to this fact, it was revealed that when the CoO—SiO$_2$ film as the underlying layer was formed by using the ECR sputtering method, the regularity of the structure of the film was successfully improved to a great extent. Further, the structure of the underlying layer was analyzed by means of the X-ray diffraction method. As a result, it was revealed that the crystals of CoO were oriented in an orientation of (111).

Formation of Magnetic Layer, Protective Layer, and Lubricant Layer

A CoCrPt layer was formed as the magnetic layer 44 to have a film thickness of 15 nm on the underlying layer 43 formed as described above, by means of the DC sputtering method. A CoCrPt alloy was used for the target, and Ar was used for the electric discharge gas. The gas pressure during the sputtering 0.3 mTorr (about 39.9 mPa), and the introduced DC electric power was 0.7 kW/150 mm$\phi$. The substrate was heated to 300° C. during the formation of the magnetic layer 44.

Subsequently, a carbon film was formed as the carbon film 45 to have a film thickness of 5 nm on the magnetic layer 44. When the carbon film was formed, the ECR sputtering method based on the use of the microwave was used. A ring-shaped carbon material was used for the target, and Ar was used for the sputtering gas. The gas pressure during the sputtering was 0.3 mTorr (about 39.9 mPa), and the introduced microwave electric power was 1 kW. A DC bias voltage of 500 V was applied between the target and the substrate in order that the plasma excited by the microwave was introduced in the direction toward the target and the target particles driven out by the plasma were simultaneously introduced in the direction toward the substrate. Alternatively, an RF voltage may be used as the bias voltage in place of the DC voltage.

Finally, the lubricant layer 46 composed of perfluoropolyether was formed on the carbon film 45. Thus, the magnetic disk 500 having the structure shown in FIG. 17 was produced.

Observation for Magnetic Layer With TEM and Analysis by X-ray Diffraction Method The surface structure of the magnetic layer 44 was observed with TEM after the CoCrPt film as the magnetic layer 44 was formed in the production steps described above. As a result of the observation, it was revealed that the magnetic layer 44 also had a honeycomb structure reflecting the structure of the underlying layer 43. The average grain diameter of crystal grains, which was determined by the surface observation with TEM, was 10 nm. The standard deviation a in the grain diameter distribution was 0.6 nm. Accordingly, it was revealed that the magnetic grains of the magnetic layer 44 were fine and minute, the dispersion of the grain diameter was small, and the magnetic layer 44 had the same form as that of the underlying layer.

Subsequently, the number of crystal grains (number of coordinated grains) to surround one crystal grain in the magnetic layer 44 was investigated for 500 individuals of crystal grains. As a result, the number was 6.01 in average, which was well coincident with the number of coordinated grains in the underlying layer 43. This result means that the crystal grains having the hexagonal configuration were regularly arranged two-dimensionally continuously from the underlying layer 43. Further, the structure in the vicinity of the grain boundary of the crystal grains was investigated by means of the lattice image observation. As a result, the structure of the magnetic layer 44 differs between the crystal grains and the grain boundary existing therearound. Especially, it was revealed that the disorder of the lattice was observed at the grain boundary in which the orientation was different from that of the crystalline portion. As a result, of the structural observation for the underlying layer 43 described above, the portion, at which the lattice was disordered, corresponded to the grain boundary portion of the underlying layer 43.

The cross-sectional structure of the magnetic layer 44 was observed with TEM. As a result of the observation, the continuity of the lattice was observed between the underlying layer 43 and the magnetic layer 44. It was revealed that the magnetic layer 44 was epitaxially grown from the underlying layer 43. It was also revealed that the mode of growth of the magnetic layer 44 was different between the crystalline phase and the grain boundary phase, giving different metallic structures. Especially, an appropriate pillar-shaped structure was grown from the crystal grains of the underlying layer 43 up to the magnetic layer 44. On the other hand, the magnetic layer portion disposed on the grain boundary phase did not exhibit any distinct structure. According to this fact, it is considered that the magnetic layer portion disposed on the grain boundary phase is an aggregate of polycrystalline matters, exhibiting non-magnetic behavior. Further, the magnetic layer 44 was investigated by means of the X-ray diffraction. As a result, it was revealed that the magnetic layer 44 was oriented in an orientation of (00.1), and the c-axis was perpendicular to the film surface. This fact indicates that the magnetic layer 44 is a perpendicularly magnetizable film.

In this embodiment, a control layer for improving the crystalline orientation of the magnetic layer 44 may be provided between the underlying layer 43 and the magnetic layer 44 of the magnetic recording medium. For example, a TiCr film may be formed as the orientation control layer on the underlying layer 43 by means of the DC sputtering method.

Eighth Embodiment

In this embodiment, a magnetic disk is produced, in which an underlying layer possesses soft magnetization. The magnetic disk to be produced in this embodiment comprises, on a substrate 1, an underlying layer (inorganic compound thin film) 2, a magnetic layer 3, and a protective layer 4 in the same manner as in the structure shown in FIG. 1. However, the underlying layer 2 exhibits the soft magnetization.

Production of Magnetic Disk

A CoO—SiO$_2$ film 2 was formed as the underlying layer on the glass substrate 1 having a circular shape with a diameter of 2.5 inches (6.35 cm) by means of the ECR sputtering method. A sintered mixture containing CoO and SiO$_2$ in a ratio of 2:1 was used for the target, and Ar containing 1% hydrogen (reducing atmosphere) was used for the sputtering gas. The reason why the underlying layer 2 was formed in the reducing atmosphere is that a part of CoO for constructing the underlying layer 2 is reduced to deposit Co so that cobalt oxide has the soft magnetization. The pressure of the sputtering gas was 0.5 mTorr (about 66.5 mPa), and the introduced microwave electric power was 1 kW. An RF bias to read power of 500 W was applied between the target and the substrate in order that the plasma excited by the resonance absorption was introduced in the direction toward the target, and the particles driven out from the target by the plasma were introduced in the direction toward the substrate. The CoO—SiO$_2$ film 2 as the underlying layer was formed to have a film thickness of 20 nm by means of the ECR sputtering method as described above.

Evaluation of Underlying layer

The surface structure of the CoO—SiO$_2$ film 2 as the underlying layer obtained as described above was observed with a high resolution transmission electron microscope (TEM). An obtained observation image resulted in the same structure as that shown in FIG. 3. An aggregate of regular hexagonal crystal grains (12) was present, in which the spacing distance between opposite sides was 10 nm. The crystal grains (12) were regularly arranged in a honeycomb configuration. The distance between the crystal grains was 0.7 nm.

According to the energy dispersion type X-ray analysis ($\mu$-EDX) for the extremely minute area, it was revealed that the crystal grain was composed of oxide of cobalt, and silicon oxide existed at the crystal grain boundary 14. According to the lattice image observation for the underlying layer, it was revealed that the cobalt oxide was crystalline and the silicon oxide was amorphous. The lattice constant was determined. As a result, the lattice constant had a value approximately equal to that of Co for forming the magnetic grains of the magnetic layer to be formed on the underlying layer. The lattice constant can be precisely controlled by changing the film formation condition and/or adding a metal (for example, chromium, iron, and nickel) having a different ion radius or oxide of such a metal to CoO. In the CoO grains formed by the ECR sputtering method, a part of CoO was reduced as described above, and Co was deposited in CoO. It was revealed that the ratio of Co in the mixture of CoO and Co was about 1 atomic %.

As for the magnetic recording medium of the present invention, the ratio of CoO:Co can be determined as follows from the value of the relative permeability of the underlying layer. At first, known amounts of CoO and Co are mixed to prepare mixtures having a variety of mixing ratios. Subsequently, the mixture is introduced into a tablet-forming machine to form a tablet while reducing the pressure. In this state, the relative permeability of the mixture is determined. Table 1 depicted below shows the actually obtained values of the mixing ratio and the relative permeability. According to this table, it is appreciated that the relative permeability is increased as the ratio of Co is increased. The ratio of Co in the formed underlying layer can be determined by determining an expression of relation between the two values, and using the value of the relative permeability of the underlying layer. In order to determine the relative permeability, a convenient technique was used as follows. At first, impedances were determined respectively for a case in which a sample was placed on a ]-shaped (U-shaped) coil and for a case in which a sample was not placed. The relative permeability was determined from the difference between the impedances by means of calculation.

TABLE 1

|  | Ratio of Co (at %) | Relative permeability |
|---|---|---|
| Sample 1 | 0.3 | 20 to 30 |
| Sample 2 | 0.5 | 2000 to 3000 |
| Sample 3 | 1.0 | 5000 |

The cross section of the thin film was observed with TEM. As a result, a pillar-shaped structure was observed in the direction perpendicular to the substrate. The pillar-shaped structure indicates the fact that the regular hexagonal crystal grains were grown upwardly from the top of the substrate while maintaining the crystal grain diameter. Subsequently, the result of the observation with TEM for the surface of the underlying layer was used to analyze the grain diameter distribution of the crystal grains and the number of coordinated grains. The grain diameter distribution was a normal distribution. The standard deviation ($\sigma$) was determined to be not more than 0.6 nm. The number of coordinated grains was investigated for randomly selected 280 individuals of crystal grains. As a result, the number of coordinated grains was 6.02 in average. This fact indicates that the crystal grains having the hexagonal shape with the uniform size are arranged extremely regularly in the honeycomb configuration. It has been revealed that the number of coordinated grains changes depending on the distance between the crystal grains in the same manner as in other embodiments.

The crystal structure of the CoO—SiO$_2$ film as the underlying layer was analyzed by means of the X-ray diffraction method only a diffraction peak of (220) of CoO was observed in the vicinity of $2\theta=62.5°$ in an obtained diffraction profile.

Subsequently, the magnetic characteristics of the CoO—SiO$_2$ film as the underlying layer were measured. The saturated magnetic flux density was Bs=1.8 T, the coercive force was Hc=0.10 e (about 7.9 A/m), the magnetostrictive constant was $\lambda=4\times10^{-7}$, the relative permeability was $\mu=5000$ (5 MHz). Thus, the CoO—SiO$_2$ film had the good soft magnetic characteristics. The magnetization-prompt axis of the film was in the direction parallel to the substrate. The underlying layer was a so-called in-plane magnetizable film.

Formation of Magnetic Layer

A Co$_{69}$Cr$_{17}$Pt$_{11}$Ta$_3$ film was formed as the magnetic layer on the CoO—SiO$_2$ film as the underlying layer formed as described above, by means of the DC sputtering method. A Co—Cr—Pt—Ta alloy was used for the target, and Ar was used for the sputtering gas. The pressure of the sputtering gas was 0.3 mTorr (about 39.9 mPa), and the introduced DC electric power was 1 kW/150 mm$\phi$. The substrate was heated to 300° C. during the formation of the magnetic layer. In this way, the magnetic layer was formed to have a film thickness of 15 nm.

Evaluation of Magnetic Layer

Subsequently, the structure of the Co$_{69}$Cr$_{17}$Pt$_{11}$Ta$_3$ film as the magnetic layer was observed with TEM. As a result, it was revealed that the magnetic layer had a honeycomb structure reflecting the structure of the underlying layer, in the same manner as the underlying layer 2. The average grain diameter of the magnetic grains, which was obtained from the observation for the surface of the magnetic layer, was 10 nm. The grain diameter distribution had $\sigma$ of not more than 0.8 nm. As described above, it was revealed that the magnetic grains of the magnetic layer were fine and minute, and the dispersion of the grain diameter was small. Subsequently, the number of coordinated grains was investigated for randomly selected 250 individuals of crystal grains. As a result, the number of coordinated grains was 6.01 in average which was well coincident with the value obtained for the underlying layer 2 as described above. This fact indicates that the magnetic grains having the hexagonal shape with the uniform size are arranged extremely regularly in the honeycomb configuration.

The cross-sectional structure of the Co$_{69}$Cr$_{17}$Pt$_{11}$Ta$_3$ film as the magnetic layer was observed with TEM. As a result, it was revealed that the continuity of the lattice was observed between the underlying layer and the magnetic layer, and the magnetic layer was epitaxially grown from the top of the underlying layer. Further, it was revealed that the growth mechanism differed between the magnetic grain portion grown from the top of the crystal grains of the underlying layer and the boundary portion between the magnetic grains grown from the top of the crystal grain boundary of the underlying layer, in the magnetic layer in the same manner as in the underlying layers of the other embodiments, giving different metallic structures.

The analysis was performed by means of the X-ray diffraction method after forming the $Co_{69}Cr_{17}Pt_{11}Ta_3$ film as the magnetic layer. According to an X-ray chart, a peak was observed in the vicinity of $2\theta=72.5°$ in addition to a peak indicating (220) of Co in the underlying layer 2 in the vicinity of $2\theta=62.5°$. In view of this fact in combination with the observation result with TEM, the peak indicates (11.0) of Co. It was revealed that Co was strongly oriented in this orientation. As well-known, (11.0) of Co is the orientation preferable for the high density recording.

The magnetic characteristics of the $Co_{69}Cr_{17}Pt_{11}Ta_3$ film were as follows. That is, the coercive force was 3.6 kOe (about 284.4 kA/m), Isv was $2.5\times10^{-16}$ emu, S as the index for the angular property of hysteresis in M-H loop was 0.9, and S* was 0.93. Thus, the $Co_{69}Cr_{17}Pt_{11}Ta_3$ film had the good magnetic characteristics.

Formation of Protective Layer

Finally, a carbon film was formed as the protective film by means of the DC sputtering method. A carbon target was used for the target, and Ar was used for the sputtering gas. The sputtering condition was as follows. That is, the introduced DC electric power density was 1 kW/150 mm$\phi$. The gas pressure of the sputtering gas was 5 mTorr (about 665 mPa). In this way, the protective layer 4 was formed to have a film thickness of 5 nm.

Production and Evaluation of Magnetic Disk Apparatus

The magnetic disk was completed by further applying a lubricant onto the carbon film as the protective film formed as described above. A plurality of magnetic disks were produced in accordance with the same process. The magnetic disks were coaxially attached to the spindle of the magnetic recording apparatus. The magnetic recording apparatus was constructed in the same manner as in the first embodiment, having the structure shown in FIGS. 11 and 12. The distance between the magnetic head surface and the magnetic disk was maintained to be 14 nm.

A converged laser beam was radiated so that the laser beam was collected onto the magnetic layer during recording and reproduction. The reason whey the laser beam was radiated is that it was intended to extinguish the magnetization of the underlying layer by using the heat generated by the laser beam. During the recording, the temperature of the area opposed to the light-irradiated area on the surface of the magnetic disk was raised to 170° C. as a result the irradiation with light. The Curie temperature of the underlying layer is about 130° C. Therefore, as the temperature is raised, the coercive force is lowered, and the underlying layer is non-magnetic at a portion just under the light-irradiated area. That is, this situation is magnetically equivalent to a situation in which no underlying layer exists. The recording operation was performed by applying a magnetic field to the magnetic layer in this state. When the irradiation with light is stopped, or when the area subjected to recording is deviated from the light-irradiated area, then the temperature is in the vicinity of the room temperature. Therefore, the underlying layer has the soft magnetization, and it behaves as an in-plane magnetizable layer. In the in-plane magnetizable layer, the direction of magnetization is opposite to the direction of magnetization of the magnetic layer by the aid of the leak magnetic field generated from the area of inversion of magnetization in the magnetic layer. The arrangement of magnetization as described above lowers the diamagnetic field of the magnetic layer. Therefore, the stability of the recording is high even in the case of storage over a long period of time. During the reproduction, the temperature of the area opposed to the light-irradiated area on the magnetic disk surface was locally raised to about 180° C. by radiating the light to perform the reproduction. The increase in temperature allows the underlying layer to be non-magnetic at a portion just under the light-irradiated area. In this area, the situation is magnetically equivalent to a situation in which no underlying layer exists. In this state, a GMR head was used to detect the leak magnetic field generated from the boundary of inversion of magnetization in the magnetic layer disposed just over the underlying layer in which the magnetization disappeared. A signal (700 kFCI) corresponding to 40 Gbits/inch$^2$ (6.20 Gbits/cm$^2$) was recorded on the magnetic disk 10 to evaluate S/N of the disk. As a result, a reproduction output of 34 dB was obtained.

The recording and reproduction characteristics of the magnetic disk were measured. As a result, when the recording was performed with a linear recording density of 700 kFCI, the attenuation amount of the reproduction output after 100 hours was 2% of the initial reproduction output. For the purpose of comparison, the same measurement was performed for a magnetic disk provided with no underlying layer. As a result, the attenuation amount of the reproduction output after 100 hours was 4% of the initial reproduction output. Therefore, the recording and reproduction characteristics after the passage of a long period of time were improved as a result of the suppression of demagnetization due to the thermal fluctuation.

The unit of inversion of magnetization was measured with a magnetic force microscope (MFM). As a result, 2 to 3 individuals of magnetic grains were inverted at once with respect to the recording magnetic field applied when 1 bit date was recorded. This value is sufficiently small as compared with 5 to 10 individuals of the conventional unit of inversion of magnetization. Accordingly, the portion (zigzag pattern) corresponding to the boundary between the adjoining units of inversion of magnetization was remarkably small as compared with the conventional magnetic disk. Neither thermal fluctuation nor demagnetization due to heat was caused. This result is based on the small dispersion of the grain diameter of the magnetic grain of the $Co_{69}Cr_{17}Pt_{11}Ta_3$ film 3 as the magnetic layer. The error rate of the disk was measured. As a result, an obtained value was not more than $1\times10^{-5}$ when no signal processing was performed.

In the embodiments described above, the compound for constructing the thin film (underlying base film), for example, the mixture of CoO and $SiO_2$ was sintered and used as the target during the formation of the thin film (underlying base film). However, also in the first embodiment and other embodiments, compounds for constructing the thin film, for example, CoO and $SiO_2$ may be singly sintered respectively and used as targets so that the film may be formed by means of the two-target simultaneous sputtering (co-sputtering).

In the embodiments described above, the glass was used for the substrate. However, a metal substrate composed of, for example, Al or Al alloy, or a plastic substrate composed of, for example, polycarbonate or amorphous polyolefin may be used. The embodiments described above are illustrative of the case in which the underlying layer (thin film) is formed on the glass substrate. However, a substrate may be prepared by using a material for forming the underlying layer, and a predetermined film such as the magnetic film may be formed thereon.

The same or equivalent effect is obtained even when iron oxide or nickel oxide is used in place of cobalt oxide in the embodiment in which cobalt oxide is used for the crystal grains of the underlying layer (inorganic compound thin film). Alternatively, the lattice constant of the crystal grain may be controlled by adding, to cobalt oxide, a metal having a different ion radius, for example, chromium, iron, nickel, or oxide thereof.

The same or equivalent effect is obtained even when aluminum oxide, titanium oxide, tantalum oxide, zinc oxide, or a combination thereof is used in place of silicon oxide in the embodiment in which silicon oxide is used as the oxide existing in the crystal grain boundary. Especially, when the crystal grain boundary is formed with a mixture of silicon oxide and zinc oxide, the spacing distance between crystal grains can be easily controlled by changing the mixing ratio thereof.

In the embodiments described above, the film having the granular structure is used for the magnetic layer, in which Co—Cr—Pt, CoCrPtTa-based material, or oxide exists to surround the crystal grains. However, other than the above, a three-element material such as Co—Cr—Ta or a five-element material such as Co—Cr—Pt—Ta—Si may be used. In the embodiment based on the use of the Co—$SiO_2$-based granular type magnetic layer, it is also possible to add, to cobalt, an element such as platinum, palladium, gadolinium, samarium, praseodymium, neodymium, terbium, dysprosium, holmium, yttrium, and lanthanum. Up to the present, the granular type magnetic film has not been used for the magnetic layer of the magnetic recording medium because of the small coercive force. However, it is possible to improve the magnetic anisotropy of the magnetic grains in the granular type magnetic film by adding the element as described above. Actually, when a system obtained by adding platinum to cobalt was used, then the magnetic anisotropy of the magnetic grains was increased, and the coercive force was increased as well.

In the embodiments described above, Ar was used for the sputtering gas when the protective film was formed. However, a gas containing nitrogen or a gas containing nitrogen and hydrogen may be used. When the gas containing nitrogen or the gas containing nitrogen and hydrogen is used, then an obtained film is dense, and it is possible to improve the protecting performance, because the grains are fine and minute.

INDUSTRIAL APPLICABILITY

The magnetic recording medium of the present invention has the magnetic layer composed of the magnetic grains which are fine and minute, in which the dispersion of the grain diameter is reduced, and which have the desired crystalline orientation advantageous for the high density recording, owing to the presence of the underlying layer. As for the magnetic layer, the unit of inversion of magnetization of the magnetic grains is small, the noise is low, the thermal fluctuation is low, and the thermal demagnetization is low. Therefore, the magnetic layer is suitable for the high density recording. The magnetic recording medium of the present invention is provided with the specified layer in order to avoid the growth of the layer having no desired crystal structure at the initial stage of the growth of the underlying layer. Therefore, it is possible to thin the thickness of the entire magnetic recording medium. Owing to the provision of the control layer, the magnetic layer can be epitaxially grown from the underlying layer via the control layer while mitigating the difference in lattice constant between the underlying layer and the magnetic layer. The texture having the desired concave/convex structure is formed on the surface of the magnetic recording medium of the present invention. Therefore, the magnetic recording medium of the present invention is advantageous for the high density recording and the reproduction therefor. The magnetic recording medium of the present invention makes it possible to mitigate the recording demagnetization which would be otherwise caused by the achievement of high density recording. The MR element or the GMR element, which has the high reproducing sensitivity, can be used for the reproduction. The perpendicular magnetic recording medium of the present invention makes it possible to reproduce information at high S/N. The magnetic recording medium and the magnetic recording apparatus installed with the magnetic recording medium of the present invention make it possible to perform the super high density recording having a surface recording density exceeding 40 Gbits/inch$^2$.

When the method for producing the magnetic recording medium of the present invention is used, it is possible to obtain the magnetic recording medium provided with the underlying layer in which the grain diameter is minute and the uniform crystal grains are arranged in the honeycomb configuration. Since the fractal feature of the crystal grains of the underlying layer is appropriate, the magnetic layer is formed while reflecting the feature, comprising the magnetic grains which are arranged finely in a well-regulated manner. When the reactive ECR sputtering method is used, then the time required for the film formation can be further shortened, and it is possible to improve the productivity. The protective film of the magnetic recording medium, which is obtained by the production method of the present invention, uniformly covers the entire magnetic film, although the film thickness is only about 5 nm. Therefore, it is possible to protect the magnetic film in a well-suited manner, and it is possible to shorten the spacing distance between the magnetic head and the magnetic recording medium. Thus, it is possible to improve the recording density.

What is claimed is:

1. A magnetic recording medium comprising:
    a substrate;
    an underlying layer which is formed on the substrate, the underlying layer being composed of crystal grains substantially formed of magnesium oxide, and a crystal grain boundary containing at least one oxide selected from the group consisting of silicon oxide, aluminum oxide, titanium oxide, tantalum oxide, and zinc oxide; and
    a magnetic layer which is formed on the underlying layer and on which information is recorded.

2. The magnetic recording medium according to claim 1, wherein the crystal grains are arranged in a honeycomb configuration.

3. The magnetic recording medium according to claim 2, wherein an average number of the crystal grains deposited around each of the crystal grains is 5.9 to 6.1.

4. The magnetic recording medium according to claim 1, wherein the crystal grains are subjected to crystal orientation in a certain direction.

5. The magnetic recording medium according to claim 1, wherein the magnetic layer is epitaxially grown on the underlying layer.

6. The magnetic recording medium according to claim 1, wherein a standard deviation of a grain diameter distribution of the crystal grains is not more than 8% of an average grain diameter.

7. The magnetic recording medium according to claim 1, wherein the magnetic layer includes magnetic grains grown corresponding to the respective crystal grains of the underlying layer, and a boundary between the magnetic grains.

8. The magnetic recording medium according to claim 7, wherein the boundary has a width of 0.5 to 2 nm.

9. The magnetic recording medium according to claim 1, wherein a difference between a lattice constant of the crystal grains of the underlying layer and a lattice constant of magnetic grains of the magnetic layer is within ±10%.

10. The magnetic recording medium according to claim 1, wherein the underlying layer is formed by means of an ECR sputtering method.

11. A magnetic recording medium comprising:
a substrate;
a first underlying layer which is formed on the substrate;
a second underlying layer which is formed on the first underlying layer; and
a magnetic layer which is formed on the second underlying layer and on which information is recorded, wherein:
the second underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide,
the first underlying layer serves as a layer to prevent the second underlying layer from initial growth, and
the first underlying layer is an amorphous film, and the amorphous film includes a metal selected from the group consisting of hafnium, titanium, tantalum, niobium, zirconium, tungsten, molybdenum, and an alloy containing at least one element thereof; a cobalt alloy principally composed of cobalt and containing at least one element selected from the group consisting of titanium, tantalum, niobium, zirconium, and chromium; or at least one inorganic compound selected from the group consisting of silicon nitride, silicon oxide, and aluminum oxide.

12. A magnetic recording medium comprising:
a substrate;
a first underlying layer which is formed on the substrate;
a second underlying layer which is formed on the first underlying layer; and
a magnetic layer which is formed on the second underlying layer and on which information is recorded, wherein:
the second underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide,
the first underlying layer serves as a layer to prevent the second underlying layer from initial growth,
the first underlying layer is a crystalline film, and the crystalline film includes at least one selected from the group consisting of chromium, chromium alloy, vanadium, vanadium allow, and an alloy containing at least one element selected from the group consisting of titanium, tantalum, aluminum, nickel, vanadium, and zirconium.

13. The magnetic recording medium comprising:
a substrate;
a first underlying layer which is formed on the substrate;
a second underlying layer which is formed on the first underlying layer; and
a magnetic layer which is formed on the second underlying layer and on which information is recorded, wherein:
the second underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide,
the first underlying layer serves as a layer to prevent the second underlying layer from initial growth,
the first underlying layer and the second underlying layer are formed by using an ECR sputtering method, and
the first underlying layer is formed of hafnium, and the second underlying layer is formed of $CoO$—$SiO_2$.

14. A magnetic recording medium comprising:
a substrate;
an underlying layer which is formed on the substrate;
a control layer which is formed on the underlying layer and which is formed of at least one selected from the group consisting of magnesium oxide, chromium alloy, and nickel alloy; and
a magnetic layer which is formed on the control layer and on which information is recorded, wherein:
the underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide.

15. The magnetic recording medium according to claim 14, wherein the control layer is an alloy containing chromium or nickel as a major component, and at least one element selected from the group consisting of chromium, titanium, tantalum, vanadium, ruthenium, tungsten, molybdenum, niobium, nickel, zirconium, and aluminum.

16. The magnetic recording medium according to claim 14, wherein the control layer is formed of one selected from the group consisting of chromium-titanium, chromium-tungsten, magnesium oxide, chromium-ruthenium.

17. The magnetic recording medium according to claim 14, wherein the control layer has a bcc or B2 structure.

18. The magnetic recording medium according to claim 14, wherein the control layer is epitaxially grown from the underlying layer, the control layer has a structure which reflects a crystal structure of the underlying layer, and the control layer has a crystalline portion which is constructed by crystal grains corresponding to the crystal grains of the underlying layer, and a grain boundary which corresponds to the crystal grain boundary of the underlying layer.

19. The magnetic recording medium according to claim 14, wherein the control layer has a film thickness of 2 nm to 10 nm.

20. The magnetic recording medium according to claim 14, wherein a combination of the underlying layer, the control layer, and the magnetic layer is at least one combination selected from the group consisting of CoO—ZnO/Cr—Ti alloy/Co—Cr—Pt alloy, CoO—SiO$_2$/MgO/Co—Cr—Pt—Ta alloy, CoO—SiO$_2$/Cr—W alloy/Co—Cr—Pt—Ta alloy, CoO—SiO$_2$/MgO/CoO—SiO$_2$ granular type magnetic film, CoO—SiO$_2$/Ni—Al alloy/Co—Cr—Pt—Ta alloy, CoO—SiO$_2$/Cr—Ti alloy/Co—Cr—Pt—Ta alloy, CoO—SiO$_2$/Ni—Ta alloy/Co—Pt—SiO$_2$ granular type magnetic film, CoO—SiO$_2$/Ni—Ta alloy/Co—Cr—Pt—Ta alloy, CoO—SiO$_2$/Cr—Ru alloy/Co—Cr—Pt—Ta alloy, CoO—SiO$_2$/Cr—Ru alloy/Co—Pt—SiO$_2$ granular type magnetic film, CoO—SiO$_2$/Co—Cr—Zr alloy/Co—Pt—SiO$_2$ granular type magnetic film, CoO—SiO$_2$/Co—Cr—Zr alloy/Co—Cr—Pt—Ta alloy, CoO—SiO$_2$/Cr—Mo alloy/Co—Cr—Pt—Ta alloy, and CoO—SiO$_2$/Cr—Mo alloy/Co—Pt—SiO$_2$ granular type magnetic film.

21. The magnetic recording medium according to claim 14, wherein differences between a lattice constant of the crystal grains of the underlying layer and a lattice constant of crystal grains of the control layer and between the lattice constant of the crystal grains of the control layer and a lattice constant of magnetic grains of the magnetic layer are within ±5% respectively.

22. The magnetic recording medium according to claim 14, wherein the crystal grains of the underlying layer are arranged in a honeycomb configuration.

23. The magnetic recording medium according to claim 14, wherein the underlying layer and the control layer are formed by means of an ECR sputtering method.

24. A magnetic recording medium comprising:
a substrate,
an underlying layer which is formed on the substrate; and
a magnetic layer which is formed on the underlying layer and on which information is recorded, wherein:
the underlying layer is composed of crystal grains and a crystal grain boundary which surrounds the respective crystal grains, the crystal grains being arranged in a honeycomb configuration; and
the crystal grains protrude at a height of 3 to 20 nm from a surface of the underlying layer,
further comprising a protective layer on the magnetic layer, wherein each of the magnetic layer and the protective layer has projections which protrude at a height of 3 to 20 nm from a surface of each of the magnetic layer and the protective layer while reflecting a surface structure of the underying layer.

25. The magnetic recording medium according to claim 24, wherein the projections are used as a texture.

26. The magnetic recording medium according to claim 25, wherein a distance between the adjoining projections is 10 to 30 nm.

27. The magnetic recording medium according to claim 24, wherein the crystal grain boundary has a width of 0.5 to 2 nm.

28. A magnetic recording medium comprising:
a substrate;
an underlying layer which is formed on the substrate; and
a magnetic layer which is formed on the underlying layer and which has an easily magnetized direction in a direction perpendicular to a substrate surface, wherein:
the underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide which surrounds the respective crystal grains,
the crystal grains are pillar-shaped in a plane perpendicular to the substrate surface and hexagonal in a plane parallel to the substrate surface, and the crystal grains are arranged in a honeycomb configuration in the plane parallel to the substrate surface, and the crystal grains of the underlying layer are oriented in (111) orientation.

29. The magnetic recording medium according to claim 28, wherein the magnetic layer is oriented in (00.1) orientation.

30. A magnetic recording medium comprising:
a substrate:
an underlying layer which is formed on the substrate; and
a magnetic layer which is formed on the underlying layer and which has an easily magnetized direction in a direction perpendicular to a substrate surface, wherein:
the underlying layer is composed of crystal grains substantially formed of at least one oxide selected from the group consisting of cobalt oxide, chromium oxide, iron oxide, nickel oxide, and magnesium oxide, and a crystal grain boundary containing at least one oxide selected from the group consisting of silicon oxide, aluminum oxide, titanium oxide, tantalum oxide, and zinc oxide which surrounds the respective crystal grains, and the crystal grains are pillar-shaped in a plane perpendicular to the substrate surface and hexagonal in a plane parallel to the substrate surface, and the crystal grains are arranged in a honeycomb configuration in the plane parallel to the substrate surface, and
further comprising a soft magnetic layer which is provided between the substrate and the underlying layer.

31. A magnetic recording medium comprising:
a substrate;
an underlying layer which is formed on the substrate; and
a magnetic layer which is formed on the underlying layer and which has an easily magnetized direction in a direction perpendicular to a substrate surface, wherein:
the underlying layer is composed of crystal grains substantially formed of at least one oxide selected from the group consisting of cobalt oxide, chromium oxide, iron oxide, nickel oxide, and magnesium oxide, and a crystal rain boundary containing at least one oxide selected from the group consisting of silicon oxide, aluminum oxide, titanium oxide, tantalum oxide, and zinc oxide which surrounds the respective crystal grains, and
the crystal grains are pillar-shaped in a plane perpendicular to the substrate surface and hexagonal in a plane parallel to the substrate surface, and the crystal grains are arranged in a honeycomb configuration in the plane parallel to the substrate surface, and
further comprising, on the underlying layer, a control layer which controls crystalline orientation of the magnetic layer.

32. The magnetic recording medium according to claim 1, further comprising a protective film having a film thickness of 1 to 5 nm.

33. The magnetic recording medium according to claim 32, wherein the protective film is formed by means of an ECR sputtering method.

34. A magnetic recording apparatus comprising the magnetic recording medium as defined in claim 1.

* * * * *